US012634537B1

(12) United States Patent
Horton

(10) Patent No.: US 12,634,537 B1
(45) Date of Patent: May 19, 2026

(54) AI-BASED MEDIA AND PRODUCT AGGREGATION AND TRANSACTION MANAGEMENT

(71) Applicant: Music IP Holdings (MIH), Inc., Charleston, SC (US)

(72) Inventor: Christopher Horton, Charleston, SC (US)

(73) Assignee: Music IP Holdings, Inc., Nashville, TN (US)

( * ) Notice: Subject to any disclaimer, the term of this patent is extended or adjusted under 35 U.S.C. 154(b) by 0 days.

(21) Appl. No.: 19/348,496

(22) Filed: Oct. 2, 2025

(51) Int. Cl.
| | |
|---|---|
| *H04N 21/258* | (2011.01) |
| *H04N 21/239* | (2011.01) |
| *H04N 21/25* | (2011.01) |
| *G06F 40/30* | (2020.01) |

(52) U.S. Cl.
CPC ....... *H04N 21/251* (2013.01); *H04N 21/2393* (2013.01); *H04N 21/25891* (2013.01); *G06F 40/30* (2020.01)

(58) Field of Classification Search
None
See application file for complete search history.

(56) References Cited

U.S. PATENT DOCUMENTS

| | | |
|---|---|---|
| 6,499,035 B1 | 12/2002 | Sobeski |
| 7,356,575 B1 | 4/2008 | Shapiro |
| 7,565,438 B1 | 7/2009 | Zhu |

| | | |
|---|---|---|
| 7,974,923 B2 | 7/2011 | Fung |
| 8,538,949 B2 | 9/2013 | Liu |
| 9,299,116 B2 * | 3/2016 | Williams ............... G06Q 50/10 |
| 9,626,668 B2 | 4/2017 | Raley |
| 11,451,598 B1 * | 9/2022 | Chawla ................. G06F 16/735 |
| 2003/0106072 A1 * | 6/2003 | Soundararajan ...... G06F 3/0601 |
| | | 725/147 |
| 2003/0208638 A1 * | 11/2003 | Abrams, Jr. ............ H04L 69/40 |
| | | 348/575 |
| 2004/0098347 A1 | 5/2004 | Atkinson |
| 2006/0095382 A1 | 5/2006 | Mahlbacher |
| 2007/0033167 A1 * | 2/2007 | Basu ..................... G06F 16/951 |
| 2007/0255965 A1 * | 11/2007 | McGucken ............ G06Q 30/08 |
| | | 713/193 |
| 2008/0086757 A1 | 4/2008 | Pestoni |
| 2008/0163304 A1 * | 7/2008 | Ellis .................. H04N 21/4334 |
| | | 725/50 |
| 2008/0281781 A1 * | 11/2008 | Zhao ....................... G06F 16/38 |
| 2008/0301737 A1 * | 12/2008 | Hjelmeland Almas ..................... |
| | | H04N 21/4668 |
| | | 348/E7.071 |

(Continued)

OTHER PUBLICATIONS

ODRL Best Practices, Jan. 10, 2024.

(Continued)

*Primary Examiner* — William J Kim

(57) ABSTRACT

Aspects are directed receiving a request for media content from a user device, querying a plurality of content provider application programming interfaces (APIs) to retrieve media catalog data, generating a list of media recommendations based on content obtained from one or more of the plurality of content provider APIs, receiving a selection of a media item from the list of media recommendations, providing an acquisition request to a content provider system associated with the selected media item, and retrieving the selected media item from a hosting system.

20 Claims, 20 Drawing Sheets

(56)            References Cited

U.S. PATENT DOCUMENTS

| | | | |
|---|---|---|---|
| 2009/0030792 A1* | 1/2009 | Khivesara | H04L 67/303 705/14.51 |
| 2009/0313665 A1* | 12/2009 | Rouse | H04N 21/4623 725/93 |
| 2009/0327182 A1* | 12/2009 | Chakravarty | H04N 21/4334 706/45 |
| 2010/0238183 A1* | 9/2010 | Sakanaka | H04N 21/472 345/501 |
| 2011/0087675 A1* | 4/2011 | Colombino | G06Q 30/00 707/749 |
| 2011/0289317 A1* | 11/2011 | Darapu | H04N 21/43072 713/168 |
| 2013/0110978 A1* | 5/2013 | Gordon | H04N 21/4788 709/218 |
| 2013/0282748 A1* | 10/2013 | Liensberger | G06F 9/44526 707/766 |
| 2013/0332838 A1* | 12/2013 | Naggar | G06Q 30/0605 715/733 |
| 2014/0047488 A1* | 2/2014 | Kunisetty | H04N 21/482 725/93 |
| 2014/0123241 A1 | 5/2014 | Janssen | |
| 2014/0298169 A1* | 10/2014 | Williams | G06Q 50/10 715/716 |
| 2015/0150038 A1* | 5/2015 | Hao | G06F 21/41 725/31 |
| 2015/0244728 A1 | 8/2015 | Tao | |
| 2015/0363476 A1* | 12/2015 | Li | G06F 16/36 707/736 |
| 2015/0365729 A1* | 12/2015 | Kaya | H04N 21/6582 725/14 |
| 2017/0052962 A1* | 2/2017 | Chan | G06F 16/74 |
| 2017/0053032 A1* | 2/2017 | Liongosari | G06Q 30/0201 |
| 2017/0238039 A1* | 8/2017 | Sabattini | H04N 21/8113 705/14.73 |
| 2017/0339458 A1* | 11/2017 | Patel | H04L 67/535 |
| 2018/0277012 A1* | 9/2018 | Wen | G10G 1/00 |
| 2018/0336894 A1* | 11/2018 | Graham | G06F 16/3329 |
| 2019/0155997 A1 | 5/2019 | Vos | |
| 2019/0266185 A1* | 8/2019 | Rao | H04N 21/4758 |
| 2019/0272328 A1* | 9/2019 | Dubyak | G06F 40/40 |
| 2020/0053415 A1* | 2/2020 | Redmond | H04N 21/4627 |
| 2020/0159870 A1 | 5/2020 | Bowen | |
| 2020/0349581 A1* | 11/2020 | Petluru | G06Q 30/016 |
| 2021/0209199 A1 | 7/2021 | Slavin | |
| 2022/0103365 A1* | 3/2022 | Berent | G06F 21/10 |
| 2023/0095881 A1 | 3/2023 | Bhandaru | |
| 2023/0131942 A1* | 4/2023 | Thomas | H04N 21/44226 725/14 |
| 2024/0086642 A1* | 3/2024 | Seaward | G06F 40/216 |
| 2024/0370518 A1 | 11/2024 | Knorovich | |
| 2025/0139160 A1* | 5/2025 | Miller | H04N 21/251 |
| 2025/0220258 A1* | 7/2025 | Walker | H04N 21/2543 |
| 2025/0252032 A1* | 8/2025 | Shah | G06F 11/3428 |
| 2025/0371584 A1 | 12/2025 | Takeuchi | |

OTHER PUBLICATIONS

Ashley Belanger, "Pay-per-output? AI Firms blindsided by beefed up robots.txt instructions." Real Simple Licensing Sep. 10, 2025, 4 pgs.

Unknown, "Everything Enterprises Need to Know About Really Simple Licensing", Real Simple Licensing Oct. 1, 2025, 5 pgs.

* cited by examiner

500

"Play French Movie" 504

User Device 502
Media Player 506
DRM Module 508

Content Provider 524

Hosting Options

Hosted Provider 526

Common CDM 528

AI Managed Hosting 530

AI System 510
Request Processor 512
Provider Selector 514
Access Manager 516
Rights Enforcer 518
Playback Monitor 520
Usage Reporter 522

Access Credentials 532

Endpoint: https://cdn.provider.com/...
Token: abc123xyz...

Encryption Key: AES256...
Restrictions: 3 Devices, US Only

Fig. 5

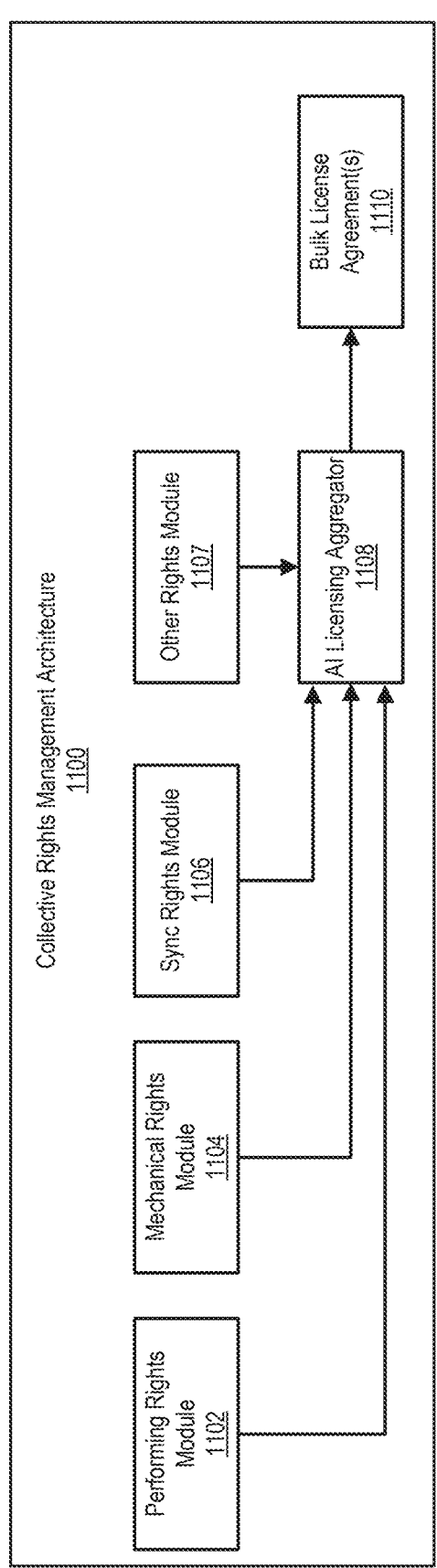
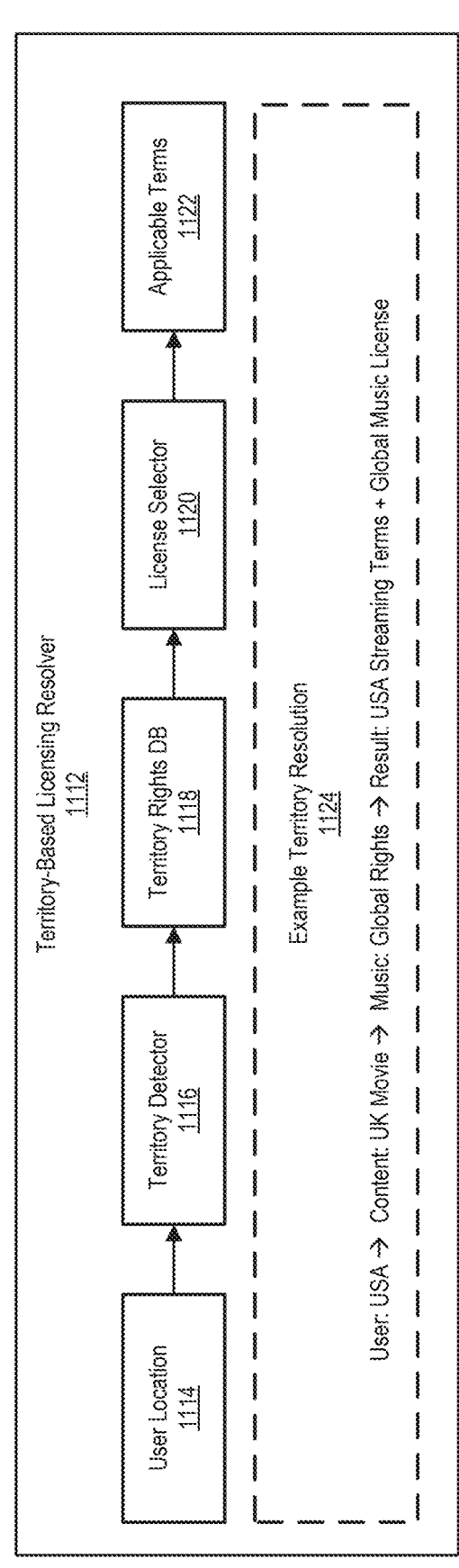
Fig. 11A

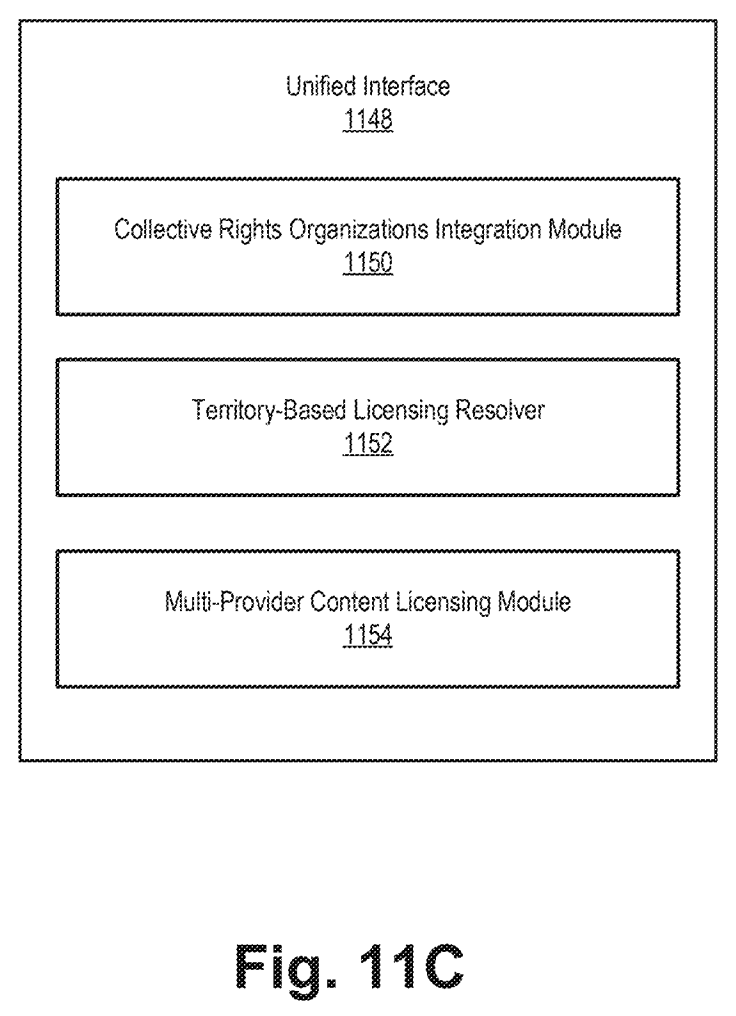

Unified Interface
1148

Collective Rights Organizations Integration Module
1150

Territory-Based Licensing Resolver
1152

Multi-Provider Content Licensing Module
1154

Fig. 11C

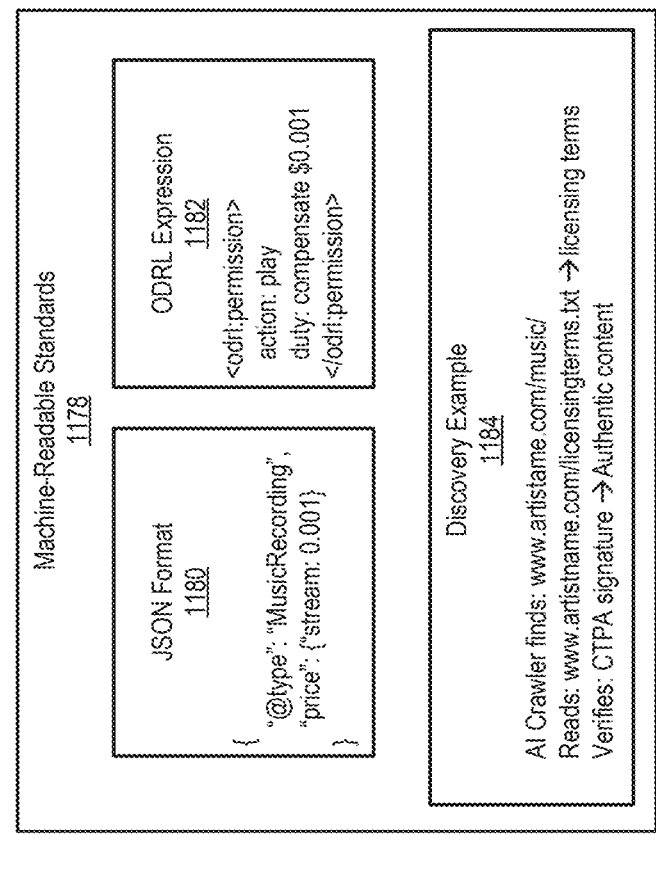

Machine-Readable Standards
1178

JSON Format
1180

{
"@type": "MusicRecording",
"price": {"stream: 0.001}
}

ODRL Expression
1182

<odrl:permission>
action: play
duty: compensate $0.001
</odrl:permission>

Discovery Example
1184

AI Crawler finds: www.artistame.com/music/
Reads: www.artistname.com/licensingterms.txt → licensing terms
Verifies: CTPA signature → Authentic content

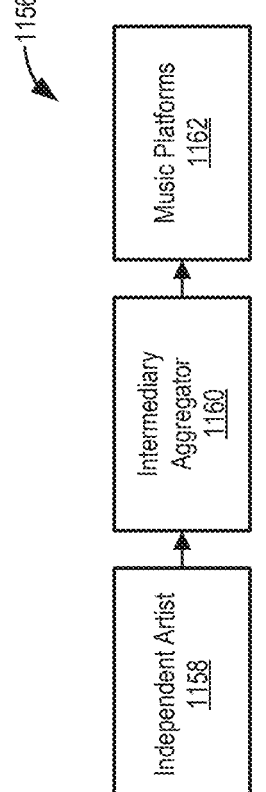

1156

Music Platforms
1162

Intermediary Aggregator
1160

Independent Artist
1158

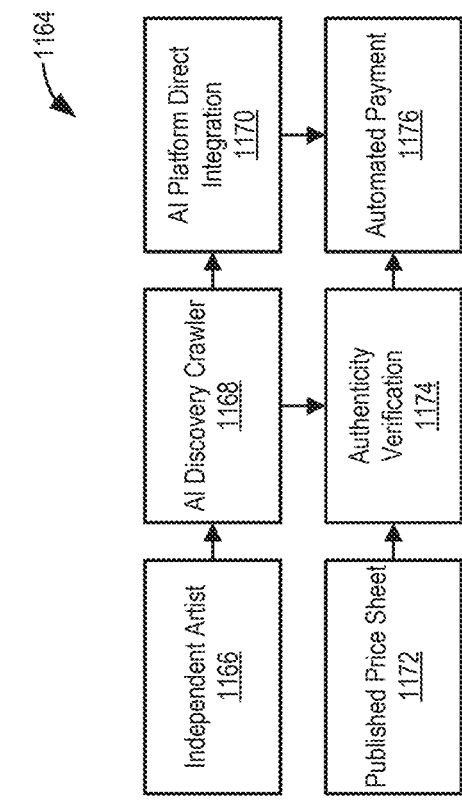

1164

AI Platform Direct Integration
1170

Automated Payment
1176

AI Discovery Crawler
1168

Authenticity Verification
1174

Independent Artist
1166

Published Price Sheet
1172

Fig. 11D

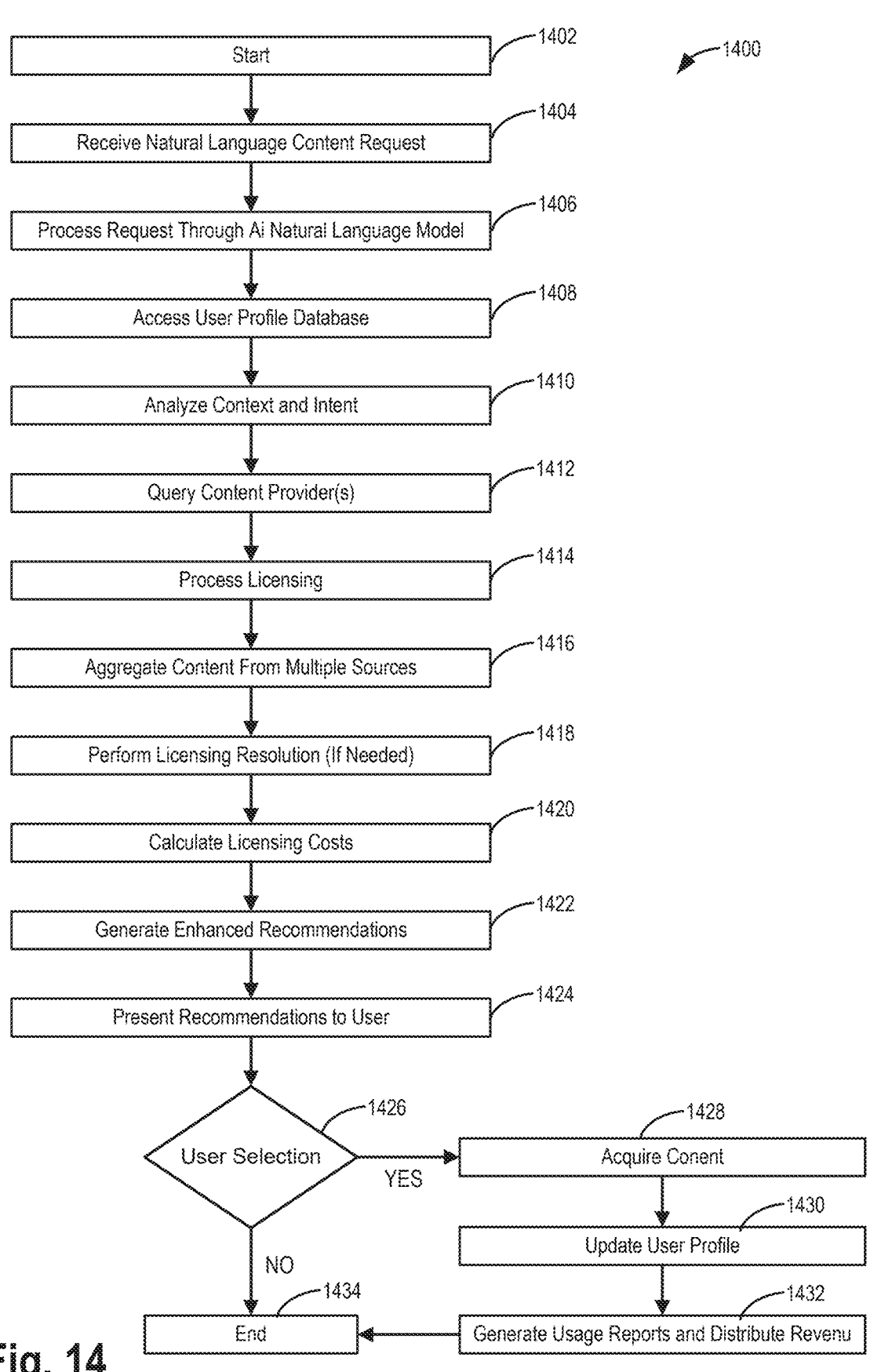

1402 — Start

1404 — Receive Natural Language Content Request

1406 — Process Request Through Ai Natural Language Model

1408 — Access User Profile Database

1410 — Analyze Context and Intent

1412 — Query Content Provider(s)

1414 — Process Licensing

1416 — Aggregate Content From Multiple Sources

1418 — Perform Licensing Resolution (If Needed)

1420 — Calculate Licensing Costs

1422 — Generate Enhanced Recommendations

1424 — Present Recommendations to User

1426 — User Selection

1428 — Acquire Conent

1430 — Update User Profile

1432 — Generate Usage Reports and Distribute Revenu

1434 — End

1400

YES

AI-BASED MEDIA AND PRODUCT AGGREGATION AND TRANSACTION MANAGEMENT

FIELD OF INVENTION

The present disclosure relates to content aggregation systems, and more particularly to AI content aggregation systems.

BACKGROUND

The distribution of digital media content and consumer products has traditionally relied on centralized aggregator platforms that serve as intermediaries between content creators or manufacturers and end consumers. These platforms, such as streaming services for music and video content, and e-commerce marketplaces for physical goods, provide unified access points where consumers can discover, purchase, and consume diverse content from multiple providers through a single interface.

Aggregator platforms typically offer several advantages including standardized user interfaces, consolidated payment processing, consistent pricing structures, centralized customer service, quality assurance mechanisms, and unified search and discovery capabilities across multiple content sources. These platforms also provide content providers and manufacturers with access to large consumer bases, marketing infrastructure, and technical distribution capabilities that would be difficult for individual providers to develop independently.

However, traditional aggregation models also present certain limitations. Content providers and manufacturers often face revenue sharing arrangements with aggregator platforms, which can reduce their profit margins. Additionally, these platforms may impose specific technical requirements, content formatting standards, or business terms that limit provider flexibility. The centralized nature of these platforms can also create dependencies where providers have limited control over pricing, presentation, or direct customer relationships.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method is provided. The method comprises receiving a request for media content from a user device, querying a plurality of content provider application programming interfaces to retrieve media catalog data, generating a list of media recommendations based on content obtained from the APIs, receiving a selection of a media item from the list, providing an acquisition request to a content provider system associated with the selected media item, and retrieving the selected media item from a hosting system.

According to another aspect of the present disclosure, the method may further comprise accessing a user profile stored in memory, the user profile comprising media consumption data and non-media activity data associated with the user. The method may generate media recommendations by calculating a base score for each media item based on the media consumption data, and modifying the base score based on correlations between the non-media activity data and metadata of each media item.

According to other aspects of the present disclosure, modifying the base score may comprise extracting location data from the non-media activity data, determining that metadata of a media item indicates a setting matching the location data, and increasing the base score for that media item based on the matching setting.

According to other aspects of the present disclosure, modifying the base score may comprise identifying a research topic in the non-media activity data, determining that a media item relates to the research topic, and increasing the base score for that media item.

According to other aspects of the present disclosure, each API may expose pricing data and/or licensing terms, where the pricing data may comprise rental price fields for defined time periods, purchase price fields, geographic availability fields, and device limit fields.

According to other aspects of the present disclosure, the licensing terms may comprise machine-readable licensing information in formats including robots.txt format with licensing extensions, Really Simple Licensing (RSL) format, Open Digital Rights Language (ODRL) format, or Creative Commons Rights Language format.

According to other aspects of the present disclosure, the method may further comprise parsing the licensing terms to extract compensation requirements and configuring payment parameters based on the extracted compensation requirements.

According to other aspects of the present disclosure, retrieving the selected media item may comprise receiving access credentials from the content provider system, where the access credentials may comprise a hosting endpoint URL, an authentication token valid for a specified duration, a decryption key, and enforceable playback restrictions.

According to other aspects of the present disclosure, the method may further comprise converting the request from natural language text into search parameters, and formatting the list of media recommendations as natural language text.

According to other aspects of the present disclosure, the method may further comprise monitoring playback events from the user device, updating the media consumption data in the user profile based on the monitored playback events, and transmitting aggregated usage metrics to the content provider system.

According to other aspects of the present disclosure, the non-media activity data may comprise at least one of calendar appointments extracted from a calendar application, travel destinations extracted from booking confirmations, purchase categories extracted from transaction records, or topics extracted from email content.

According to other aspects of the present disclosure, the method may further comprise verifying that the user device is included in a list of authorized devices, a current location of the user device satisfies geographic restrictions in the licensing terms, and a number of concurrent streams does not exceed a limit in the licensing terms.

According to another aspect of the present disclosure, a system is provided. The system may comprise a processor and a non-transitory computer-readable medium storing instructions that, when executed by the processor, cause the processor to perform operations. The operations comprise receiving a request for media content from a user device. The operations comprise accessing a user profile comprising media consumption data and non-media activity data. The operations comprise querying a plurality of content provider APIs to retrieve media catalog data with pricing data in a predetermined format. The operations comprise generating a list of media recommendations by calculating scores based on the media consumption data, and modifying the scores based on the non-media activity data. The operations comprise transmitting the list to the user device. The operations comprise receiving a selection from the list. The operations comprise transmitting an acquisition request to a content provider system. The operations comprise receiving access credentials for the selected media content.

According to other aspects of the present disclosure, the system may include one or more of the following features. Modifying the scores may comprise extracting location data from the non-media activity data, identifying media content having metadata matching the location data, and increasing a score for the identified media content. The operations may further comprise storing the media catalog data in cache memory and updating the cached media catalog data at predetermined intervals. The operations may further comprise converting the request from natural language text into search parameters and formatting the list as natural language text. The operations may further comprise receiving playback customization parameters from the user device and transmitting the playback customization parameters with the access credentials. The operations may further comprise exporting the user profile to a data structure having a defined schema and transmitting the data structure to a second artificial intelligence system in response to receiving a user authorization. The operations may further comprise monitoring playback events for the selected media content, transmitting usage metrics to the content provider system, and updating the media consumption data in the user profile. The operations may further comprise verifying a playback device against authorized device identifiers, confirming a user location satisfies geographic restrictions, and preventing playback when a concurrent stream limit is exceeded.

According to another aspect of the present disclosure, a computer-implemented method for automated licensing management is provided. The method comprises detecting, by a processor, multiple licensing protocols from content provider systems, including at least two of robots.txt extensions, Open Digital Rights Language, or Creative Commons Rights Language. The method comprises parsing, by the processor, licensing terms from each detected protocol into a normalized data structure. The method comprises identifying, by the processor, action-based permissions and compensation requirements from the parsed licensing terms. The method comprises aggregating, by the processor, the normalized licensing terms into a unified licensing model. The method comprises calculating, by the processor, total licensing fees by summing component fees from multiple rights holders for a single content item. The method comprises distributing, by the processor, payments to the multiple rights holders according to predetermined percentage allocations.

According to other aspects of the present disclosure, the method may include one or more of the following features. The method may further comprise detecting geographic restrictions in the licensing terms, determining a user location from a user device, selecting applicable licensing terms based on the user location, and enforcing territorial restrictions before content delivery. Parsing licensing terms may comprise extracting per-reference pricing from ODRL duty elements, extracting subscription caps from robots.txt extensions, and mapping custom licensing schemas to the normalized data structure.

According to another aspect of the present disclosure, a system for managing multi-provider content licensing is provided. The system comprises a licensing parser configured to detect and parse multiple licensing protocol formats. The system comprises a protocol detector configured to identify licensing schema types and extract pricing models. The system comprises a rights aggregator configured to combine video rights from a first provider, combine music rights from a second provider, combine subtitle rights from a third provider, and generate a unified license with cumulative pricing. The system comprises a payment engine configured to process micro-payments and distribute revenues according to rights holder percentages.

According to other aspects of the present disclosure, the system may include one or more of the following features. The system may further comprise a territory resolver configured to access a territory rights database, determine applicable licensing based on user location, and combine territorial content rights with global licensing agreements. The system may further comprise a collective rights integration module configured to interface with performing rights organizations, mechanical rights organizations, and synchronization rights organizations, and an AI licensing aggregator configured to generate bulk license agreements from multiple collective rights sources.

According to another aspect of the present disclosure, a computer-implemented method for flexible content monetization is provided. The method comprises implementing, by a processor, multiple concurrent payment models including pre-access models with per-crawl, per-query, and per-display tiers, subscription models with fixed monthly and tiered access options, and hybrid models with freemium and revenue sharing arrangements. The method comprises tracking, by the processor, usage metrics across payment models using crawl counters, query loggers, and view trackers. The method comprises aggregating, by the processor, usage data into unified billing statements. The method comprises processing, by the processor, payments through a unified payment gateway supporting multiple payment methods.

According to other aspects of the present disclosure, the method may include one or more of the following features. The per-crawl tier may charge $0.001 per page for AI training access, the per-query tier may charge $0.01 per use for influence-based access, and the per-display tier may charge $0.05 per view for user-facing display. The method may further comprise buffering up to 10,000 transaction events in a queue, batch processing transactions by provider, and executing daily settlement at a predetermined time.

According to another aspect of the present disclosure, a computer-implemented method for automated provider onboarding is provided. The method comprises receiving, at a registration portal, API endpoint specifications from a new provider. The method comprises validating, by a processor, that the API conforms to required schemas including endpoint URLs, authentication methods, and response formats. The method comprises parsing, by the processor, machine-readable licensing terms from the provider. The method comprises ingesting, by the processor, a content catalog from the provider API. The method comprises executing, by the processor, automated tests to verify end-to-end functionality. The method comprises upon successful validation, adding the provider to an active provider database.

According to other aspects of the present disclosure, the method may include one or more of the following features. Validating may comprise verifying support for at least one of RESTful protocols, OAuth 2.0 authentication, JSON or XML response formats, and machine-readable licensing expressions.

According to another aspect of the present disclosure, a content licensing management system is provided. The system comprises a protocol detection module configured to identify and parse at least three different licensing protocol formats from content providers. The system comprises a licensing normalization engine configured to convert heterogeneous licensing formats into a unified data schema. The system comprises a rights aggregation processor configured to combine multiple licensing components for a single content item from different rights holders. The system comprises a territorial resolution module configured to apply geographic-specific licensing terms based on user location data. The system comprises a payment distribution engine configured to automatically allocate revenues among multiple rights holders according to predetermined percentages. The system comprises a compliance tracking database configured to maintain immutable audit records of licensing transactions.

According to other aspects of the present disclosure, the system may include one or more of the following features. The protocol detection module may comprise a robots.txt parser configured to extract licensing terms from extended robots.txt files, an ODRL interpreter configured to process Open Digital Rights Language policies, a Creative Commons processor configured to handle CC license variations, and a custom schema mapper configured to translate proprietary licensing formats. The rights aggregation processor may be configured to identify video content rights with associated studio pricing, identify music rights with publisher compensation requirements, identify subtitle rights with localization fees, calculate cumulative licensing costs, and generate a unified license structure with itemized component pricing. The system may further comprise a collective rights interface configured to connect with performing rights organizations, mechanical rights organizations, and synchronization rights organizations, an AI-powered aggregator configured to negotiate and compile bulk licensing agreements from multiple collective rights sources, and a cache manager configured to store frequently accessed licensing terms with automatic expiration and renewal.

According to another aspect of the present disclosure, a payment processing system for content monetization is provided. The system comprises a payment model engine supporting simultaneous operation of pre-access payment modules with per-crawl, per-query, and per-display tiers, subscription payment modules with fixed and tiered access levels, and hybrid payment modules with freemium and revenue-sharing options. The system comprises a usage tracking subsystem comprising crawl counters for automated access monitoring, query loggers for search activity tracking, view trackers for content consumption monitoring, and time meters for temporal usage measurement. The system comprises a billing aggregator configured to consolidate usage metrics across payment models into unified statements. The system comprises a settlement processor configured to execute batch payments at scheduled intervals.

According to other aspects of the present disclosure, the system may include one or more of the following features. The pre-access payment modules may comprise a crawl tier module configured to charge micro-payments of $0.001 per page for training data access, a query tier module configured to charge $0.01 per use for influence-based content access, and a display tier module configured to charge $0.05 per view for end-user content display. The system may further comprise a transaction queue with a buffer capacity of at least 10,000 events, a batch processor configured to combine transactions by provider identity, and a scheduled settlement module configured to execute daily payments at predetermined UTC times. The system may further comprise a provider dashboard interface displaying real-time revenue metrics, an analytics module generating usage pattern reports, a compliance audit trail maintaining transaction records for regulatory review, and a multi-gateway payment processor supporting wire transfers, cryptocurrency, and API-based transfers.

According to another aspect of the present disclosure, an automated provider onboarding system is provided. The system comprises a registration portal configured to receive API specifications and licensing terms from content providers. The system comprises a validation pipeline comprising an API schema validator verifying endpoint compliance, a licensing parser extracting machine-readable terms, a catalog ingestion module importing content metadata, a rights verification module confirming distribution authority, an automated test suite executing functionality verification, and a certification module issuing provider approval. The system comprises an active provider database maintaining validated provider configurations. The system comprises a hosting configuration manager supporting provider-hosted, CDN-based, and AI-managed delivery options.

According to other aspects of the present disclosure, the system may include one or more of the following features. The API schema validator may be configured to verify RESTful endpoint accessibility at specified URLs, OAuth 2.0 or custom authentication implementation, JSON or XML response format compliance, presence of required data fields including pricing, licensing, and availability, and response time performance within specified thresholds. The licensing parser may be configured to process fixed pricing models with rental and purchase options, dynamic pricing models with time-based variations, subscription models with multiple tier definitions, hybrid models combining multiple pricing strategies, and micro-payment models for fractional content access.

According to another aspect of the present disclosure, a unified licensing interface system is provided. The system comprises a collective rights management layer interfacing with multiple rights organizations. The system comprises a territorial licensing layer resolving geographic-specific access permissions. The system comprises a multi-provider licensing layer aggregating rights from multiple content owners. The system comprises a centralized orchestration engine coordinating across three layers. The system comprises a standardized API exposing unified licensing queries to external systems. The system comprises a real-time synchronization module maintaining consistency across licensing decisions.

According to other aspects of the present disclosure, the system may include one or more of the following features. The territorial licensing layer may comprise a location detection module identifying user geographic positions, a territory rights database mapping content availability by region, a license selector choosing applicable terms based on territorial rules, and a restriction enforcer blocking access for unauthorized territories. The centralized orchestration engine may be configured to receive a content request with user location and profile data, simultaneously query three licensing layers, resolve conflicts between different licensing requirements, generate a consolidated licensing decision, and provide detailed justification for access grants or denials.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 5 illustrates a system architecture for content delivery and rights management, according to aspects of the present disclosure.

FIG. 11A illustrates a system architecture comprising collective rights organizations integration and territory-based licensing resolution modules, according to aspects of the present disclosure.

FIG. 11C illustrates a unified interface for managing content licensing and rights across multiple functional domains, according to aspects of the present disclosure.

FIG. 11D illustrates system architectures depicting traditional and direct publishing pathways for content distribution, according to aspects of the present disclosure.

FIG. 14 illustrates a method for AI-powered content aggregation and distribution with natural language processing, multi-provider querying, and/or automated licensing compliance, according to aspects of the present disclosure.

DETAILED DESCRIPTION

Figure 1:
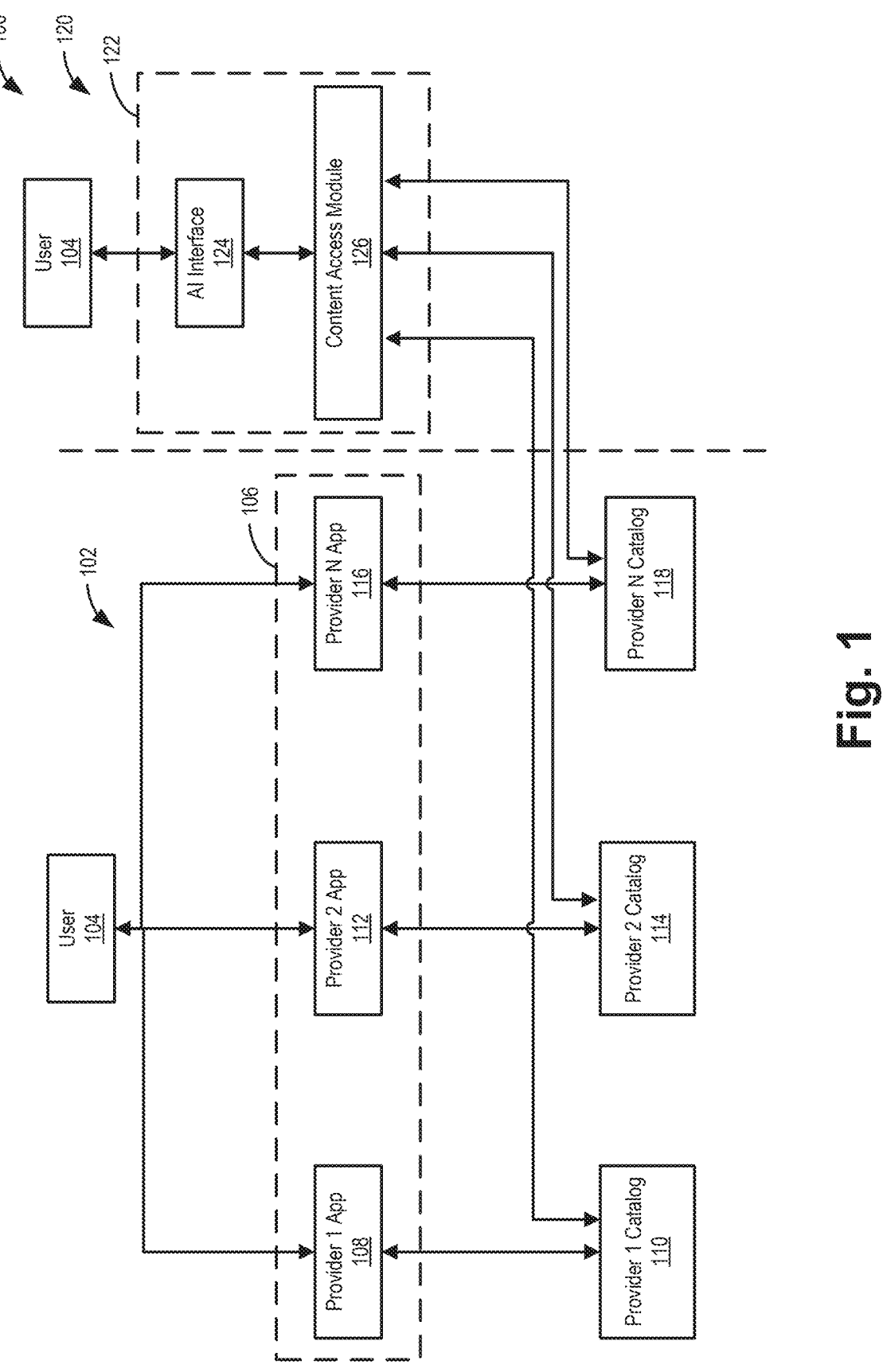
FIG. 1 illustrates a system architecture for providing centralized access to multiple provider applications, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to systems and methods for enabling artificial intelligence agents to function as dynamic intermediaries in media and product distribution ecosystems. Traditional content distribution models rely on centralized aggregator platforms that serve as intermediaries between content creators and consumers. These platforms typically provide unified access points, standardized interfaces, pricing consistency, and various quality assurance features. However, with the advancement of conversational AI systems capable of interacting with disparate web resources and processing complex user requests, an opportunity exists for AI agents to assume aggregation functions directly.

In some aspects, AI systems may operate as intelligent aggregators that create abstraction layers between users and multiple content sources. These AI agents may replicate or exceed traditional aggregator functions while enabling more direct interactions between content creators, manufacturers, and consumers. The AI-based approach may provide enhanced personalization capabilities by analyzing user preferences, consumption patterns, and contextual information to deliver more targeted content recommendations and acquisition services. In some aspects, systems may incorporate mechanisms that allow content creators and product producers to expose their offerings through various discovery methods. These methods may include application programming interfaces, decentralized records, crawlable websites with machine-readable data, or other automated discovery mechanisms. Through these interfaces, content providers may supply metadata, media assets, product descriptions, ratings, inventory information, pricing data, shipping costs, and licensing terms in formats that AI systems can process and interpret.

AI agents operating within these systems may support dynamic pricing negotiations, licensing arrangements, and rules enforcement. The systems may implement content protection measures including digital rights management for media playback, device restrictions, usage limits, and encryption protocols. In some aspects, systems may incorporate verification protocols that validate volatile information such as shipping costs, currency exchange rates, and inventory levels before completing purchase transactions.

User personalization data may be stored and managed by AI systems or through independent third-party services to enable cross-platform personalization and universal access across multiple AI agents. Payment integration may occur natively within AI platforms or through third-party payment processors, with additional features for fraud prevention and spending controls. Customer support may be implemented through layered approaches, with AI systems handling initial support based on product metadata and escalating complex issues to human operators, content providers, or manufacturers as appropriate.

Referring to FIG. 1, a system architecture 100 may provide centralized access to multiple provider applications and their associated catalogs through different interface approaches. The system architecture 100 depicts a traditional media model 102 and an AI-interface model 120 that enable users to access content through distinct pathways. In some aspects, the traditional media model 102 may allow direct connections between users and individual provider applications, while the AI-interface model 120 may provide a unified interface that aggregates access to multiple provider catalogs simultaneously. The system architecture 100 may accommodate various content discovery mechanisms, including application programming interfaces, decentralized records, crawlable websites with machine-readable data, or other automated discovery protocols that enable content providers to expose their offerings to AI systems.

The traditional media model 102 may include a user 104 who interacts with a user device 106 to establish connections with multiple provider applications 108, 112, and/or 116. The user device 106 may be any computing device capable of running provider applications, such as a smartphone, tablet, smart TV, or personal computer. The first provider catalog 110 may include structured data fields for content titles, descriptions, genres, release dates, cast information, ratings, and technical specifications such as resolution and audio formats. A second provider application 112 may similarly connect to a second provider catalog 114, providing access to a different collection of media or product offerings. Each provider catalog may contain thousands or millions of content items, including movies, television shows, music, games, or other digital media. The traditional media model 102 may support expansion to include an nth provider application 116 connected to an nth provider catalog 118, where n represents any number of additional provider applications that may be integrated into the system architecture 100. The scalability of the traditional model may be limited by the user's ability to manage multiple separate interfaces and authentication credentials. In some aspects, each provider application may maintain independent interfaces, authentication systems, and/or user management protocols, necessitating users to navigate separate systems for accessing different content sources. This fragmentation may result in users maintaining multiple subscriptions, passwords, and payment methods across different provider platforms. Users may experience cognitive overhead from learning and remembering different interface conventions, search functionalities, and content organization schemes across multiple provider applications.

With continued reference to FIG. 1, the AI-interface model 120 may provide an alternative approach that consolidates access to multiple provider catalogs through a unified interface system. A user device 122 may establish communication with an AI interface 124 that serves as an intelligent intermediary between users and content providers. The AI interface 124 may be operatively coupled to a content access module 126 that maintains connections with the first provider application 108, second provider application 112, and nth provider application 116. In some aspects, the content access module 126 may aggregate information from the first provider catalog 110, second provider catalog 114, and nth provider catalog 118, enabling the AI interface 124 to provide responses and recommendations based on data from multiple provider sources simultaneously.

The content access module 126 may implement various discovery mechanisms to identify and access content from provider catalogs. In some aspects, content providers may expose their offerings through standardized application programming interfaces that provide structured access to catalog data, pricing information, and licensing terms. These APIs may utilize protocols such as REST or GraphQL to facilitate integration with third-party systems. API endpoints may support batch operations, pagination, filtering, and sorting to enable efficient data retrieval for large catalog queries. Decentralized record systems may enable content providers to publish catalog information in distributed databases that AI systems can query and aggregate. Such systems may include blockchain-based registries or peer-to-peer networks that ensure data integrity and availability without central points of control. Smart contracts may automate licensing agreements and payment settlements between content providers and distribution platforms. Crawlable websites with machine-readable data may allow AI agents to automatically discover and index content offerings through web scraping and structured data parsing. These websites may implement semantic markup using standards like Schema.org to facilitate automated content extraction. Web crawlers may respect robots.txt directives and implement rate limiting to avoid overwhelming provider servers while maintaining up-to-date catalog information. Other discovery mechanisms may include direct database connections, file-based catalog exchanges, or custom integration protocols that accommodate specific provider requirements or technical constraints. The content access module 126 may dynamically select the most appropriate discovery mechanism for each provider based on factors such as data freshness requirements, query complexity, and available bandwidth. The content access module 126 may maintain a registry of supported discovery mechanisms for each provider and implement fallback strategies when primary access methods become unavailable.

The traditional media model 102 and/or the AI-interface model 120 may support various business models and revenue sharing arrangements between content providers, platform operators, and AI interface providers. In the traditional media model 102, each provider application may independently monetize through subscriptions, rentals, purchases, or advertising, with revenue flowing directly from users to providers. The AI-interface model 120 may enable new monetization strategies such as bundled subscriptions, dynamic pricing based on aggregate demand, or revenue sharing based on content discovery attribution. The content access module 126 may track content discovery paths and user engagement metrics to fairly allocate revenue when users access content through the AI interface 124. Commission structures, referral fees, or subscription revenue sharing agreements may be automatically calculated and settled through the system architecture 100, potentially using smart contracts or other automated settlement mechanisms.

Figure 2:
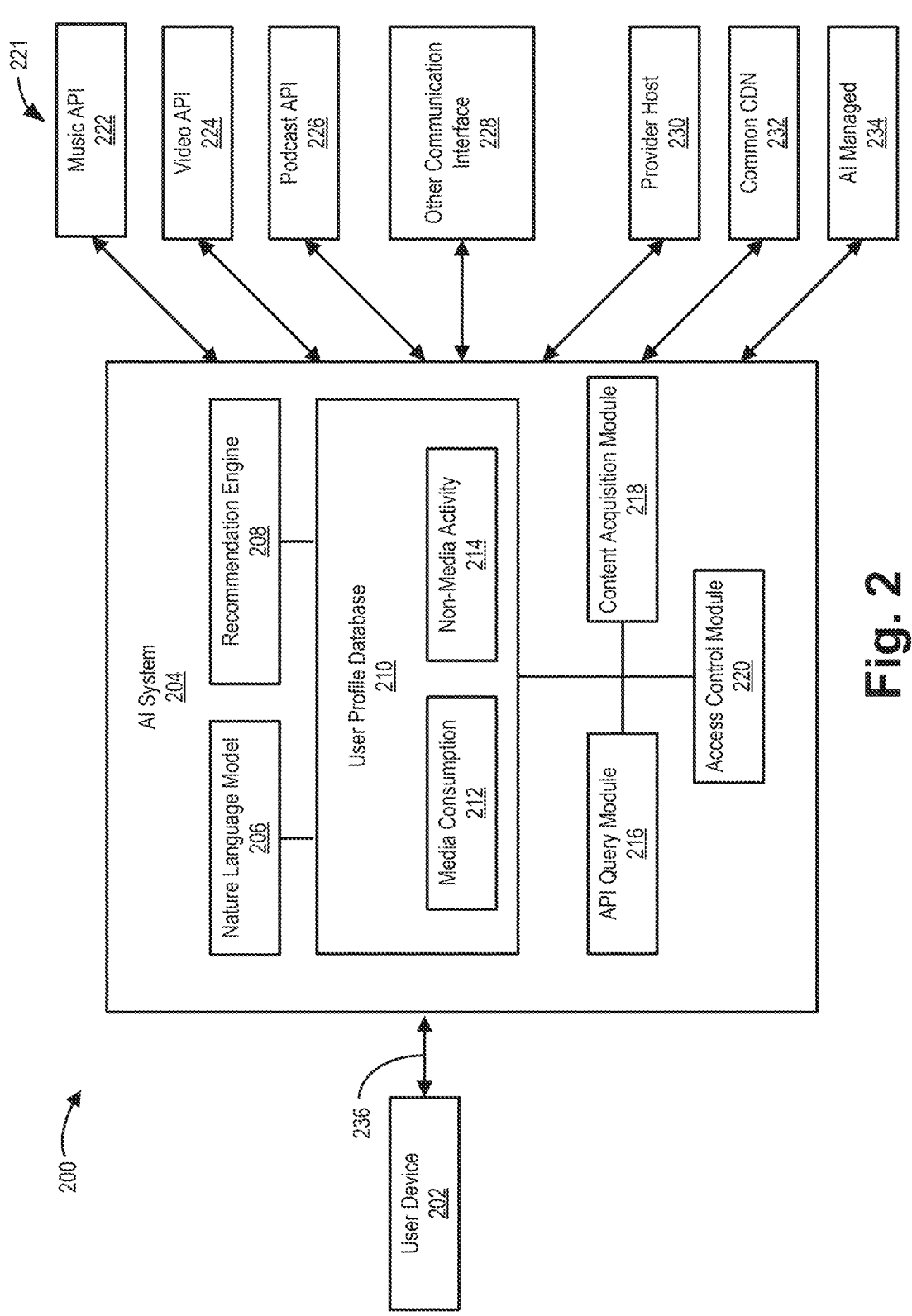
FIG. 2 illustrates a system architecture for AI-based media and product aggregation and transaction management, according to aspects of the present disclosure.

Referring to FIG. 2, a system architecture 200 may provide AI-based media and product aggregation capabilities through integrated processing modules and external service connections. The system architecture 200 may include a user device 202 that establishes bidirectional communication with an AI system 204 through a communication path 236. The user device 202 may comprise various computing devices including smartphones, tablets, personal computers, smart televisions, voice-activated assistants, or other network-enabled devices capable of transmitting user inputs and receiving content or responses from the AI system 204. The user device 202 be the same as or similar to the user device 122 of FIG. 1. In some aspects, the communication path 236 may enable real-time data exchange between users and AI processing components, facilitating natural language interactions and content delivery operations. The communication path 236 may utilize various protocols and technologies including HTTP/HTTPS, WebSocket connections, REST APIs, or proprietary communication protocols that may be optimized for low-latency interactions. In some aspects, the AI system 204 may serve as a central processing hub that coordinates multiple specialized modules to handle user requests, content discovery, and transaction management across diverse provider ecosystems. In some aspects, the AI system 204 is the same as or similar to the content access module 126 of FIG. 1.

The AI system 204 may incorporate a natural language module 206 that processes and interprets conversational inputs from users through the user device 202. In some aspects, the natural language module 206 may analyze linguistic patterns, extract intent information, and convert unstructured user requests into structured queries that other system components can process. The natural language module 206 may support multiple languages and dialects, enabling global content access and user interaction capabilities. In some aspects, the natural language module 206 may maintain conversation context across multiple user interactions, enabling multi-turn dialogues and clarification requests when user intent and/or a user request is ambiguous and/or additional information is needed from a user. A recommendation engine 208 may operate in conjunction with the natural language module 206 to generate personalized content suggestions based on user preferences, consumption patterns, and contextual information. The recommendation engine 208 may employ machine learning algorithms to analyze user behavior and predict content preferences across different media types and product categories. These algorithms may include, but are not limited to, collaborative filtering, content-based filtering, hybrid approaches, and/or deep learning models that may improve recommendation accuracy through user feedback and interaction data.

A user profile database 210 may maintain user information that supports personalization and recommendation functions within the AI system 204. The user profile database 210 may implement data structures optimized for rapid retrieval and update operations, potentially utilizing one or both relational and NoSQL database technologies to accommodate different data types and access patterns. The user profile database 210 may store media consumption information 212 that tracks user interactions with various content types, including playback history, rating data, skip patterns, and engagement metrics. This media consumption information 212 may be organized chronologically, categorically, or through hybrid indexing schemes that facilitate efficient querying and analysis operations. In some aspects, the media consumption information 212 may include temporal data that captures when and how users consume content, enabling the recommendation engine 208 to consider time-based preferences and usage patterns. For example, the AI system 204 may track that a user prefers podcasts during morning commutes, music during exercise sessions, and video content during evening relaxation periods. The user profile database 210 may contain non-media activity information 214 that encompasses user behaviors and interests outside of direct media consumption. The non-media activity information 214 may include calendar events, travel destinations, purchase categories, email topics, and other contextual data that may influence content recommendations and personalization strategies. This contextual information may be obtained through user-authorized integrations with external services, manual user input, or inference based on observed patterns in user behavior.

With continued reference to FIG. 2, the user profile database 210 may be configured to support access by multiple AI agents under user-specified permissions, enabling cross-AI personalization and universal access across different platforms and services. The user profile database 210 may implement access control lists (ACLs) and role-based access control (RBAC) mechanisms to manage these permissions in an effective and efficient manner. In some aspects, users may grant selective access to portions of their profile data, allowing different AI systems to leverage shared preference information while maintaining privacy controls over sensitive data. The user profile database 210 may implement permission matrices that define which data elements can be accessed by specific AI agents and under what conditions. These permission matrices may support granular control, allowing users to specify access permissions at the field level, implement time-based access restrictions, or require additional authentication for sensitive data access. This cross-platform accessibility may enable users to maintain consistent personalization experiences when transitioning between different AI-powered services or platforms. The system may implement data synchronization protocols to ensure that profile updates made through one AI agent are appropriately propagated to other authorized agents, maintaining consistency across the ecosystem.

The AI system 204 may include an API query module 216 that manages communications with external content providers and service platforms. The API query module 216 may maintain a registry of available APIs, their endpoints, supported operations, rate limits, and/or authentication requirements. The API query module 216 may format requests according to provider-specific protocols, handle authentication procedures, and process responses from multiple provider systems simultaneously. The API query module 216 module may implement request queuing, throttling, and retry mechanisms to comply with provider-imposed rate limits while maximizing throughput and minimizing latency. In some aspects, the API query module 216 may implement caching mechanisms to optimize performance and reduce redundant requests to external services. The caching layer may employ intelligent cache invalidation strategies based on content type, update frequency, and provider-specified cache control headers. A content acquisition module 218 may work in conjunction with the API query module 216 to handle the procurement and licensing of content from various providers. The content acquisition module 218 may negotiate pricing terms, process licensing agreements, and/or coordinate content delivery through appropriate channels based on provider requirements and user preferences. This module may maintain records of licensing terms, usage rights, geographical restrictions, and/or expiration dates to ensure compliance with content provider agreements.

An access control module 220 may manage authentication, authorization, and/or security functions within the AI system 204. The access control module 220 may implement multi-factor authentication protocols, biometric verification systems, and/or device fingerprinting techniques to improve security while maintaining user convenience. The access control module 220 may verify user identities, enforce content access restrictions, and implement digital rights management protocols as specified by content providers. The access control module 220 may maintain secure session tokens, implement token refresh mechanisms, and monitor for suspicious activity patterns that might indicate unauthorized access attempts. In some aspects, the access control module 220 may coordinate with external authentication systems and maintain session management across multiple provider connections. This coordination may include support for single sign-on (SSO) protocols such as OAuth 2.0, SAML, or OpenID Connect, enabling users to access multiple services with a single authentication event. The access control module 220 may implement fraud prevention measures and spending controls when processing payment transactions, through native payment processing capabilities and/or integration with third-party payment processors such as PayPal. The fraud prevention measures may include velocity checks, anomaly detection algorithms, and real-time risk scoring to identify and prevent potentially fraudulent transactions.

The AI system 204 may establish connections with various external services 221 to support content aggregation and delivery functions. These connections may be established through secure channels utilizing encryption protocols such as TLS/SSL to protect data in transit. In some aspects, a music API 222 may provide access to music streaming services, catalog databases, and/or audio content providers. The music API 222 may interface with multiple music platforms simultaneously, aggregating catalog information, availability status, and/or licensing terms to present users with music discovery and playback options. The music API 222 may support various audio formats, quality levels, and/or licensing arrangements that accommodate different user preferences and device capabilities. This may include support for lossless audio formats for audiophile users, adaptive bitrate streaming for mobile users, and/or offline download capabilities for users with limited connectivity. A video API 224 may enable integration with video streaming platforms, movie databases, and/or visual content providers. The video API 224 may handle content metadata retrieval, availability checking, and/or stream initialization across different video platforms, providing users with unified access to diverse video content sources. In some aspects, the video API 224 may handle different video resolutions, encoding formats, and/or subtitle options to support diverse viewing requirements and accessibility needs. The video API 224 may support advanced features such as multi-language audio tracks, closed captions, audio descriptions for visually impaired users, and/or parental control settings. A podcast API 226 may facilitate access to podcast directories, audio show catalogs, and/or episodic content providers. The podcast API 226 may support subscription management, episode tracking, and/or offline download capabilities for podcast content. Additionally, the podcast API 226 may implement features such as playback speed adjustment, chapter navigation, and/or synchronized playback positions across devices to enhance the podcast listening experience.

As further shown in FIG. 2, the AI system 204 may interface with additional external services through the other communication interface 228 that may provide connectivity options for specialized protocols, custom integrations, and/or emerging service types. The other communication interface 228 may implement protocol adapters, data format converters, and/or middleware components that facilitate integration with diverse external systems without requiring modifications to the core AI system architecture. The other communication interface 228 may accommodate future expansion of the system architecture 200 to include new content types and/or provider categories without requiring modifications to core system components. The interface may support plugin architectures, webhook integrations, and/or event-driven communication patterns to enable flexible and/or scalable system expansion.

A provider host 230 may manage connections to various content provider hosting services, coordinating content delivery through provider-managed infrastructure. The provider host 230 may implement connection pooling, load distribution algorithms, and/or health checking mechanisms to maintain optimal connectivity with provider systems. The provider host 230 may handle load balancing, geographic distribution, and/or failover procedures to maintain reliable content access across different provider systems. This may include implementing circuit breaker patterns to prevent cascade failures, maintaining backup provider connections, and/or dynamically routing requests based on provider availability and performance metrics.

A content delivery network 232 may provide distributed content caching and delivery capabilities that optimize performance and reduce latency for users accessing content through the AI system 204. The content delivery network 232 may implement intelligent content pre-fetching algorithms that anticipate user content requests based on historical patterns and current context. In some aspects, the content delivery network 232 may cache frequently accessed content at edge locations to improve response times and reduce bandwidth requirements for content providers. The CDN may employ cache warming strategies, content popularity prediction models, and/or geographic distribution algorithms to optimize cache utilization and hit rates. An AI managed module 234 may provide integration with external AI management and orchestration services that support system scaling, resource allocation, and/or performance optimization. The AI managed module 234 may interface with machine learning operations (MLOps) platforms, model versioning systems, and/or experience tracking tools to facilitate continuous improvement of AI components. The AI managed module 234 may coordinate with cloud computing platforms, container orchestration systems, and/or distributed processing frameworks to maintain system performance under varying load conditions. The AI managed module 234 may implement auto-scaling policies, resource monitoring dashboards, and/or performance analytics to ensure optimal system operation while managing operational costs.

Figure 3:
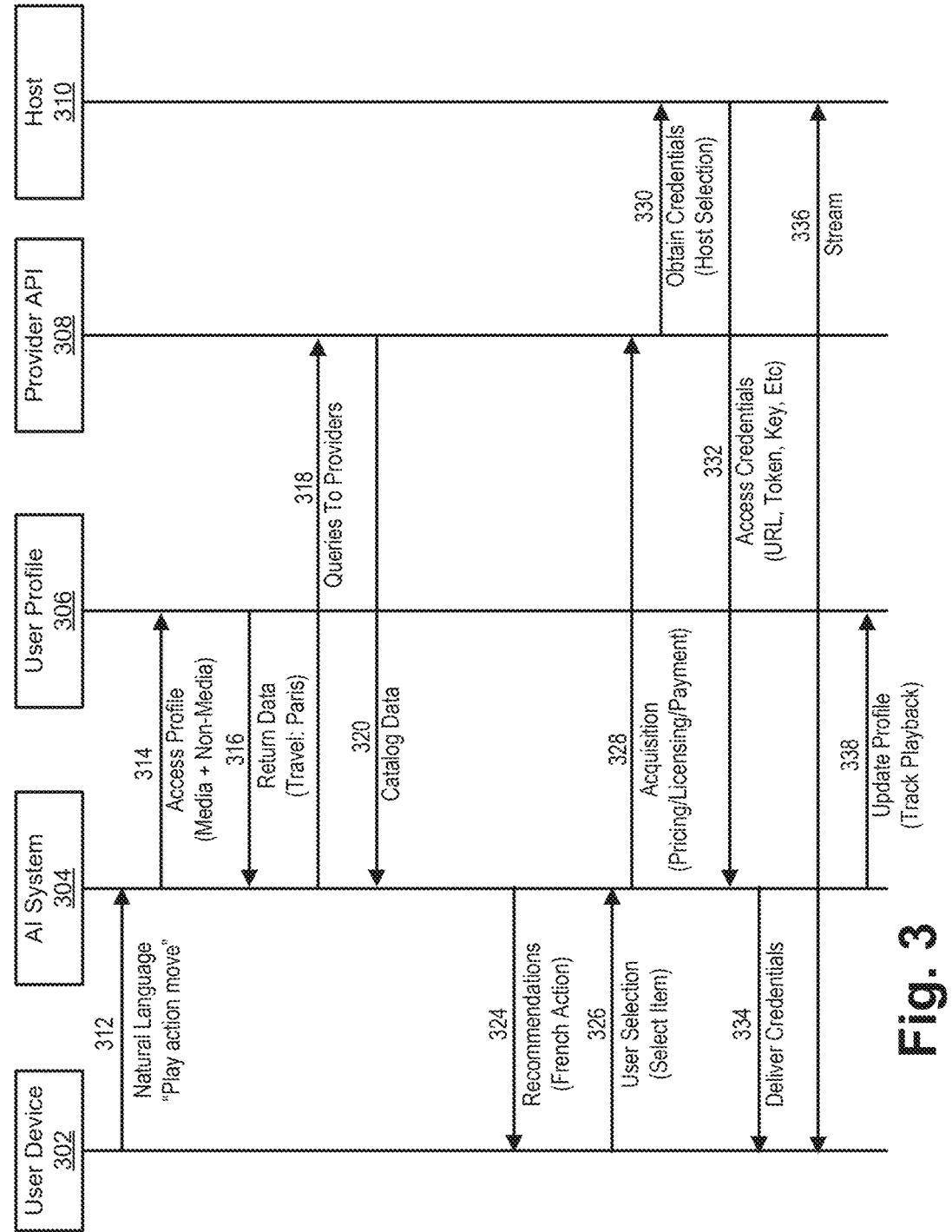
FIG. 3 illustrates a sequence diagram representing interactions between system components for processing user requests, according to aspects of the present disclosure.

Referring to FIG. 3, a user may initiate content access via a user device 302 using natural language communication with an AI system 304 that coordinates multiple processing components to fulfill user requests. In some aspects, the AI system 304 may be the same as or similar to the AI system 204 of FIG. 2. The AI system 304 may establish communication pathways with a user profile 306, a provider API 308, and a host 310 to perform a content discovery and delivery sequence. In some aspects, the operational flow may begin when the user device 302 transmits conversational requests that the AI system 304 processes through natural language interpretation algorithms. The sequence depicted in FIG. 3 demonstrates how AI-based aggregation systems can handle complex user interactions while coordinating with multiple external services to provide seamless content access and delivery.

The operational sequence depicted in FIG. 3 may start at step 312 when the user device 302 sends a natural language request to the AI system 304. In some aspects, the natural language request may include conversational phrases such as "Play action movie" that require linguistic analysis and/or intent extraction to determine an appropriate system responses. The AI system 304 may process the natural language input through parsing algorithms that identify content categories, user preferences, and contextual requirements embedded within the conversational request. The natural language processing capabilities may enable users to express content desires in natural, conversational formats rather than structured query languages or specific search parameters. The AI system 304 may employ contextual understanding capabilities to disambiguate vague requests, such as distinguishing between "action" as a genre versus "Action" as a movie title, and/or interpreting temporal references like "latest" or "new" based on release dates and regional availability.

Following the initial request processing, the AI system 304 may execute step 314 by accessing the user profile 306 to retrieve personalization data that informs content recommendation and selection processes. The user profile 306 may contain user information including consumption history, preference patterns, demographic data, and contextual information that influences content suggestions. In some aspects, the user profile 306 is the same as or similar to a user profile in the user profile database 210. In some aspects, the user profile access may involve authentication procedures and permission verification to ensure appropriate data access while maintaining user privacy and security controls. At step 316, the user profile 306 may return relevant data to the AI system 304, providing information such as location data, travel preferences, or other contextual elements that may influence content recommendations.

The AI system 304 may proceed to step 318 by transmitting queries to the provider API 308 based on the processed user request and retrieved profile information. In some aspects, the provider API queries may include search parameters derived from natural language analysis, user preference data, and contextual information to identify relevant content from provider catalogs. The provider API 308 may process these queries against content databases, availability information, and licensing terms to identify suitable content options. The AI system 304 may support dynamic pricing and licensing negotiations between AI agents and content providers in real-time during the query process, enabling flexible pricing arrangements and licensing terms that adapt to current market conditions and user requirements.

At step 320, the provider API 308 may return catalog data to the AI system 304, providing available content options that match the query parameters and user profile information based on the user profile 306. The catalog data may include content metadata, pricing information, availability status, licensing terms, and/or technical specifications that enable the AI system 304 to evaluate content options to be presented to the user. In some aspects, the catalog data may include multiple content variants with different pricing models, quality levels, and/or access restrictions that provide users with selection options. The AI system 304 may analyze the returned catalog data to generate personalized recommendations that consider user preferences, content quality, pricing factors, and/or availability constraints. For example, when a user requests "action movies," the AI system 304 may receive catalog data containing twenty action titles with varying rental prices from $2.99 to $5.99, purchase options from $9.99 to $19.99, and streaming quality options ranging from SD to 4K HDR, then filter and rank these options based on the user's historical preference for HD content and typical spending patterns under $4.00 for rentals. In some aspects, the AI system 304 may implement intelligent caching mechanisms to store frequently accessed catalog data, reducing latency in recommendation generation while maintaining real-time synchronization for time-sensitive information such as availability status and dynamic pricing.

With continued reference to FIG. 3, at step 324, the AI system 304 may generate content recommendations based on the catalog data received from the provider API 308 and based the user profile information retrieved in earlier steps. The recommendations may incorporate contextual analysis that considers user location, travel history, and/or other profile elements to provide targeted content suggestions. In some aspects, the recommendation generation may produce suggestions such as "French Action" movies that reflect both the user's content category request and contextual information indicating geographic or cultural preferences.

The user, via the user device 302, may respond to the generated recommendations by making a content selection at step 326. The selection process may involve one or more user interface interactions through the user device 302 that communicate the chosen content back to the AI system 304. In some aspects, the user selection may trigger additional processing steps that verify content availability, confirm pricing terms, and/or initiate acquisition procedures. The AI system 304 may validate the user selection against current inventory levels, licensing restrictions, and/or payment authorization before proceeding with content acquisition processes. The AI system 304 may support multi-modal selection methods including voice confirmation, gesture-based interfaces, and/or automated selection based on predefined user rules and preferences, increasing accessibility across different user contexts and device capabilities.

At step 328, the AI system 304 may initiate an acquisition process that handles the procurement and licensing of the selected content from the appropriate provider systems. The acquisition process may involve payment processing, license agreement execution, and/or credential generation procedures that enable content access. In some aspects, the acquisition process may include verification protocols that revalidate variable fields such as shipping cost, currency exchange rates, and/or inventory levels before completing purchase transactions. The AI system 304 may coordinate with payment processing systems, either natively integrated and/or through third-party processors, to handle financial transactions while implementing fraud prevention and spending control measures.

The host 310 may execute step 330 by obtaining access credentials for the selected content through host selection and authentication processes. The access credentials may include endpoint URLs, authentication tokens, decryption keys, and/or usage restrictions that enable secure content delivery while enforcing provider-specified access controls. In some aspects, the credential generation process may involve coordination between multiple systems to establish appropriate access permissions and technical delivery parameters. The credential management system may implement time-based expiration policies, geographic restrictions, and/or concurrent access limitations to ensure compliance with licensing agreements while optimizing content delivery infrastructure utilization. At step 332, the host 310 may transmit the access credentials to the AI system 304, providing the technical information needed to facilitate content delivery to the user device 302.

As further shown in FIG. 3, the AI system 304 may deliver the access credentials to the user at step 334, enabling the user device 302 to establish direct connections with content delivery systems. The credential delivery may include technical specifications for content access, digital rights management parameters, and usage restrictions that govern how the content may be consumed. In some aspects, the content delivery module may enforce Digital Rights Management including content protection, device restrictions, play limits, and/or encryption for media playback as specified by the content provider licensing terms. The AI system 304 may support adaptive streaming protocols that dynamically adjust content quality based on network conditions, device capabilities, and/or user preferences to provide improved viewing experiences across varying technical environments. At step 336, the host 310 may initiate a content stream directly to the user device 302, establishing a direct delivery channel that bypasses the AI system 304 for efficient content transmission.

The operational sequence may conclude at step 338 when the AI system 304 updates the user profile 306 with information about the current content access session. The profile updates may include consumption data, preference indicators, and/or behavioral patterns that inform future recommendation algorithms and personalization strategies. In some aspects, the profile updates may capture temporal information, content completion rates, user ratings, and/or other engagement metrics that improve the AI system's 304 understanding of user preferences. The profile update process may maintain synchronization across multiple AI agents and platforms when the user profile 306 supports cross-platform access, ensuring that personalization improvements benefit the user across different service interactions.

Figure 4:
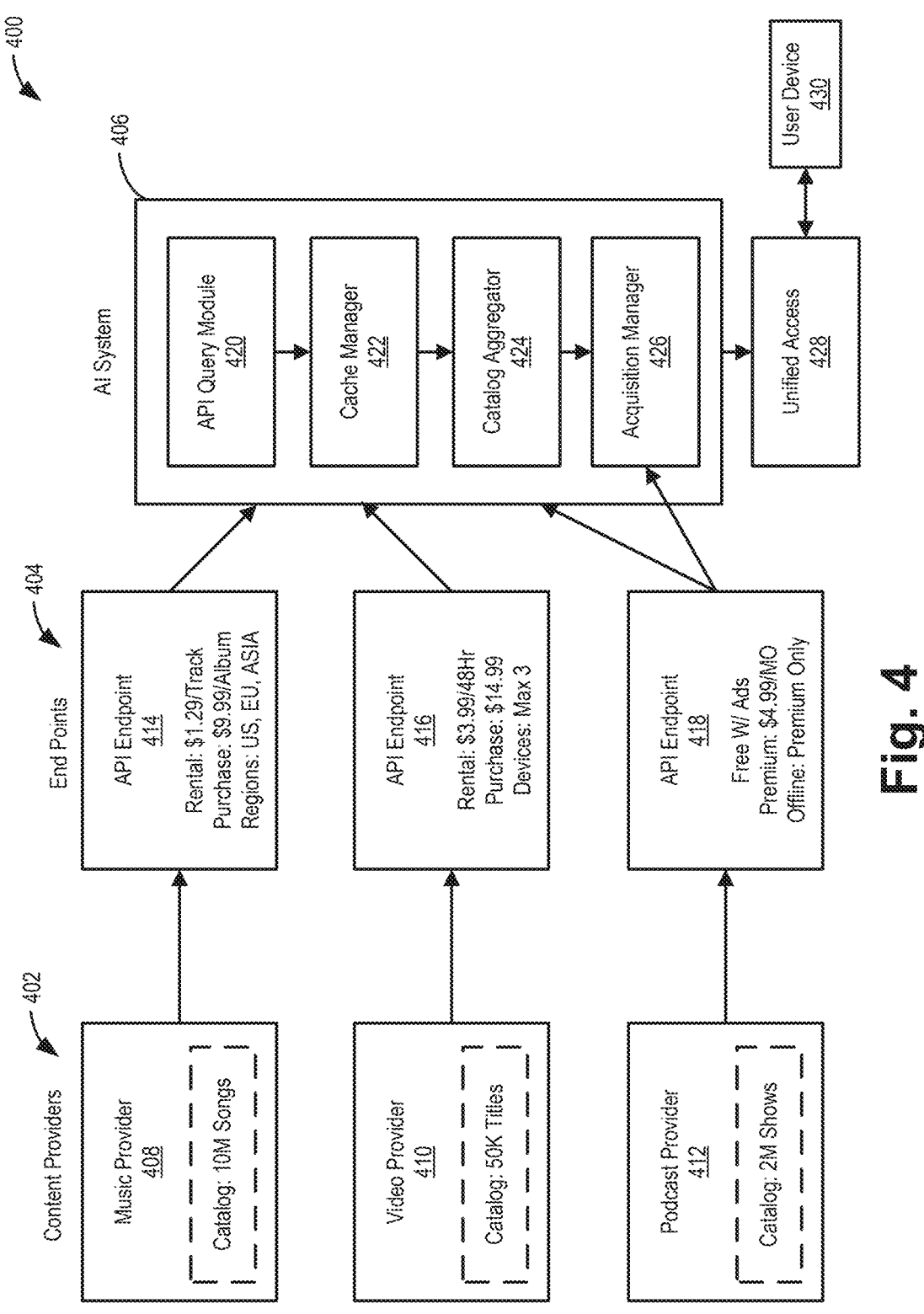
FIG. 4 illustrates a system architecture for aggregating and managing content from multiple providers through a unified artificial intelligence system, according to aspects of the present disclosure.

Referring to FIG. 4, a system architecture 400 may provide content aggregation capabilities through coordinated interactions between multiple content providers and an intelligent processing system. The system architecture 400 may enable unified access to diverse content types while maintaining the distinct characteristics and requirements of different provider ecosystems. In some aspects, the system architecture 400 may support scalable expansion to accommodate additional content providers and media types without requiring modifications to core processing components. The system architecture 400 may facilitate seamless integration of heterogeneous content sources that operate under different pricing models, licensing arrangements, and/or technical specifications.

The system architecture 400 may include content providers 402 that represent media categories that may be distinct or overlap, where each content provider may maintain content catalogs and service offerings. For example, a music provider 408 may maintain an extensive catalog containing approximately 10 million songs, providing access to audio content across multiple genres, artists, and recording labels. The music provider 408 may support various audio formats, quality levels, and licensing arrangements that accommodate different user preferences and device capabilities. In some aspects, the music provider 408 may offer both individual track purchases and album-based acquisition options, enabling flexible content access models that align with user consumption patterns and budget considerations.

A video provider 410 may maintain a catalog of approximately 50,000 titles, encompassing movies, television shows, documentaries, and other visual content formats. The video provider 410 may support multiple video resolutions, encoding standards, and/or subtitle options to accommodate diverse viewing requirements and accessibility needs. In some aspects, the video provider 410 may implement device restrictions and concurrent viewing limitations that govern how users may access and consume video content across different platforms and locations. The video provider 410 may provide both rental and purchase options with different pricing structures and access duration parameters.

A podcast provider 412 may maintain a catalog containing approximately 2 million shows, offering episodic audio content across various topics, formats, and production styles. The podcast provider 412 may support subscription management capabilities that enable users to follow specific shows and receive notifications when new episodes become available. In some aspects, the podcast provider 412 may offer both free content supported by advertisements and premium subscription services that provide ad-free listening experiences and additional features such as offline access capabilities. Of course, other content providers are contemplated.

With continued reference to FIG. 4, the content providers 402 may interface with the system architecture 400 through endpoints 404 that establish standardized communication protocols and data exchange mechanisms. In some aspects, one or more endpoints 404 may be the same as or similar to the provider API 308 of FIG. 3. The endpoints 404 may implement various discovery mechanisms including application programming interfaces, decentralized records, crawlable websites with machine-readable data, or other automated discovery protocols that enable content providers to expose their offerings to AI systems. A music API endpoint 414 may provide structured access to the music provider 408 catalog, implementing rental pricing at $1.29 per track and purchase pricing at $9.99 per album. The music API endpoint 414 may support service delivery across multiple geographic regions including the United States, European Union, and Asia, accommodating different licensing requirements and regulatory constraints that apply in various jurisdictions.

A video API endpoint 416 may facilitate access to the video provider 410 catalog through standardized query and response protocols. The video API endpoint 416 may implement rental pricing at $3.99 per 48-hour access period and purchase options at $14.99 per title. In some aspects, the video API endpoint 416 may enforce device limitations that restrict concurrent access to a maximum of 3 devices per user account, ensuring compliance with licensing agreements and content protection requirements. The video API endpoint 416 may implement geographic restrictions and content availability limitations based on territorial licensing arrangements and regulatory requirements.

A podcast API endpoint 418 may enable access to the podcast provider 412 catalog through structured data interfaces that support both free and premium content access models. The podcast API endpoint 418 may provide free content supported by integrated advertisements and premium subscription services priced at $4.99 per month. In some aspects, the podcast API endpoint 418 may restrict offline access capabilities to premium subscribers only, creating differentiated service tiers that encourage subscription upgrades while maintaining free access options for basic listening functionality.

The system architecture 400 may incorporate an AI system 406 that serves as a central processing hub coordinating multiple specialized modules to handle content discovery, aggregation, and delivery operations. Similar to centralized processing components described in previous architectures, the AI system 406 coordinates multiple operational functions through specialized modules. The AI system 406 may implement intelligent processing capabilities that analyze user requests, coordinate with multiple content providers simultaneously, and/or optimize content delivery through various hosting configurations. In some aspects, the AI system 406 may support dynamic pricing and licensing negotiations between AI agents and content providers in real-time, enabling flexible pricing arrangements that adapt to current market conditions and user requirements. In some aspects, the AI system 406 may be the same as or similar to the AI system 304 of FIG. 3, AI system 204 of FIG. 2, and/or the content access module 126 of FIG. 1.

An API query module 420 within the AI system 406 may manage communications with the music API endpoint 414, video API endpoint 416, and/or podcast API endpoint 418 simultaneously. The API query module 420 may format requests according to provider-specific protocols, handle authentication procedures, and process responses from multiple provider systems concurrently. In some aspects, the API query module 420 may implement load balancing mechanisms that distribute query loads across multiple provider endpoints to optimize response times and maintain system performance under varying demand conditions. The API query module 420 may coordinate with external authentication systems and maintain session management across multiple provider connections. In some aspects, the API query module 420 may share authentication and session management approaches with user interface components described in earlier system configurations.

A cache manager 422 may optimize system performance by storing frequently accessed content metadata, pricing information, and/or availability data from the content providers 402. The cache manager 422 may implement temporal and spatial locality algorithms that predict which content information may be requested by users and preload relevant data to reduce response latency. In some aspects, the cache manager 422 may maintain cache validity periods that ensure stored information remains current with provider systems while minimizing redundant API calls. The cache manager 422 may implement cache invalidation procedures that remove outdated information when providers update their catalogs or modify pricing structures.

As further shown in FIG. 4, a catalog aggregator 424 may combine and organize content metadata from the music provider 408, video provider 410, and podcast provider 412 into unified searchable indexes. The catalog aggregator 424 may perform deduplication procedures that identify and resolve conflicts when the same content appears across multiple providers with different pricing or licensing terms. In some aspects, the catalog aggregator 424 may implement cross-referencing capabilities that link related content across different media types, enabling users to discover complementary content such as movie soundtracks or podcast episodes discussing specific films or music artists. These cross-referencing features may extend content discovery mechanisms of simpler single-provider architectures. The catalog aggregator 424 may normalize content metadata formats to ensure consistent search and recommendation capabilities across heterogeneous provider systems.

An acquisition manager 426 may handle transaction processing, licensing negotiations, and/or content procurement from the content providers 402. The acquisition manager 426 may coordinate payment processing, license agreement execution, and credential generation procedures that enable content access while ensuring compliance with provider-specified terms and conditions. In some aspects, the acquisition manager 426 may aggregate and manage purchases and subscriptions with media or product suppliers on behalf of users, consolidating fees and terms into simplified tiers that reduce complexity for end users. The acquisition manager 426 may implement verification protocols that revalidate frequently changing fields such as pricing information, currency exchange rates, and/or content availability before completing acquisition transactions.

The acquisition manager 426 may support multiple hosting configurations including provider-hosted, CDN-based, and AI-managed delivery options that accommodate different content delivery requirements and performance optimization strategies. Provider-hosted configurations may enable content providers to maintain direct control over content delivery infrastructure while participating in the aggregated ecosystem. CDN-based configurations may leverage distributed content delivery networks to optimize performance and reduce latency for users accessing content from various geographic locations. AI-managed delivery options may provide dynamic resource allocation and intelligent caching strategies that adapt to usage patterns and demand fluctuations across the system architecture 400.

A unified access module 428 may provide a single point of access for users to browse, search, and acquire content from the music provider 408, video provider 410, and podcast provider 412 through consolidated interfaces. The unified access module 428 may abstract the complexity of multiple provider APIs, pricing structures, and/or licensing arrangements while presenting simplified interaction models to end users. In some aspects, the unified access module 428 may implement cross-provider search capabilities that enable users to discover content across multiple media types through single query operations. The unified access module 428 may coordinate content delivery operations that route physical goods directly from manufacturers, aggregators, or through AI platform-managed warehouses when the system architecture 400 supports physical product distribution alongside digital media content.

The unified access module 428 may establish bidirectional communication with a user device 430 that enables users to interact with the aggregated content ecosystem through various interface modalities. The user device 430 may support natural language interactions, graphical user interfaces, and programmatic access methods that accommodate different user preferences and technical requirements. In some aspects, the user device 430 may implement local caching capabilities that store frequently accessed content metadata and user preference information to optimize response times and reduce network bandwidth requirements. The unified access module 428 may coordinate with the user device 430 to maintain consistent user experiences across different content types while respecting the distinct characteristics and requirements of each content provider within the system architecture 400.

Referring to FIG. 5, a system architecture 500 depicts one or more interaction flows between user devices and AI-powered content delivery systems that coordinate with multiple hosting infrastructure options. The system architecture 500 may enable natural language content requests to be processed through intelligent intermediary systems that handle provider selection, access management, and/or rights enforcement while maintaining secure content delivery pathways. In some aspects, the system architecture 500 may support various hosting configurations that accommodate different content provider preferences and technical requirements while ensuring consistent user experiences across diverse delivery mechanisms.

A user device 502 may receive a content request 504 that initiates the content discovery and delivery sequence within the system architecture 500. In some aspects, the user device 502 may be the same as or similar to the user device 430 of FIG. 4, user device 302 of FIG. 3, and/or user device 202 of FIG. 2. The content request 504 may comprise natural language expressions such as "Play French Movie" that demonstrate the system's capability to process conversational user inputs and translate them into actionable content acquisition operations. The user device 502 may incorporate a media player 506 that handles content playback operations across various media formats and quality levels. In some aspects, the media player 506 may support multiple audio and video codecs, subtitle rendering capabilities, and adaptive streaming protocols that optimize content delivery based on network conditions and device capabilities. The user device 502 may include a DRM module 508 that implements digital rights management protocols to ensure secure content consumption while enforcing provider-specified access restrictions and usage limitations. In some aspects, the media player 506 may be provided via one or more language model platforms and/or AI systems, such as AI system 510.

The DRM module 508 may enforce Digital Rights Management including content protection, device restrictions, play limits, and/or encryption for media playback as specified by content provider licensing agreements. In some aspects, the DRM module 508 may implement device binding mechanisms that restrict content access to authorized devices within user accounts, preventing unauthorized content sharing or distribution. The DRM module 508 may enforce temporal restrictions that limit content access duration for rental agreements or implement usage counting mechanisms that track content consumption against provider-specified limits. Encryption protocols within the DRM module 508 may protect content during transmission and storage, ensuring that media files remain secure throughout the delivery and consumption process.

With continued reference to FIG. 5, an AI system 510 may serve as an intelligent intermediary that coordinates content discovery, provider selection, and/or delivery operations based on user requests and system capabilities. In some aspects, the AI system 510 may be the same as or similar to the AI system 406 of FIG. 4, AI system 304 of FIG. 3, AI system 204 of FIG. 2, and/or the content access module 126 of FIG. 1. The AI system 510 may incorporate multiple specialized processing modules that handle different aspects of content delivery workflows while maintaining coordination with external provider systems and hosting infrastructure. A request processor 512 within the AI system 510 may analyze incoming content requests from the user device 502, extracting intent information and contextual requirements that inform subsequent processing operations. The request processor 512 may implement natural language processing algorithms that interpret conversational user inputs and convert them into structured queries that other system components can process effectively. In some aspects, the request processor 512 may maintain conversation context across multiple requests to enable follow-up queries and refinements without requiring users to repeat previously provided information.

A provider selector 514 may evaluate available content providers and hosting options to determine optimal content sources based on user preferences, content availability, pricing considerations, and/or technical delivery requirements. The provider selector 514 may analyze multiple factors including geographic restrictions, licensing terms, quality options, and/or delivery performance metrics to identify the most suitable content sources for specific user requests. In some aspects, the provider selector 514 may coordinate with multiple providers simultaneously to compare options and negotiate optimal terms for content acquisition and delivery. In some aspects, the provider selector 514 may maintain a dynamic ranking system that updates provider scores based on historical performance metrics, user satisfaction ratings, and content delivery success rates. An access manager 516 may handle authentication procedures, authorization verification, and/or credential management operations that enable secure content access while maintaining compliance with provider-specified security requirements.

The access manager 516 may coordinate with authentication infrastructure that utilizes blockchain verification or digital signature validation to verify legitimate content providers or product manufacturers. In some aspects, the authentication infrastructure may implement distributed ledger technologies that maintain immutable records of provider credentials and authorization status, enabling automated verification of content source legitimacy without relying on centralized authority systems. Digital signature validation mechanisms may verify the authenticity and integrity of content metadata, licensing terms, and delivery credentials to prevent unauthorized content distribution or fraudulent provider activities. The access manager 516 may maintain session management capabilities that coordinate authentication status across multiple provider connections and hosting systems.

As further shown in FIG. 5, a rights enforcer 518 within the AI system 510 may implement digital rights management policies and licensing compliance mechanisms that ensure content consumption adheres to provider-specified terms and conditions. The rights enforcer 518 may coordinate with the DRM module 508 on the user device 502 to establish and maintain content protection protocols throughout the delivery and consumption process. In some aspects, the rights enforcer 518 may implement real-time monitoring capabilities that track content usage patterns and enforce compliance with licensing restrictions such as concurrent viewing limits, geographic access boundaries, or temporal usage constraints. The rights enforcer 518 may coordinate with payment processing systems to ensure that content access remains authorized based on current subscription status or transaction completion.

A playback monitor 520 may track content consumption activities and gather usage metrics that inform system optimization and provider reporting requirements. The playback monitor 520 may collect data including playback duration, completion rates, quality selections, and user interaction patterns that provide insights into content performance and user engagement levels. In some aspects, the playback monitor 520 may implement privacy-preserving data collection mechanisms that aggregate usage information while protecting individual user privacy and maintaining compliance with data protection regulations. The playback monitor 520 may coordinate with the quality adaptation components to dynamically adjust streaming parameters based on real-time network performance and buffer health indicators. A usage reporter 522 may process the collected usage data and generate reports for content providers, system administrators, and analytics systems that support business intelligence and performance optimization operations. The usage reporter 522 may generate customized reports based on provider-specific requirements and support various data export formats for integration with external analytics platforms.

The system architecture 500 may include a content provider 524 that maintains content catalogs and coordinates with various hosting infrastructure options to support flexible content delivery configurations. In some aspects, the content provider 524 may be the same as or similar to the content providers 402 of FIG. 4, content provider associated with a provider API 308 of FIG. 3, and/or external providers 221 of FIG. 2. The content provider 524 may establish connections with multiple hosting systems that accommodate different technical requirements, performance optimization strategies, and/or business model preferences. In some aspects, the content provider 524 may support multiple hosting configurations including provider-hosted, CDN-based, and/or AI-managed delivery options that enable content providers to select optimal delivery mechanisms based on their specific requirements and capabilities.

A hosted provider 526 may represent third-party hosting infrastructure that content providers may utilize to deliver content through external hosting services while maintaining control over content catalogs and licensing terms. The hosted provider 526 may implement content delivery networks, cloud storage systems, or specialized media hosting platforms that optimize content delivery performance and scalability. In some aspects, the hosted provider 526 may provide geographic distribution capabilities that cache content at edge locations to reduce latency and improve user experience across different regions. The hosted provider 526 may support multi-tier storage architectures that automatically migrate content between hot, warm, and cold storage tiers based on access frequency and predicted demand patterns. A common CDM 528 may provide shared content decryption module capabilities that enable standardized content protection across multiple providers and hosting systems while maintaining interoperability between different digital rights management implementations.

The common CDM 528 may implement standardized encryption and decryption protocols that enable content providers to utilize consistent content protection mechanisms regardless of their chosen hosting infrastructure. In some aspects, the common CDM 528 may support multiple encryption standards and key management systems that accommodate different provider preferences while maintaining compatibility with various user device capabilities and media player implementations. The common CDM 528 may coordinate with the DRM module 508 to establish secure communication channels and validate device certificates before initiating content decryption operations. An AI managed hosting 530 may provide intelligent content delivery capabilities that utilize machine learning algorithms and predictive analytics to optimize content distribution, caching strategies, and resource allocation based on usage patterns and demand forecasting. The AI managed hosting 530 may implement dynamic resource allocation mechanisms that automatically scale hosting infrastructure based on content demand fluctuations and user access patterns. In some aspects, the AI managed hosting 530 may utilize predictive caching algorithms that preload popular content at strategic locations to minimize delivery latency and optimize bandwidth utilization. The AI managed hosting 530 may coordinate with content delivery networks and edge computing resources to provide distributed content delivery capabilities that adapt to changing network conditions and user geographic distributions. In some aspects, the AI managed hosting 530 may implement machine learning models that analyze historical viewing patterns to predict peak demand periods and proactively provision resources to maintain optimal service quality.

Access credentials 532 may include technical specifications and/or authorization information that enable secure content delivery while enforcing provider-specified access controls and usage restrictions. The access credentials 532 may include endpoint URLs that specify content delivery locations, authentication tokens that verify user authorization status, and/or encryption keys that enable secure content decryption on authorized devices. In some aspects, the access credentials 532 may specify device limitations, geographic restrictions, and/or temporal access constraints that govern how users may consume content across different platforms and locations. The access credentials 532 may include technical parameters such as supported quality levels, available subtitle options, and/or compatible playback formats that inform media player configuration and content delivery optimization. In some aspects, the access credentials 532 may be dynamically generated and periodically refreshed to maintain security while minimizing the risk of unauthorized access through credential compromise.

Figure 6:
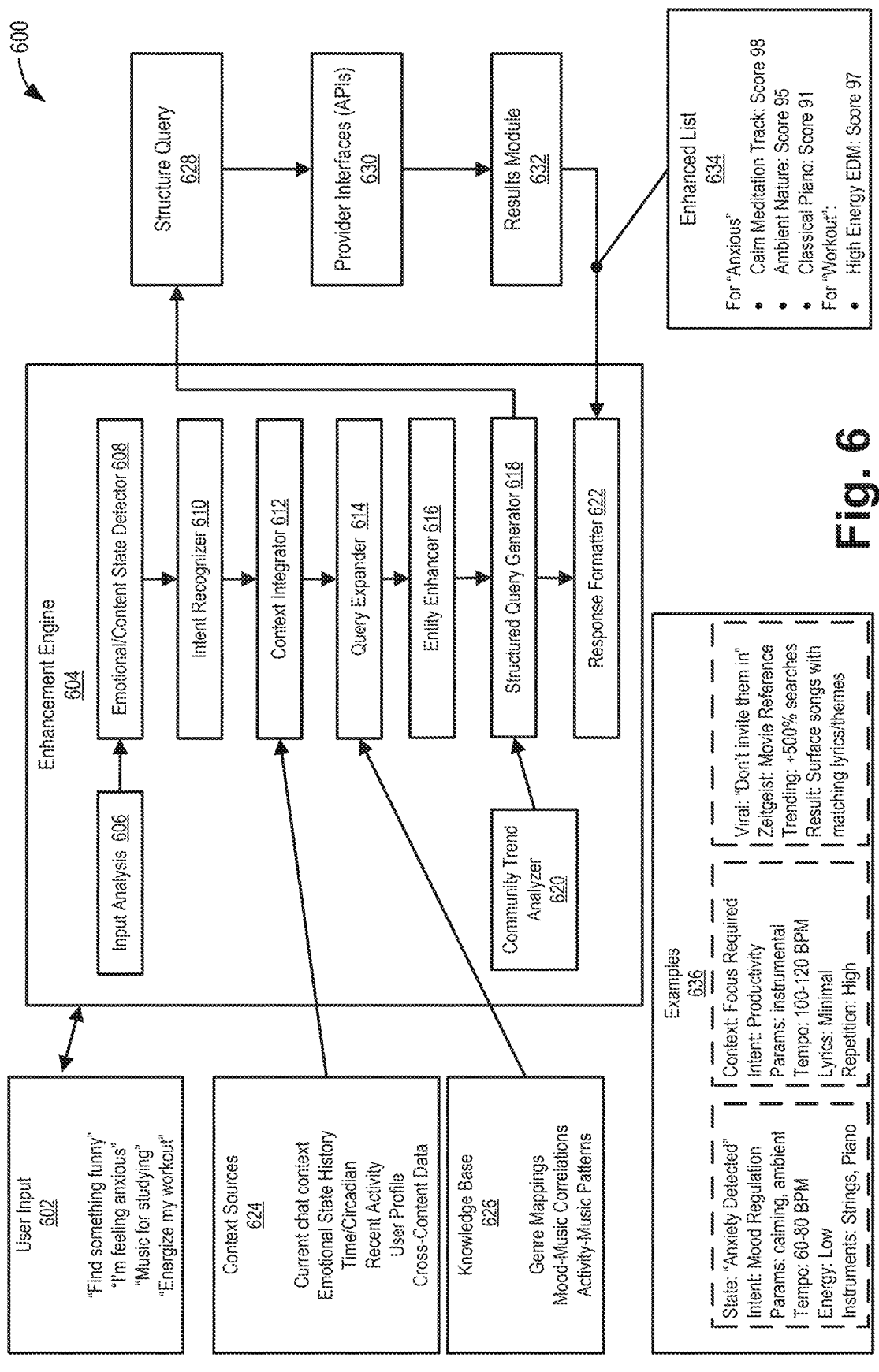
FIG. 6 illustrates an enhancement system for processing user input and generating enhanced content recommendations, according to aspects of the present disclosure.

Referring to FIG. 6, an enhancement system 600 may provide query processing and contextual analysis capabilities that transform natural language user inputs into content discovery operations. The enhancement system 600 may enable users to express content desires through conversational interfaces while leveraging multiple data sources and analytical processes to generate personalized recommendations that consider emotional states, activity contexts, and/or community trends. In some aspects, the enhancement system 600 may coordinate with external provider systems and knowledge databases to deliver enhanced content suggestions that exceed traditional keyword-based search capabilities. The enhancement system 600 may implement parallel processing architectures that analyze user inputs through multiple analytical pathways simultaneously, enabling understanding of user intent and contextual requirements. In some aspects, the enhancement system 600 may integrate with or complement content discovery systems described in previous implementations, extending their capabilities with emotional and contextual awareness features.

A user input 602 within the enhancement system 600 may represent diverse natural language queries from users through various communication channels and interface modalities. The user input 602 may include conversational expressions such as "Find something funny," "I'm feeling anxious," "Music for studying," and "Energize my workout" that demonstrate the enhancement system's 600 capability to interpret both traditional content requests and emotional or contextual queries requiring analysis. In some aspects, the user input 602 may undergo one or more natural language preprocessing algorithms that normalize input formats, extract linguistic patterns, and prepare user expressions for subsequent analytical processing. The user input 602 may be in the form of multiple languages and dialects and/or may be one of various input methods including voice recognition, text entry, and/or gesture-based interactions.

The user input 602 may be provided over one or more established communication pathways to the enhancement engine 604 that serves as the central processing hub for query analysis and content recommendation generation. The enhancement engine 604 may coordinate multiple specialized analytical modules arranged in pipeline architectures with parallel processing capabilities that enable analysis of user inputs across multiple dimensions simultaneously. In some aspects, the enhancement engine 604 may implement machine learning algorithms that adapt processing strategies based on user interaction patterns and feedback mechanisms. The enhancement engine 604 may coordinate with external data sources and provider systems to gather contextual information that informs recommendation generation processes. In some aspects, the enhancement engine 604 may employ distributed computing architectures that allocate different analytical tasks to specialized processing units, enabling real-time response generation for complex multidimensional queries.

With continued reference to FIG. 6, an input analyzer 606 within the enhancement engine 604 may perform initial natural language processing operations that parse linguistic patterns, identify emotional indicators, extract activity contexts, and/or determine preliminary intent from user expressions based on the user input 602. The input analyzer 606 may implement semantic analysis algorithms that interpret meaning beyond literal keyword matching, enabling understanding of implied preferences and contextual requirements embedded within conversational requests. In some aspects, the input analyzer 606 may utilize natural language understanding models that recognize emotional expressions, activity descriptions, and/or situational contexts that influence content preferences. The input analyzer 606 may implement entity recognition capabilities that identify specific content categories, artists, genres, and/or other relevant elements mentioned within user inputs.

A state detector 608 may analyze processed user inputs to identify emotional conditions and situational contexts that may need specific content response types. The state detector 608 may recognize emotional states such as anxiety that may benefit from calming content, detect activity contexts such as studying that may require minimal lyrical content, and/or identify energy level requirements for physical activities that demand high-tempo audio characteristics. In some aspects, the state detector 608 may implement psychological profiling algorithms that correlate emotional expressions with appropriate content characteristics based on established mood-music relationships and therapeutic audio principles. In some aspects, the state detector 608 may analyze temporal patterns and circadian rhythms that influence content preferences based on time-of-day considerations and user activity schedules. In some aspects, the state detector 608 may maintain state transition models that track how user emotional conditions evolve throughout interaction sessions, enabling predictive content recommendations that anticipate mood shifts.

An intent recognizer 610 may receive processed emotional and contextual data from the state detector 608 to classify user requests into actionable categories including mood regulation, productivity enhancement, entertainment, and/or traditional content search operations. The intent recognizer 610 may implement classification algorithms that distinguish between different types of content requests and determine appropriate processing pathways for each category. In some aspects, the intent recognizer 610 may recognize complex multi-dimensional requests that combine multiple intent categories, such as entertainment content that also supports mood regulation objectives. The intent recognizer 610 may coordinate with user profile systems to incorporate historical preference data and/or behavioral patterns that inform intent classification accuracy.

As further shown in FIG. 6, a context integrator 612 may synthesize inputs from context sources 624 and a knowledge base 626 to create understanding of user states and content requirements. The context sources 624 may provide multidimensional user understanding through current chat context tracking and/or ongoing conversation topics, emotional state history and/or temporal emotional patterns, time and circadian data, recent activity logs capturing user engagement patterns, user profile information with preference data, and/or cross-context data from non-media interactions. In some aspects, the context integrator 612 may implement data fusion algorithms that combine information from multiple sources while resolving conflicts and inconsistencies between different data streams. The context integrator 612 may maintain temporal awareness that considers how user contexts evolve over time and across different interaction sessions.

The knowledge base 626 may supply domain expertise including genre mappings for traditional content categorization, mood-music correlations linking emotional states to musical characteristics, and/or activity-music patterns optimizing audio selections for specific tasks. The knowledge base 626 may contain curated relationships between emotional states and content attributes such as tempo ranges, instrumentation preferences, and/or energy levels that support therapeutic or functional content selection. In some aspects, the knowledge base 626 may incorporate research-based correlations between psychological states and audio characteristics that enable evidence-based content recommendations. The knowledge base 626 may maintain cultural and demographic correlations that consider how content preferences vary across different user populations and geographic regions.

A query expander 614 may broaden initial user queries based on integrated contextual information and knowledge base correlations to generate search parameters that extend beyond simple keyword matching. The query expander 614 may transform emotional queries into musical parameters including tempo specifications, energy level requirements, and instrumentation preferences rather than relying solely on textual content matching. In some aspects, the query expander 614 may generate multiple query variations that explore different aspects of user intent, enabling content discovery across various provider catalogs. The query expander 614 may implement semantic expansion techniques that include related concepts, synonymous terms, and contextually relevant attributes that broaden content discovery scope. In some aspects, the query expander 614 may utilize knowledge graph traversal algorithms that identify conceptual relationships between query elements and potential content matches across semantic networks.

An entity enhancer 616 may refine expanded queries by identifying and emphasizing specific content attributes that match detected emotional states and contextual requirements. The entity enhancer 616 may analyze expanded query parameters to prioritize content characteristics that align with user needs, such as emphasizing calming instrumentation for anxiety-related requests or highlighting high-energy elements for workout-focused queries. In some aspects, the entity enhancer 616 may implement weighting algorithms that balance different content attributes based on the strength of emotional indicators and contextual signals detected in user inputs. The entity enhancer 616 may coordinate with provider-specific metadata formats to ensure that enhanced queries utilize appropriate terminology and attribute specifications for different content catalogs.

With continued reference to FIG. 6, a trend analyzer 620 may monitor collective user behavior patterns and/or cultural zeitgeist phenomena to identify viral content trends and community interest shifts that influence individual recommendation strategies. The trend analyzer 620 may detect viral content patterns such as movie references that generate sudden increases in related content searches, monitor social media discussions that indicate emerging cultural interests, and/or analyze aggregate user behavior across the enhancement system 600 to identify trending topics and content categories. In some aspects, the trend analyzer 620 may implement real-time analytics that capture rapidly evolving cultural phenomena and incorporate trending elements into individual user recommendations. The trend analyzer 620 may maintain historical trend data that enables identification of cyclical patterns and seasonal content preferences that inform recommendation timing and relevance. The trend analyzer 620 may implement anomaly detection algorithms that distinguish between genuine viral phenomena and artificial engagement patterns, ensuring authentic trend incorporation in recommendations.

A query generator 618 may receive inputs from the entity enhancer 616 and the trend analyzer 620 to format enhanced information into structured queries that incorporate emotional parameters, activity requirements, and/or community trends for transmission to provider systems. The query generator 618 may create standardized query formats that enable content filtering beyond traditional metadata matching while maintaining compatibility with diverse provider API specifications. In some aspects, the query generator 618 may generate multiple query variants that target different provider systems with optimized parameter sets that align with each provider's catalog structure and search capabilities. The query generator 618 may implement query optimization techniques that balance content discovery with efficient processing performance across multiple provider connections. The query generator 618 may provide the query to the provider APIs 630 as a structured query 628. At a high level, a structured query may represent a transformation of the user input 602 into multiple parameter fields organized according to provider API specifications, translating the human-understandable transformations depicted as the enhanced examples 636 into executable query syntax. While the enhanced examples 636 display conceptual transformations for patent illustration purposes (e.g., "State: ANXIETY_DETECTED, Tempo: 60-80 BPM"), the structured query 628 may implement similar parameters in machine-parseable format suitable for automated processing.

The enhanced examples 636 may illustrate processing workflows such as "Anxiety Detected" states that generate mood regulation intent with calming and ambient parameters, tempo specifications of 60-80 BPM, low energy requirements, and string or plano instrumentation preferences. Focus-required contexts may produce productivity intent with instrumental parameters, tempo ranges of 100-120 BPM, minimal lyrics requirements, and high repetition characteristics. In some aspects, the examples 636 may demonstrate viral content processing such as "Don't invite them in" movie references that trigger zeitgeist recognition, trending analysis showing 500% search increases, and result surfacing of songs with matching lyrics or thematic elements. The enhancement system 600 may include one or more AI sub-agents that operate to filter specific classes of goods or media, reporting to higher-level generalist AIs managing the user interface. The one more sub-agents may enable distributed processing of content categories while maintaining coordinated recommendation generation across the overall system architecture.

The provider interfaces 630 may establish communication pathways with external content provider systems that receive structured queries from the query generator 618 and return search results through a results module 632. The provider interfaces 630 may implement standardized communication protocols that enable the enhancement system 600 to interact with diverse provider systems while accommodating different API specifications and response formats. In some aspects, the provider interfaces 630 may coordinate with multiple providers simultaneously to gather content options that span different catalogs and service offerings. In some aspects, the provider interfaces 630 may implement caching mechanisms that store frequently accessed content metadata locally, reducing latency for popular recommendation queries while maintaining data freshness through periodic synchronization. A structured query 628 may contain emotional and contextual parameters that enable content filtering operations that consider user states and requirements beyond traditional search criteria.

As further shown in FIG. 6, the results module 632 may process provider responses and generate ranked results that weigh both content relevance and contextual appropriateness for presentation through the response formatter 622. The results module 632 may implement scoring algorithms that evaluate content options based on multiple criteria including emotional alignment, activity suitability, and community trend relevance. In some aspects, the results module 632 may coordinate with the trend analyzer 620 to incorporate viral content patterns and cultural zeitgeist elements that enhance recommendation relevance and social connectivity. An enhanced list 634 may display context-appropriate results with scoring information that demonstrates how different content options align with user requirements and detected states.

The enhanced list 634 may present recommendations such as "Calm Meditation Track" with relevance scores of 98 for anxiety-related requests, "Ambient Nature" with scores of 95 for relaxation needs, "Classical Piano" with scores of 91 for calming requirements, and "High Energy EDM" with scores of 97 for workout contexts. In some aspects, the enhanced list 634 may include explanatory information that describes why specific content received high relevance scores, enabling users to understand the analytical processes that generated their recommendations. Examples 636 may provide concrete transformation illustrations that demonstrate how the enhancement system 600 processes different types of user inputs and generates appropriate content parameters and recommendations.

The response formatter 622 may generate final recommendation presentations that are transmitted back to user interfaces through established communication channels, completing the enhancement system's 600 processing cycle. The response formatter 622 may format the enhanced list 634 according to user device capabilities and interface modalities, supporting various presentation formats including visual displays, audio announcements, and conversational responses suitable for natural language interfaces. In some aspects, the formatted recommendations from the response formatter 622 may trigger direct content delivery operations wherein selected content items from the enhanced list 634 initiate streaming sessions, download operations, or playlist additions based on user selections or automated playback decisions. The enhancement system 600 may maintain feedback loops wherein user interactions with presented recommendations, including selections, skips, and engagement duration, are captured and fed back to the enhancement engine 604 to improve future processing accuracy. In some aspects, the response formatter 622 may coordinate with user profile systems to update preference models based on recommendation acceptance patterns, enabling continuous learning and personalization refinement. The enhancement system 600 thereby completes an end-to-end transformation from natural language emotional or contextual expressions to actionable content delivery, bridging the gap between human conversational expression and machine-mediated content discovery while maintaining awareness of emotional states, activity contexts, and cultural phenomena that influence content preferences.

Figure 7:
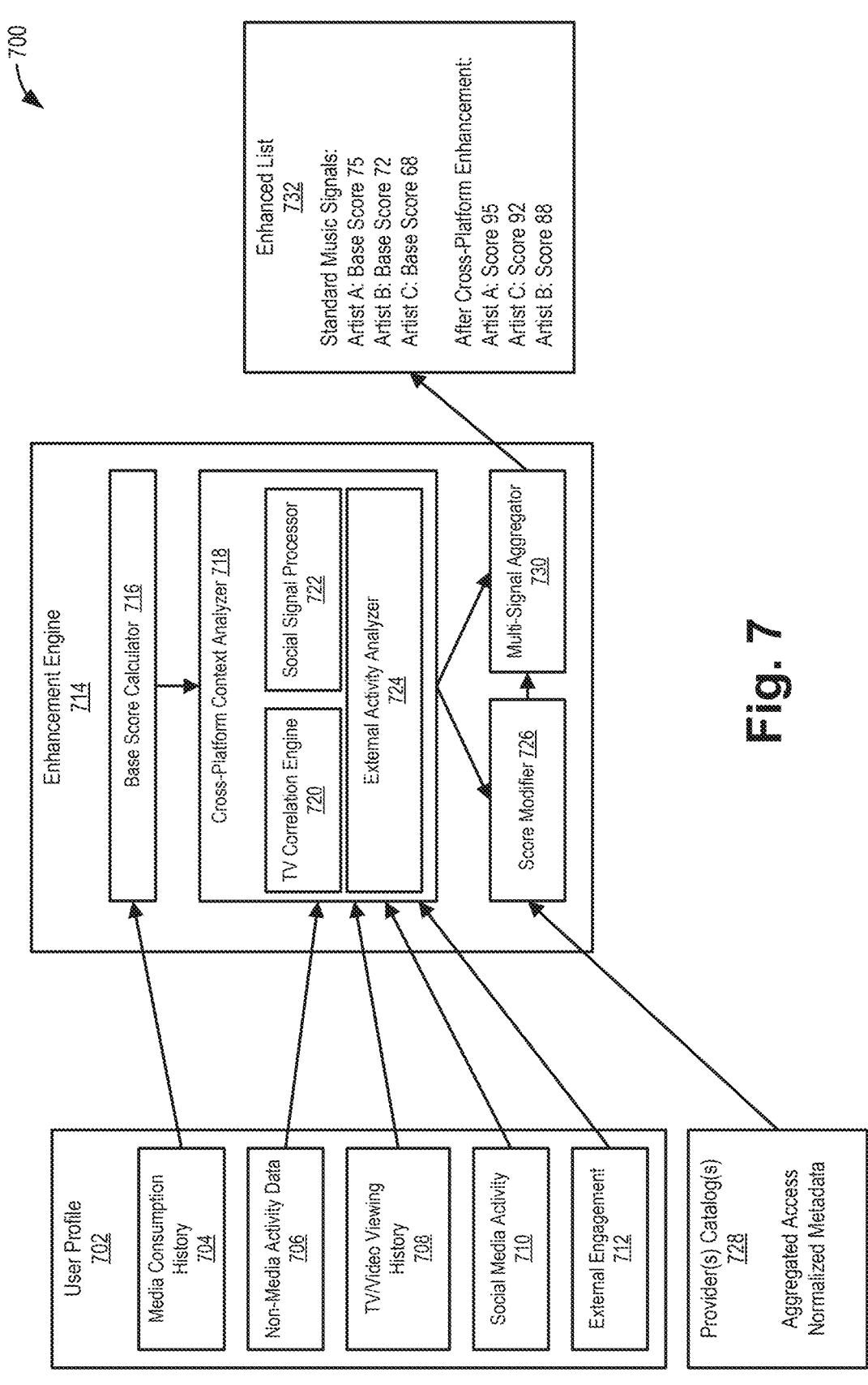
FIG. 7 illustrates a content scoring system for analyzing user profiles and generating enhanced recommendations, according to aspects of the present disclosure.

Referring to FIG. 7, a content scoring system 700 may provide cross-platform intelligence capabilities that aggregate and analyze user engagement data from diverse media and non-media sources to enhance content recommendations beyond traditional single-domain profiling approaches. The content scoring system 700 may enable content ranking algorithms that consider user interactions across multiple platforms, media types, and engagement channels to generate more accurate and personalized content suggestions. In some aspects, the content scoring system 700 may address limitations of conventional recommendation systems that rely solely on listening history or viewing patterns by incorporating broader behavioral signals that indicate user preferences and interests. The content scoring system 700 may implement multi-dimensional analysis frameworks that correlate activities across different domains to identify content affinity patterns that would not be apparent through isolated media consumption tracking.

In some aspects, the enhancement engine 714 may be the same as or similar to the enhancement engine 604 of FIG. 6, but having different analytical focuses and/or processing objectives. While the enhancement engine 604 may process emotional states and contextual needs to translate user intentions into content parameters, the enhancement engine 714 may analyze cross-platform behavioral signals to generate scoring enhancements based on multi-dimensional engagement patterns. In some implementations, the enhancement engine 714 may incorporate some or all of the features of the enhancement engine 604, including emotional state detection capabilities, context integration functions, and/or intent recognition modules, while extending these capabilities to process historical engagement data across multiple platforms and media types. The enhancement engine 714 may utilize similar machine learning frameworks and data fusion algorithms as the enhancement engine 604, but apply these techniques to identify content affinity patterns through non-audio media channels rather than real-time emotional context analysis. In certain aspects, both enhancement engines (e.g., enhancement engine 604 and enhancement engine 714) may operate in parallel within a recommendation system, with the enhancement engine 604 handling immediate contextual needs and the enhancement engine 714 providing long-term preference intelligence based on cross-platform activity correlation.

In some aspects, a user profile 702, within the content scoring system 700, may maintain user data across multiple distinct categories that represent different aspects of user behavior and engagement patterns. The user profile 702 may serve as a centralized repository for diverse data streams that inform content scoring algorithms and recommendation generation processes. In some aspects, the user profile 702 may implement data normalization procedures that standardize information formats across different data sources while preserving unique characteristics and temporal patterns associated with each data category. The user profile 702 may maintain privacy controls and access permissions that govern how different system components and external services may utilize stored user information for recommendation and personalization purposes. In some aspects, the user profile 702 may be the same as or similar to one or more user profiles previously described in FIGS. 2-4.

The user profile 702 may include a media consumption history 704 that stores audio and video consumption data including play counts, skip rates, favorite tracks, playlist compositions, and/or engagement duration metrics. The media consumption history 704 may provide baseline behavioral patterns that establish content preferences and consumption habits across different media types and genres. In some aspects, the media consumption history 704 may capture temporal consumption patterns that indicate how user preferences vary based on time of day, day of week, or seasonal factors that influence content selection behaviors. The media consumption history 704 may track completion rates, replay frequencies, and user rating information that provide insights into content satisfaction levels and preference intensity measurements.

With continued reference to FIG. 7, the user profile 702 may contain non-media activity data 706 that captures user behaviors and interests outside of direct media consumption contexts. The non-media activity data 706 may include calendar events, travel bookings, email topics, research interests, and/or other contextual information that may correlate with content preferences and recommendation relevance. In some aspects, the non-media activity data 706 may enable the content scoring system 700 to identify content opportunities that align with user life activities, such as recommending travel-related content when booking confirmations indicate upcoming trips or suggesting educational content when email patterns indicate research activities. The non-media activity data 706 may capture purchase behaviors, location patterns, and/or social interactions that provide additional context for understanding user interests and preferences beyond media consumption patterns.

A viewing history 708 within the user profile 702 may represent cross-platform data sources that track user engagement with visual media content across different platforms and services. The viewing history 708 may monitor, as examples, artist appearances on television programs, music documentary viewing patterns, award show engagement levels, and/or concert film consumption behaviors that indicate artist affinity through non-audio media channels. For example, if a user watches a complete Saturday Night Live episode featuring a particular musical artist as the guest performer, skips through other portions but replays the musical performances, and subsequently searches for behind-the-scenes clips of that appearance, the viewing history 708 may interpret these combined behaviors as a strong affinity signal for that artist, even though no audio streaming occurred. In some aspects, the viewing history 708 may capture scenarios where users engage with musical artists through visual media rather than audio platforms, providing content scoring algorithms with additional signals that indicate artist preference and interest levels. The viewing history 708 may track viewing duration, interaction patterns, and/or content sharing behaviors that demonstrate engagement intensity and preference strength across different visual media formats.

The user profile 702 may incorporate social media activity 710 that monitors user engagement patterns across various social networking platforms and online communities. The social media activity 710 may track artist follows and likes across social platforms, concert venue check-ins, music-related post creation and sharing behaviors, and/or playlist sharing activities that provide insights into public music preferences and social discovery patterns. In some aspects, the social media activity 710 may capture engagement signals that indicate user preferences through social interactions rather than direct consumption behaviors, enabling the content scoring system 700 to identify content interests that may not otherwise be available from private listening or viewing activities. The social media activity 710 may monitor comment patterns, reaction behaviors, and/or content amplification activities that demonstrate user engagement levels and preference intensities across different social contexts.

As further shown in FIG. 7, external engagement 712 within the user profile 702 may track real-world interactions and activities that indicate content preferences through offline behaviors and transactions. The external engagement 712 may monitor news article consumption about artists, merchandise purchase history, concert ticket acquisitions, and/or meet-and-greet event attendance that demonstrate strong artist affinity often not captured by streaming data alone. In some aspects, the external engagement 712 may provide high-intent signals such as ticket purchases that strongly indicate artist preference and willingness to invest time and resources in content-related activities. The external engagement 712 may track physical media purchases, fan club memberships, and/or event participation that provide additional indicators of user engagement levels and content preferences that extend beyond digital consumption patterns.

An enhancement engine 714 within the content scoring system 700 may process the diverse data streams from the user profile 702 through analytical components that utilize content scoring algorithms. The enhancement engine 714 may coordinate multiple processing modules that analyze different aspects of user behavior and engagement patterns to generate unified content relevance scores. In some aspects, the enhancement engine 714 may implement machine learning algorithms that adapt scoring strategies based on user feedback and recommendation effectiveness measurements. The enhancement engine 714 may coordinate with external provider systems and content catalogs to ensure that scoring algorithms align with available content options and provider-specific metadata formats.

A base score calculator 716 within the enhancement engine 714 may generate initial content scores based on traditional media consumption patterns from the media consumption history 704. The base score calculator 716 may analyze listening frequencies, completion rates, user ratings, and/or playlist inclusion patterns to establish fundamental content preference scores that serve as baseline measurements for subsequent enhancement processes. In some aspects, the base score calculator 716 may implement weighting algorithms that consider recency factors, consumption frequency, and/or engagement duration to generate time-sensitive preference scores that reflect current user interests. The base score calculator 716 may incorporate genre preferences, artist affinities, and/or content attribute correlations that provide scoring elements for content recommendation algorithms.

With continued reference to FIG. 7, a cross-platform analyzer 718 within the enhancement engine 714 may process television viewing data, social media activity patterns, and/or external engagement behaviors to identify artist engagement through non-audio media channels. The cross-platform analyzer 718 may implement correlation algorithms that identify relationships between different types of user activities and content preferences across multiple platforms and engagement contexts. In some aspects, the cross-platform analyzer 718 may detect content affinity signals that would not be apparent through single-platform analysis, such as identifying music preferences through television viewing patterns or social media interactions. The cross-platform analyzer 718 may coordinate with multiple data processing components that specialize in different types of cross-platform signal analysis and correlation detection.

A correlation engine 720 within the cross-platform analyzer 718 may process television viewing data to identify artist engagement through visual media consumption patterns. For example, the correlation engine 720 may detect Saturday Night Live appearances that result in score increases, documentary viewing patterns that trigger recommendation boosts, and/or talk show appearances that generate content preference enhancements. In some aspects, the correlation engine 720 may apply specific score modifications such as 15% increases for late-night television appearances, 20% boosts for documentary viewing, and 10% improvements for talk show engagement. The correlation engine 720 may analyze viewing context, engagement duration, and/or repeat viewing patterns that indicate the strength of artist interest generated through television media exposure.

A social signal processor 722 within the cross-platform analyzer 718 may analyze social media activity patterns to quantify engagement impacts and preference indicators across various social networking platforms. The social signal processor 722 may process artist follows, concert posts, playlist shares, and/or other social engagement activities to generate quantified preference adjustments that enhance content scoring algorithms. In some aspects, the social signal processor 722 may implement scoring adjustments such as 8% boosts for artist follows, 12% increases for concert posts, and 5% enhancements for playlist shares that reflect different levels of social engagement intensity. The social signal processor 722 may analyze social interaction patterns, content sharing frequencies, and/or community engagement levels that provide additional context for understanding user preference strength and social influence factors.

As further shown in FIG. 7, an external activity analyzer 724 within the cross-platform analyzer 718 may correlate real-world actions and external engagement behaviors with content recommendation strategies. The external activity analyzer 724 may process news article reading patterns about artists, concert ticket purchases, and/or merchandise acquisition behaviors to generate content preference enhancements that reflect offline engagement activities. In some aspects, the external activity analyzer 724 may trigger specific recommendation actions such as surfacing new releases when users read artist interviews, boosting entire artist catalogs when concert tickets are purchased, and/or adding automatic playlist inclusions when merchandise purchases are detected. The external activity analyzer 724 may analyze engagement timing, purchase patterns, and/or event participation behaviors that provide insights into user commitment levels and content preference intensities.

A score modifier 726 within the enhancement engine 714 may receive outputs from the base score calculator 716 and the cross-platform analyzer 718 to apply weighting algorithms that adjust content scores based on cross-platform signals and multi-dimensional user engagement patterns. The score modifier 726 may balance traditional listening data with cross-platform intelligence to generate relevance scores that consider multiple engagement dimensions simultaneously. In some aspects, the score modifier 726 may prevent any single data source from overwhelming recommendation logic while ensuring that relevant engagement patterns influence content scoring decisions appropriately. The score modifier 726 may implement temporal weighting mechanisms that consider how recent different types of engagement activities occurred and adjust scoring impacts based on recency and relevance factors.

A provider catalog 728 may supply aggregated content metadata from multiple content providers with normalized metadata formats that enable unified scoring operations across heterogeneous content sources. The provider catalog 728 may maintain content information including artist details, genre classifications, release dates, and/or content attributes that support cross-platform correlation analysis and scoring enhancement processes. In some aspects, the provider catalog 728 may implement data synchronization mechanisms that ensure content metadata remains current across multiple provider systems while maintaining consistent formatting and attribute specifications. The provider catalog 728 may coordinate with content discovery mechanisms and provider API systems to ensure that scoring algorithms have access to complete and accurate content information for recommendation generation processes.

With continued reference to FIG. 7, a signal aggregator 730 may perform weighted combination operations that integrate scoring signals from the score modifier 726 with content metadata from the provider catalog 728 to generate relevance scores. The signal aggregator 730 may implement one or more aggregation algorithms that balance traditional listening data with cross-platform intelligence while considering content availability, provider licensing terms, and user access permissions. In some aspects, the signal aggregator 730 may coordinate with multiple provider systems to ensure that enhanced scoring algorithms align with available content options and delivery capabilities across different platforms and services. The signal aggregator 730 may implement real-time processing capabilities that enable dynamic score adjustments based on changing user contexts, content availability, and/or provider catalog updates.

An enhanced list 732 depicts an example of the processed results from the signal aggregator 730, demonstrating how cross-platform enhancement algorithms impact content rankings and recommendation ordering. The enhanced list 732 may present comparative scoring information that shows standard music signals before enhancement alongside cross-platform enhanced scores that reflect multi-dimensional user engagement analysis. In some aspects, the enhanced list 732 may demonstrate ranking reorderings that occur when cross-platform signals significantly alter content relevance scores, such as elevating artists based on television appearances, social media engagement, and/or external activity correlations. The enhanced list 732 may provide explanatory information that describes how different cross-platform signals contributed to scoring enhancements, enabling users to understand the analytical processes that generated their personalized recommendations and content rankings.

The enhanced list 732 may be provided to content delivery systems, user interface components, and/or recommendation presentation modules that utilize the cross-platform enhanced scores to present content options that reflect user engagement patterns rather than single-platform consumption history, thereby increasing the likelihood of content discovery and user satisfaction with recommended media.

Figure 8:
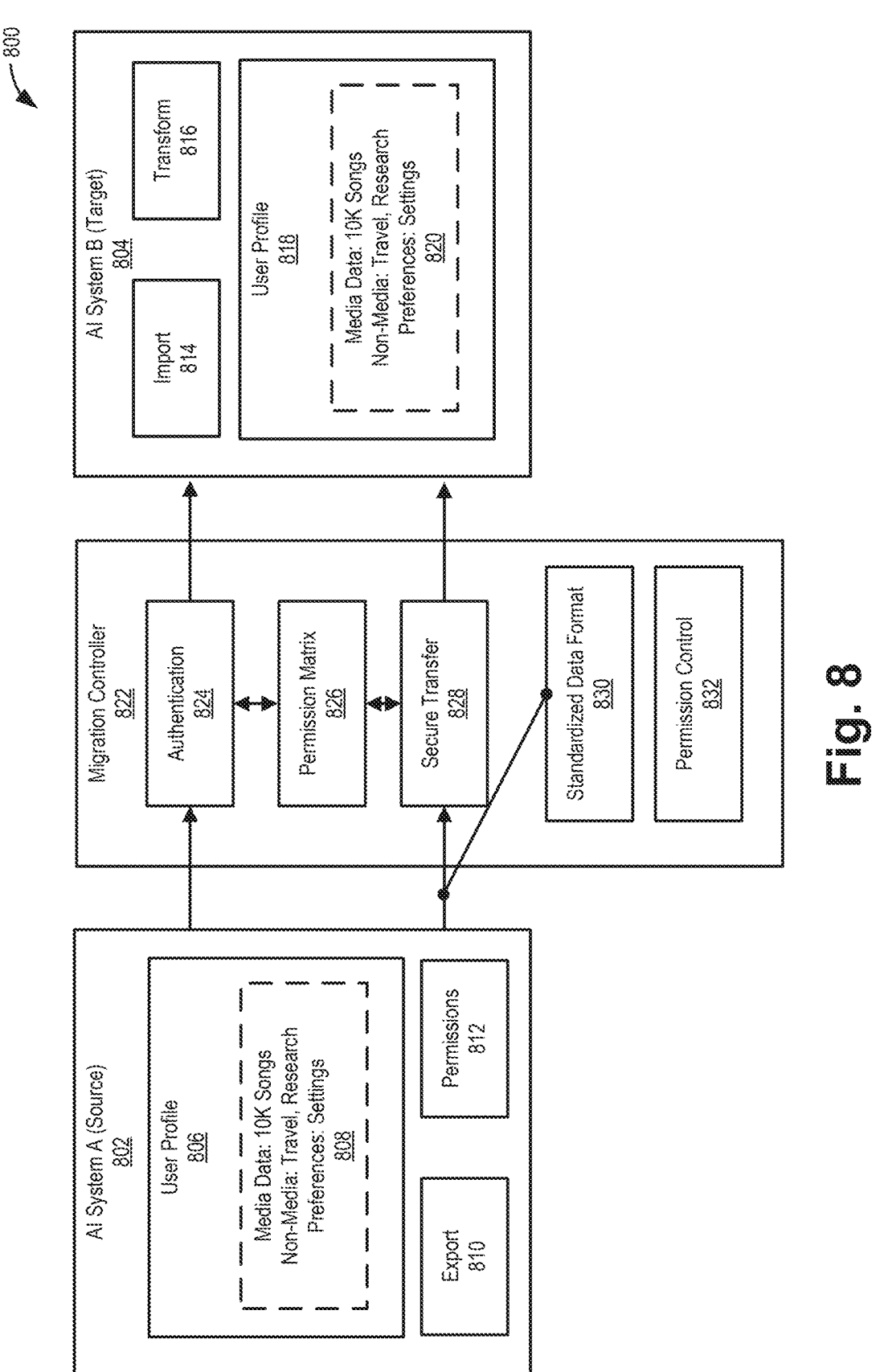
FIG. 8 illustrates a user profile migration system for secure transfer between artificial intelligence systems, according to aspects of the present disclosure.

Referring to FIG. 8, a user profile migration system 800 may provide secure data transfer capabilities that enable users to move profile information between different artificial intelligence platforms while maintaining authentication controls and data integrity throughout the migration process. The user profile migration system 800 may facilitate user mobility between AI services by preserving personalized experiences, preference data, and/or historical information when users transition from one platform to another. In some aspects, the user profile migration system 800 may implement one or more multi-layered security protocols that protect sensitive user information during transfer operations while ensuring compatibility between heterogeneous AI system architectures. The user profile migration system 800 may support selective data migration capabilities that allow users to control which portions of their profile information are transferred to destination systems, and allow user to maintain privacy controls over sensitive data elements.

The user profile migration system 800 may include a source AI system 802 that serves as the origin platform containing user profile data to be migrated to alternative AI services. In some aspects, the source AI system 802 may be the same as or similar to the AI-interface model 120 of FIG. 1, AI-interface model 120 of FIG. 1, AI system 204 of FIG. 2, or other AI systems described herein that maintain user profile data. The source AI system 802 may maintain user information including personalization settings, consumption history, preference patterns, and/or behavioral data that users may wish to preserve when transitioning to different AI platforms. In some aspects, the source AI system 802 may implement data export protocols that prepare user information for secure transfer while maintaining data format compatibility with standardized migration frameworks. The source AI system 802 may coordinate with authentication systems and permission management components to ensure that data export operations comply with user authorization requirements and privacy preferences.

A source user profile 806 within the source AI system 802 may contain user data that encompasses multiple information categories relevant to AI personalization and recommendation functions. The source user profile 806 may store media consumption patterns, preference indicators, behavioral analytics, and contextual information that inform AI decision-making processes and content recommendation algorithms. In some aspects, the source user profile 806 may maintain temporal data that captures how user preferences evolve over time, enabling destination systems to understand preference development patterns and behavioral trends. The source user profile 806 may implement data organization structures that facilitate efficient extraction and transfer operations while preserving data relationships and contextual associations between different information elements.

With continued reference to FIG. 8, the source user profile 806 may incorporate a profile data structure 808 that organizes user information into standardized formats that support migration operations and cross-platform compatibility. The profile data structure 808 may contain media data encompassing, for example, approximately 10,000 songs along with associated consumption metrics, rating information, and engagement patterns that reflect user music preferences and listening behaviors. The profile data structure 808 may include non-media information such as travel preferences, research interests, and/or contextual data that inform content recommendation strategies beyond direct media consumption patterns. In some aspects, the profile data structure 808 may maintain preference settings, configuration parameters, and/or customization options that define how users interact with AI systems and receive personalized services. The profile data structure 808 may implement hierarchical organization schemes that enable selective data access and partial migration capabilities based on user preferences and destination system requirements.

An export module 810 within the source AI system 802 may manage data preparation and extraction operations that convert user profile information into formats suitable for secure transfer to destination systems. The export module 810 may implement data serialization algorithms that preserve information integrity while creating portable data representations that maintain compatibility with standardized migration protocols. In some aspects, the export module 810 may coordinate with data compression and encryption systems to optimize transfer efficiency while maintaining security protections throughout the export process. The export module 810 may implement validation procedures that verify data completeness and integrity before initiating transfer operations, ensuring that exported information accurately represents the original user profile contents.

A permissions module 812 within the source AI system 802 may manage access controls and authorization procedures that govern which user profile elements may be exported and under what conditions data transfer operations may proceed. The permissions module 812 may implement granular permission controls that enable users to specify which data categories, information elements, and/or preference settings may be included in migration operations. In some aspects, the permissions module 812 may coordinate with user authentication systems to verify user identity and authorization status before enabling data export capabilities. The permissions module 812 may maintain audit trails and access logs that document data export activities for security monitoring and compliance verification purposes.

As further shown in FIG. 8, a migration controller 822 may serve as an intermediary system that coordinates secure data transfer operations between the source AI system 802 and destination platforms while implementing security protocols and data integrity verification procedures. The migration controller 822 may establish secure communication channels that protect user data during transmission while ensuring compatibility between different AI system architectures and data formats. In some aspects, the migration controller 822 may implement distributed processing capabilities that enable parallel migration operations for multiple users while maintaining individual security controls and data isolation requirements. The migration controller 822 may coordinate with external authentication services and certification authorities to verify the legitimacy of both source and destination systems participating in migration operations. The migration controller 822 may implement security protocols similar to one or more authentication components described in previous aspects.

An authentication module 824 within the migration controller 822 may perform identity verification procedures that ensure migration requests originate from authorized users and legitimate system components. The authentication module 824 may implement multi-factor authentication protocols that verify user identity through multiple verification channels including password authentication, biometric verification, and/or cryptographic token validation. In some aspects, the authentication module 824 may coordinate with external identity providers and authentication services to leverage existing user credentials while maintaining security standards throughout the migration process. The authentication module 824 may implement session management capabilities that maintain authenticated states across extended migration operations while implementing timeout procedures that prevent unauthorized access to migration services. In some aspects, the authentication module 824 may implement authentication protocols similar to those used by authentication systems in FIGS. 1-7, while extending these capabilities to support cross-platform migration scenarios.

The authentication module 824 may establish communication pathways with a permission matrix 826 that maintains mappings of data access rights and authorization parameters that govern migration operations. The permission matrix 826 may define which data elements may be transferred between specific system combinations, which user roles may initiate migration operations, and/or what conditions govern successful migration completion. In some aspects, the permission matrix 826 may implement dynamic permission evaluation algorithms that consider user preferences, destination system capabilities, and/or regulatory compliance requirements when determining appropriate data transfer authorizations. The permission matrix 826 may maintain historical permission data that enables consistent authorization decisions across multiple migration sessions and system interactions. The permission matrix 826 may extend permission management concepts from earlier aspects to encompass inter-system data transfer authorizations and cross-platform access controls.

With continued reference to FIG. 8, a secure transfer module 828 within the migration controller 822 may manage the technical aspects of data transmission between source and destination systems while implementing encryption protocols and data integrity verification mechanisms. The secure transfer module 828 may establish encrypted communication channels that protect user data during transmission while implementing error detection and correction capabilities that ensure data accuracy throughout the transfer process. In some aspects, the secure transfer module 828 may coordinate with the export module 810 and the permissions module 812 to retrieve authorized data from source systems while maintaining security controls and access restrictions. The secure transfer module 828 may implement transfer optimization algorithms that balance security requirements with performance considerations to minimize migration duration while maintaining data protection standards.

The secure transfer module 828 may coordinate with a data format standardizer that ensures compatibility between different AI system architectures by converting user profile data into standardized formats (e.g., standardized data format 830) that destination systems can process. The data format standardizer may implement data transformation algorithms that preserve information content while adapting data structures to match destination system requirements and capabilities. In some aspects, the data format standardizer may maintain compatibility libraries that support multiple data format standards, enabling migration operations between diverse AI platforms with different technical specifications and data organization schemes. The data format standardizer may implement validation procedures that verify format conversion accuracy and completeness before transmitting standardized data to destination systems.

A permission controller 832 within the migration controller 822 may provide ongoing oversight of migration operations by enforcing data access policies and ensuring compliance with user privacy preferences throughout the transfer process. The permission controller 832 may monitor data transfer activities in real-time to detect unauthorized access attempts or policy violations that may compromise user data security or privacy protections. In some aspects, the permission controller 832 may implement automated response mechanisms that halt migration operations when security violations are detected or when transfer activities exceed authorized parameters. The permission controller 832 may coordinate with audit logging systems to maintain records of migration activities for security analysis and compliance verification purposes.

The user profile migration system 800 may include a target AI system 804 that serves as the destination platform for migrated user profile data and implements processing capabilities that integrate transferred information into local system architectures. The target AI system 804 may establish secure communication pathways with the migration controller 822 to receive standardized user profile data while implementing local security protocols that protect imported information from unauthorized access or modification. In some aspects, the target AI system 804 may implement compatibility verification procedures that ensure imported data aligns with local system capabilities and service offerings before completing migration operations. The target AI system 804 may coordinate with user authentication systems to establish appropriate access controls and permission settings for newly migrated user profiles. In some aspects, the target AI system 804 may be the same as or similar to the AI-interface model 120 of FIG. 1, AI system 204 of FIG. 2, or other AI systems described herein, configured to receive and integrate migrated user profile data.

An import module 814 within the target AI system 804 may process incoming standardized data from the migration controller 822 and coordinate the integration of transferred user profile information into local system databases and processing frameworks. The import module 814 may implement data validation procedures that verify the integrity and completeness of received user profile data before initiating integration operations. In some aspects, the import module 814 may coordinate with local authentication systems to establish user accounts and access credentials that enable users to access their migrated profile information through the target AI system 804. The import module 814 may implement error handling procedures that manage data import failures or compatibility issues that may arise during the integration process.

As further shown in FIG. 8, a transform module 816 within the target AI system 804 may perform data adaptation operations that convert standardized user profile information into local data formats and organizational structures that align with the target system's processing requirements and service capabilities. The transform module 816 may implement transformation capabilities that complement or extend the data processing functions of components described in previous figures, adapted for migration scenarios. The transform module 816 may implement data mapping algorithms that correlate standardized data elements with local database schemas while preserving information content and contextual relationships. In some aspects, the transform module 816 may coordinate with local recommendation engines and personalization systems to ensure that migrated preference data integrates effectively with existing algorithmic frameworks and content discovery mechanisms. The transform module 816 may implement data enrichment procedures that enhance migrated information with local system metadata and contextual elements that support improved service delivery and personalization capabilities.

The target AI system 804 may establish a target user profile 818 that serves as the local repository for migrated user information and provides the foundation for personalized service delivery within the destination platform. The target user profile 818 may incorporate user data transferred from the source AI system 802 while implementing local data organization schemes and access control mechanisms that align with the target system's architecture and security requirements. In some aspects, the target user profile 818 may support incremental data updates and synchronization capabilities that enable ongoing profile enhancement based on user interactions within the destination system. The target user profile 818 may implement permission controls that enable access by multiple AI agents under user-specified permissions to allow cross-AI personalization and universal access across different service components and platform integrations.

The target user profile 818 may contain migrated profile data 820 that preserves the data structure and information content from the source system while adapting to local system requirements and capabilities. The migrated profile data 820 may maintain the same data categories and information elements as the original profile, including media data encompassing, for example, approximately 10,000 songs, non-media information such as travel and research preferences, and/or preference settings that define user interaction patterns and service customization options. In some aspects, the migrated profile data 820 may implement data versioning capabilities that track profile evolution within the destination system while maintaining historical information about the migration source and transfer process. The migrated profile data 820 may support selective access controls that enable users to modify permission settings and data sharing preferences within the destination system while maintaining compatibility with cross-platform personalization capabilities and multi-agent access scenarios. In some aspects, the migrated profile data 820 structure may maintain compatibility with profile data formats used by AI systems described in previous figures, enabling migrations or synchronization operations between multiple AI platforms.

Figure 9:
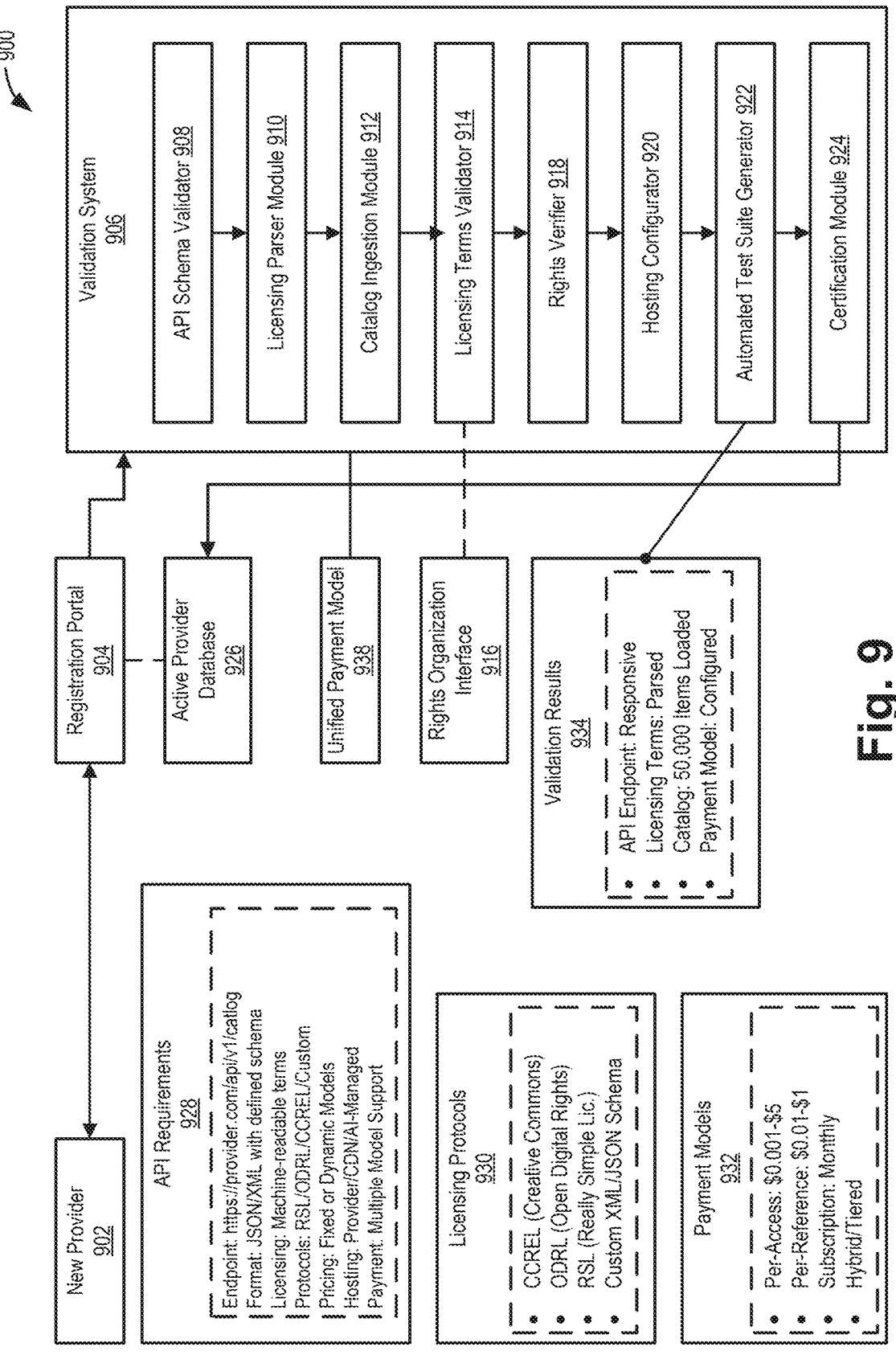
FIG. 9 illustrates a provider onboarding system for validating and integrating new content providers, according to aspects of the present disclosure.

Referring to FIG. 9, a provider onboarding system 900 may facilitate the integration of new content providers into AI-powered aggregation platforms through validation and certification processes. The provider onboarding system 900 may enable scalable expansion of content ecosystems by automating the technical verification, licensing validation, and system integration procedures that ensure new providers meet platform requirements and compatibility standards. In some aspects, the provider onboarding system 900 may implement standardized onboarding workflows that accommodate diverse provider types, from individual content creators to large media corporations, while maintaining consistent quality and compliance standards across integrated services. The provider onboarding system 900 may coordinate with existing platform infrastructure to ensure that newly integrated providers operate seamlessly within established content discovery, licensing, and delivery frameworks.

A new provider 902 within the provider onboarding system 900 may represent content creators, media companies, or service organizations seeking to integrate their offerings with AI-powered aggregation platforms. The new provider 902 may maintain content catalogs, licensing arrangements, and technical infrastructure that require validation and integration with platform systems before content becomes available to end users. In some aspects, the new provider 902 may operate under various business models including subscription services, individual content sales, or advertising-supported offerings that require different integration approaches and technical configurations. The new provider 902 may implement different hosting configurations including provider-hosted, CDN-based, and AI-managed delivery options that accommodate various technical capabilities and performance requirements.

The new provider 902 may establish communication with a registration portal 904 that serves as the entry point for provider onboarding operations and initial system integration procedures. The registration portal 904 may implement user interface systems that enable providers to submit technical specifications, licensing information, and business model details through standardized forms and data submission processes. In some aspects, the registration portal 904 may coordinate with external documentation systems and support resources that guide providers through onboarding requirements and technical integration procedures. The registration portal 904 may implement authentication mechanisms that verify provider identity and authorization status before enabling access to onboarding systems and validation processes.

With continued reference to FIG. 9, the registration portal 904 may interface with API requirements 928 that specify mandatory integration criteria and technical standards for successful platform integration. The API requirements 928 may define endpoint specifications, data format requirements, authentication protocols, and response time standards that providers must implement to ensure compatibility with platform systems. In some aspects, the API requirements 928 may include multiple technical specifications such as endpoint URLs that specify content delivery locations, format requirements for JSON or XML data with defined schema structures, and licensing specifications for machine-readable terms that enable automated processing. In some aspects, the API requirements 928 may specify format requirements for JSON or XML data with defined schema structures, including emerging standards such as Really Simple Licensing (RSL) which enables publishers to embed XML-based licensing terms directly within robots.txt files for automated discovery and processing by AI systems. The API requirements 928 may specify protocol requirements including RESTful interfaces, OAuth 2.0 authentication systems, or custom authentication mechanisms that align with platform security standards.

The new provider 902 may coordinate with licensing protocols 930 that define content usage rights and permissions expression mechanisms within the provider onboarding system 900. The licensing protocols 930 may include standardized rights expression languages such as Creative Commons Rights Language for open content licensing, Open Digital Rights Language for rights management, MPEG Rights Expression Language for multimedia content protection, Really Simple Licensing (RSL) for web publisher content monetization, and custom XML or JSON schemas that accommodate provider-specific licensing requirements. RSL, in particular, may enable web publishers to specify machine-readable licensing terms including per-crawl pricing, subscription fees, and per-reference compensation models directly within robots.txt extensions, facilitating automated negotiation between content providers and AI systems. In some aspects, the licensing protocols 930 may enable automated processing of licensing terms by AI systems while ensuring compliance with legal requirements and content protection standards. The licensing protocols 930 may coordinate with authentication infrastructure that utilizes blockchain verification or digital signature validation to verify legitimate content providers or product manufacturers, ensuring that only authorized entities can distribute content through the platform.

The provider onboarding system 900 may incorporate payment models 932 that define monetization options and financial integration requirements for new providers. The payment models 932 may support various revenue structures including free content offerings priced at zero cost, advertising-supported models with revenue ranges from zero to five dollars, per-reference pricing models with costs ranging from one cent to one dollar per access, subscription models with monthly billing cycles, and hybrid or tiered arrangements that combine multiple monetization approaches. In some aspects, the payment models 932 may coordinate with financial processing systems that handle revenue distribution, tax calculations, and compliance reporting across different jurisdictions and regulatory environments. The payment models 932 may implement flexible pricing mechanisms that accommodate dynamic pricing strategies and promotional campaigns that providers may utilize to optimize content distribution and user acquisition.

As further shown in FIG. 9, the registration portal 904 may coordinate with a validation system 906 that implements verification procedures to ensure provider compliance with platform requirements and technical standards. The validation system 906 may comprise multiple specialized validation modules arranged in sequential processing pipelines that evaluate different aspects of provider integration readiness and system compatibility. In some aspects, the validation system 906 may implement parallel processing capabilities that enable simultaneous validation of multiple provider applications while maintaining individual assessment accuracy and thoroughness. The validation system 906 may coordinate with external verification services and certification authorities that provide additional validation capabilities for specialized content types or regulatory compliance requirements.

An API schema validator 908 within the validation system 906 may verify that provider API implementations conform to platform requirements and technical specifications defined in the API requirements 928. The API schema validator 908 may execute automated testing procedures that verify endpoint accessibility, response format compliance, authentication implementation, and performance characteristics against established platform standards. In some aspects, the API schema validator 908 may implement testing protocols that verify RESTful endpoint accessibility at specified URLs, OAuth 2.0 or custom authentication implementation correctness, JSON or XML response format compliance with defined schemas, and presence of required data fields including pricing information, licensing terms, and content availability indicators. The API schema validator 908 may evaluate response time performance against specified thresholds to ensure that provider systems can maintain acceptable performance levels under expected load conditions.

A licensing parser module 910 within the validation system 906 may process and interpret machine-readable licensing terms provided by the new provider 902 to ensure compatibility with platform licensing management systems. The licensing parser module 910 may implement parsing algorithms that extract licensing information from various formats including the licensing protocols 930 and convert them into standardized internal representations that platform systems can process effectively. In some aspects, the licensing parser module 910 may coordinate with rights management systems to verify that parsed licensing terms align with legal requirements and content protection standards. The licensing parser module 910 may implement validation procedures that ensure licensing information completeness and accuracy before proceeding with provider integration processes.

With continued reference to FIG. 9, a catalog ingestion module 912 within the validation system 906 may import and process provider content catalogs to ensure compatibility with platform content discovery and recommendation systems. The catalog ingestion module 912 may implement data transformation algorithms that normalize content metadata formats while preserving provider-specific information and content characteristics. In some aspects, the catalog ingestion module 912 may coordinate with the catalog aggregator 424 to ensure that imported content integrates effectively with existing platform content indexes and search capabilities. The catalog ingestion module 912 may implement data validation procedures that verify content metadata completeness, accuracy, and consistency with provider licensing terms and availability information.

A licensing terms validator 914 within the validation system 906 may ensure that provider licensing arrangements comply with platform policies and legal requirements while maintaining compatibility with automated licensing management systems. The licensing terms validator 914 may implement validation algorithms that analyze licensing terms for completeness, legal compliance, and technical compatibility with platform rights management infrastructure. In some aspects, the licensing terms validator 914 may coordinate with legal review systems and compliance monitoring tools to ensure that provider licensing arrangements meet regulatory requirements across different jurisdictions. The licensing terms validator 914 may verify that licensing terms align with the payment models 932 and enable appropriate revenue distribution and rights holder compensation mechanisms.

A rights organization interface 916 within the validation system 906 may manage relationships with collective rights management organizations and coordinate licensing compliance across multiple rights holder categories. The rights organization interface 916 may establish communication pathways with performing rights organizations, mechanical rights organizations, and synchronization rights organizations to ensure that provider content licensing aligns with collective rights management requirements. In some aspects, the rights organization interface 916 may coordinate with external rights databases and verification systems to confirm that providers have appropriate authorization to distribute content through platform systems. The rights organization interface 916 may implement ongoing monitoring capabilities that track changes in rights holder relationships and licensing arrangements that may affect provider content availability or distribution terms.

As further shown in FIG. 9, a rights verifier 918 within the validation system 906 may confirm that providers have appropriate legal authority to distribute content through platform systems while ensuring compliance with copyright and intellectual property requirements. The rights verifier 918 may implement verification procedures that analyze provider content catalogs against rights holder databases and licensing registries to identify potential conflicts or unauthorized content distribution scenarios. In some aspects, the rights verifier 918 may coordinate with authentication infrastructure that utilizes blockchain verification or digital signature validation to verify legitimate content providers or product manufacturers through cryptographic verification mechanisms and distributed ledger technologies. The rights verifier 918 may implement ongoing monitoring capabilities that detect changes in content rights status and alert platform administrators to potential compliance issues that may require provider notification or content removal procedures.

A hosting configurator 920 within the validation system 906 may establish content delivery infrastructure configurations that align with provider technical capabilities and platform performance requirements. The hosting configurator 920 may coordinate with providers to implement hosting arrangements that support multiple hosting configurations including provider-hosted systems where content providers maintain direct control over delivery infrastructure, CDN-based configurations that leverage distributed content delivery networks for performance optimization, and AI-managed delivery options that provide dynamic resource allocation and intelligent caching strategies. In some aspects, the hosting configurator 920 may implement load balancing mechanisms and failover procedures that ensure reliable content delivery across different hosting configurations while maintaining consistent user experiences. The hosting configurator 920 may coordinate with the AI managed hosting 530 to establish intelligent content delivery capabilities that adapt to usage patterns and demand fluctuations.

An automated test suite generator 922 within the validation system 906 may create and execute testing procedures that verify end-to-end provider integration functionality before certification approval at 924. The automated test suite generator 922 may implement test scenarios that simulate real-world content delivery operations, API interactions, and payment processing workflows to ensure that provider systems operate correctly under expected usage conditions. In some aspects, the automated test suite generator 922 may generate customized test suites based on specific provider configurations, content types, and/or hosting arrangements to ensure thorough validation coverage. The automated test suite generator 922 may produce detailed test reports that contribute to the validation results 934 and inform the certification module 924's final approval decisions.

The validation system 906 may coordinate with a unified payment model 938 that implements and validates the payment models 932 selected by providers during the onboarding process. In some aspects, the unified payment model 938 may implement payment processing capabilities that handle various transaction types including subscription billing, per-access charges, advertising revenue distribution, and hybrid payment arrangements that combine multiple revenue streams. In some aspects, the unified payment model 938 may coordinate with external payment processors and financial institutions to ensure secure transaction processing while maintaining compliance with financial regulations and data protection requirements. The unified payment model 938 may process financial transactions and manage payment distribution among providers while ensuring that the chosen payment models 932, whether free, advertising-supported, per-reference, subscription, or hybrid arrangements, are correctly configured and operational within the platform's financial infrastructure. In some aspects, the unified payment model 938 may validate that provider-selected payment models 932 integrate properly with external payment processors and financial institutions to ensure secure transaction processing while maintaining compliance with financial regulations and data protection requirements. The unified payment model 938 may implement automated settlement procedures that distribute revenues to providers according to the specific payment models 932 they have chosen and the usage metrics collected through platform monitoring systems.

With continued reference to FIG. 9, a certification module 924 within the validation system 906 may issue final approval and certification for providers to operate on the platform after successful completion of validation procedures and compliance verification processes. The certification module 924 may implement automated certification procedures that evaluate validation results from multiple system components and determine whether providers meet platform requirements for content distribution and service delivery. In some aspects, the certification module 924 may coordinate with the provider registration system to include automated tests that verify end-to-end functionality before adding providers to the active database, ensuring that technical integration points operate correctly and that content delivery workflows function as expected. The certification module 924 may implement certification renewal procedures that periodically re-evaluate provider compliance and system integration status to maintain ongoing platform quality and security standards.

The provider onboarding system 900 may maintain an active provider database 926 that serves as the authoritative repository for validated provider information and system integration configurations. The active provider database 926 may store provider profiles including technical specifications, licensing arrangements, content catalog information, and performance metrics that inform platform operations and content discovery processes. In some aspects, the active provider database 926 may implement data synchronization mechanisms that maintain consistency with provider systems while tracking changes in content availability, pricing structures, and licensing terms. The active provider database 926 may coordinate with the user profile database 210 and other platform systems to ensure that provider information remains accessible to recommendation algorithms and content discovery mechanisms that serve end users.

As further shown in FIG. 9, the validation system 906 may generate validation results 934 throughout the provider onboarding process that provide detailed feedback on integration status and compliance verification outcomes. The validation results 934 may include specific assessment outcomes such as API endpoint responsiveness confirmation, licensing terms parsing completion, catalog loading statistics indicating successful import of content items, and payment model configuration verification. In some aspects, the validation results 934 may provide diagnostic information that identifies specific issues or requirements that providers must address before completing the onboarding process. The validation results 934 may include performance metrics and compatibility assessments that inform platform administrators about provider integration quality and potential optimization opportunities that may enhance content delivery performance and user experience across the platform ecosystem.

Figure 10A:
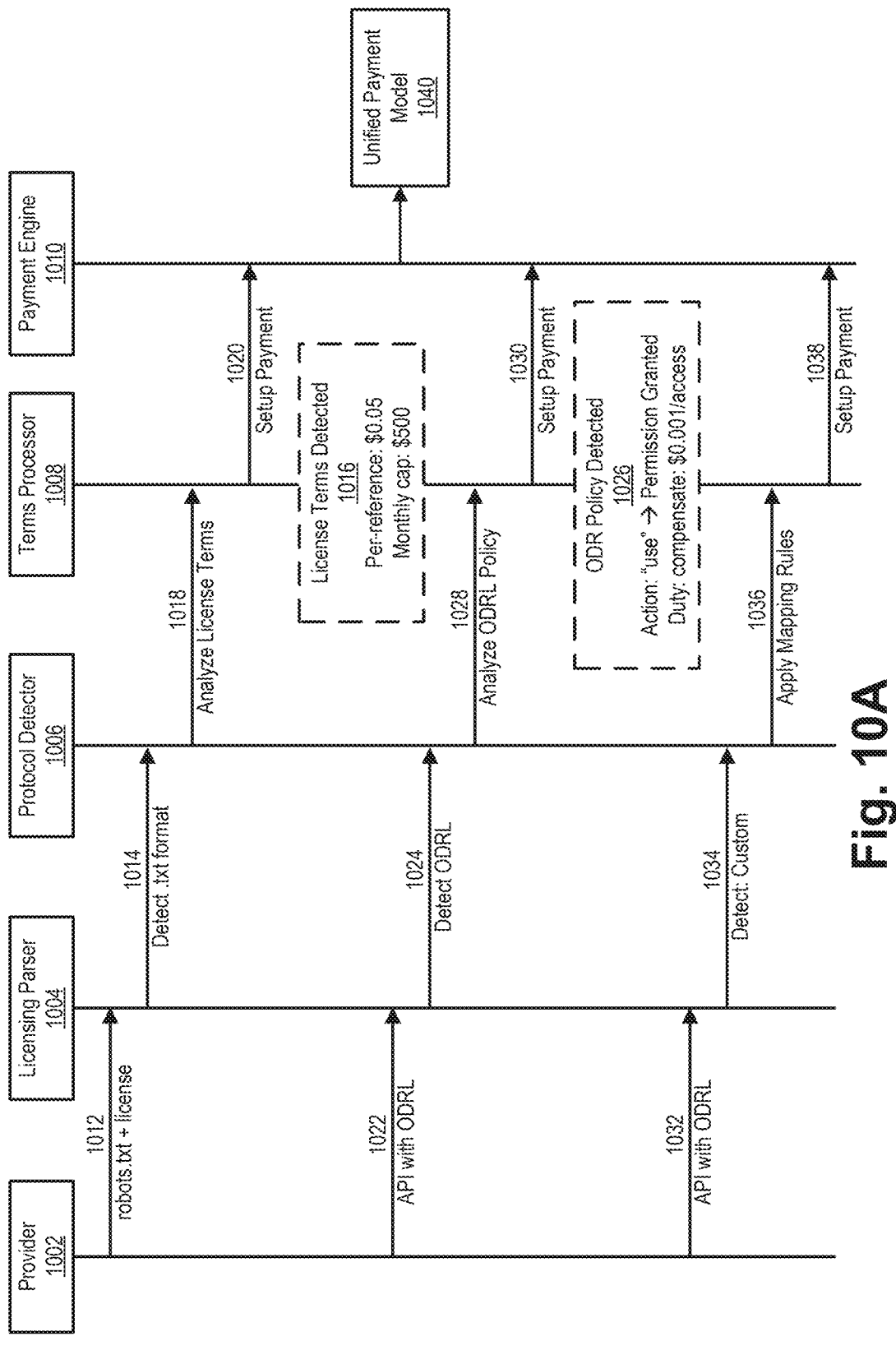
FIG. 10A illustrates a sequence diagram depicting automated processing flow for parsing digital rights management policies, according to aspects of the present disclosure.

Referring to FIG. 10A, in operation, an AI system such as AI system 204 of FIG. 2, AI system 304 of FIG. 3, or AI system 406 of FIG. 4 may encounter content during automated discovery, crawling, or content access operations that requires licensing evaluation before usage. Upon discovering content that contains machine-readable licensing information, the AI system may initiate the automated licensing protocol processing flows depicted in FIG. 10A to determine usage permissions and compensation requirements. The AI system may access content according to at least one of the processing flows shown in FIG. 10A, enabling automated compliance with content provider licensing terms without requiring manual intervention or pre-negotiated licensing agreements. This automated approach allows AI systems to dynamically discover, evaluate, and comply with diverse licensing frameworks during real-time content access scenarios.

In some aspects, a provider 1002 may initiate automated licensing protocol processing by transmitting licensing information to downstream processing components that parse, analyze, and configure payment systems based on machine-readable rights expressions. The provider 1002 may implement various licensing formats including robots.txt extensions, Open Digital Rights Language policies, RSL, and Creative Commons Rights Language expressions that enable automated discovery and processing of content licensing terms. In some aspects, the provider 1002 may expose licensing terms and pricing information through robots.txt extensions as a standardized method for content providers to communicate rights and compensation requirements to AI systems and automated discovery mechanisms. The provider 1002 may coordinate with multiple processing components that handle different aspects of licensing protocol interpretation and payment system configuration to ensure rights management across various licensing frameworks. In some aspects, the provider 1002 may be the same as or similar to the content provider 110, 114, and/or 118 of FIG. 1, a provider 221, a provider providing a provider API 308 of FIG. 3, the content provider 402 of FIG. 4, a new provider 902, and/or other content distribution entities described in previous figures.

The automated licensing processing sequence may commence at step 1012 when the provider 1002 transmits licensing information in robots.txt format combined with license declarations to a licensing parser 1004. The robots.txt format may represent an extended protocol that enables content providers to publish machine-readable licensing terms alongside traditional web crawling directives, facilitating automated discovery of content rights and pricing information by AI systems. In some aspects, the robots.txt extensions may include structured data elements that specify usage permissions, compensation requirements, and access restrictions in formats that automated systems can interpret without human intervention. In some aspects, the robots.txt extensions may implement standards such as Really Simple Licensing (RSL), which may provide XML-based schemas for expressing various monetization models including per-crawl charges for AI training data access, subscription-based licensing for ongoing content usage, and per-reference fees when AI systems cite or reference content in their responses. In some aspects, the RSL schema may define specific XML elements including <usage-type>, <compensation-rate>, <access-duration>, and <restriction-scope> that enable granular specification of licensing terms. The robots.txt extensions may implement header fields such as 'AI-License-Policy:', 'Crawl-Rate-Limit:', and 'Usage-Fee:' that provide machine-readable directives for automated content access systems. The licensing parser 1004 may receive this licensing data and initiate processing operations that extract rights information and prepare it for subsequent analysis and system configuration procedures. In some aspects, the licensing parser 1004 may incorporate functionality similar to the content analysis components described in previous figures.

Upon receiving the licensing data from the provider 1002, the licensing parser 1004 may implement format recognition algorithms that identify different licensing expression languages and data structures within the received information, enabling appropriate processing pathways for various rights management protocols. In some aspects, the licensing parser 1004 may execute step 1014 by detecting the text format and parsing the embedded licensing information before forwarding the processed content to a protocol detector 1006. In some aspects, the licensing parser 1004 may implement regular expression patterns, XML schema validation, and/or JSON/JSON-LD context processing to identify licensing formats. The parser may maintain format signature databases that enable rapid classification of incoming licensing data based on structural markers, namespace declarations, and vocabulary patterns specific to different rights expression languages. In some aspects, the licensing parser 1004 may coordinate with multiple protocol detection systems to ensure analysis of complex licensing documents that may contain multiple rights expression formats or nested licensing structures. The protocol detector 1006 may analyze the parsed licensing content to identify specific rights expression languages and extract pricing models, usage permissions, and/or compensation requirements embedded within the licensing data. The license terms detected 1016 show an example of extracted pricing parameters including per-reference charges of $0.05 and a monthly spending cap of $500, demonstrating the system's ability to parse hybrid pricing models from robots.txt format data.

With continued reference to FIG. 10A, the protocol detector 1006 may perform step 1018 by analyzing, processing, and/or parsing the license terms and forwarding the analyzed information to a terms processor 1008 for detailed rights analysis and payment parameter extraction. The protocol detector 1006 may implement specialized parsing algorithms that recognize different licensing protocol formats including robots.txt extensions, Open Digital Rights Language policies, RSL, and/or Creative Commons Rights Language expressions. In some aspects, the protocol detector 1006 may implement state machine processing that transitions between parsing states based on detected licensing protocol markers. The protocol detector 1006 may maintain protocol-specific grammar rules and semantic mapping tables that translate licensing expressions into normalized data structures for downstream processing. In some aspects, the protocol detector 1006 may process Open Digital Rights Language policies for automated rights management and compensation, extracting action-based permissions and duty specifications that define how content may be used and what compensation may be required. The protocol detector 1006 may support Creative Commons Rights Language for standardized licensing expression, enabling processing of licensing frameworks that facilitate content sharing and reuse under specified conditions.

The terms processor 1008 may analyze the parsed licensing information from the protocol detector 1006 to extract specific pricing models, usage restrictions, and compensation requirements that inform payment system configuration. In some aspects, the terms processor 1008 may implement constraint satisfaction algorithms that verify pricing model consistency, detect conflicting usage permissions, and/or validate compensation requirement completeness. The terms processor 1008 may apply business rule engines that ensure extracted licensing terms comply with platform policy requirements and legal jurisdiction constraints. The terms processor 1008 may process various licensing term structures including per-reference pricing models that specify costs such as, for example, $0.05 per content access, monthly spending caps that limit user expenses to predetermined amounts such as, for example, $500 per billing period, and micro-compensation duties that require payments as low as, for example, $0.001 per access event. In some aspects, the terms processor 1008 may implement validation algorithms that verify licensing term consistency and completeness while ensuring that extracted pricing information aligns with provider business models and platform payment processing capabilities. The terms processor 1008 may coordinate with external rights databases and validation systems to confirm that processed licensing terms comply with legal requirements and industry standards for digital content distribution. In some aspects, the terms processor 1008 may coordinate with licensing evaluation components similar to those described in connection with previous figures.

As further shown in FIG. 10A, the terms processor 1008 may execute step 1020 by configuring payment parameters with a payment engine 1010 based on the detected licensing terms and extracted compensation requirements. The payment engine 1010 may receive payment configuration data from the terms processor 1008 and establish billing mechanisms that support various pricing models including usage-based charging, subscription caps, and micro-payment processing for fractional compensation amounts. In some aspects, the payment engine 1010 may implement event-driven billing systems that capture content access events through callback mechanisms, API hooks, and/or usage monitoring interfaces. The payment engine 1010 may maintain transaction queues, retry mechanisms, and/or reconciliation processes that ensure accurate compensation tracking across high-volume content access scenarios. In some aspects, the payment engine 1010 may coordinate with external payment processing systems and financial institutions to ensure that configured payment parameters align with transaction processing capabilities and regulatory compliance requirements. The payment engine 1010 may implement automated billing procedures that track content usage events and calculate appropriate compensation amounts based on the licensing terms processed by upstream system components. In some aspects, the payment engine 1010 may be the same as or similar to payment processing components described in previous figures.

The automated licensing processing sequence may demonstrate parallel processing capabilities that enable simultaneous handling of multiple licensing protocols from the provider 1002. In some aspects, the provider 1002 may transmit API-based licensing information that includes Open Digital Rights Language policies to the licensing parser 1004 through the same step 1022 initiation process. The licensing parser 1004 may detect the ODRL format during step 1024 and forward the parsed policy information to the protocol detector 1006 for specialized ODRL processing. The protocol detector 1006 may analyze the ODRL policy at step 1028, extracting action-based permissions that specify allowed usage types such as "use" permissions and duty specifications that define compensation requirements such as "compensate: $0.001/access" for each content access event, as depicted in terms of an example ODR Policy 1026. The terms processor 1008 may process and configure appropriate payment parameters with the payment engine 1010 through step 1032.

The system may process Creative Commons Rights Language expressions, Really Simple Licensing (RSL) formats, custom licensing protocols, proprietary rights expression formats, and other machine-readable licensing standards through similar parallel processing pathways that accommodate standardized open licensing frameworks. For example, the provider 1002 may transmit CCRL-formatted licensing information to the licensing parser 1004 at 1032, which may detect the Creative Commons format during step 1034 and coordinate with the protocol detector 1006 for appropriate parsing operations. In some aspects, the protocol detector 1006 may apply mapping rules during step 1036 that translate Creative Commons licensing terms into internal system representations that align with platform payment processing and rights management capabilities. The terms processor 1008 may process the mapped Creative Commons terms and configure appropriate payment parameters with the payment engine 1010 through step 1038, ensuring that open licensing frameworks integrate effectively with commercial content distribution mechanisms.

The payment engine 1010 may coordinate with the unified payment model 1040 to consolidate payment configurations from multiple licensing protocols into a single, consistent payment processing framework that handles diverse compensation requirements and billing mechanisms. The unified payment model 1040 may receive payment setup information from the payment engine 1010 and implement billing systems that support per-reference pricing, monthly spending caps, micro-payment processing, and subscription-based access models simultaneously. In some aspects, the unified payment model 1040 may execute final payment setup procedures at step 1038 that establish automated billing mechanisms, configure revenue distribution pathways, and implement compliance monitoring systems that ensure ongoing adherence to processed licensing terms. The unified payment model 1040 may coordinate with external financial systems and payment processors to ensure that configured payment mechanisms operate effectively across different transaction types and compensation models while maintaining security and regulatory compliance throughout the automated licensing processing workflow. In some aspects, the unified payment model 1040 may implement revenue sharing algorithms that calculate content provider compensation based on usage metrics, pricing tiers, and contractual obligations. The model may coordinate with escrow systems, payment aggregation services, and financial reporting mechanisms to ensure transparent and auditable compensation distribution. In some aspects, the unified payment model 1040 may be the same as or similar to the unified payment model 938 described in FIG. 9, providing centralized payment coordination across multiple licensing frameworks and content access scenarios.

Figure 10B:
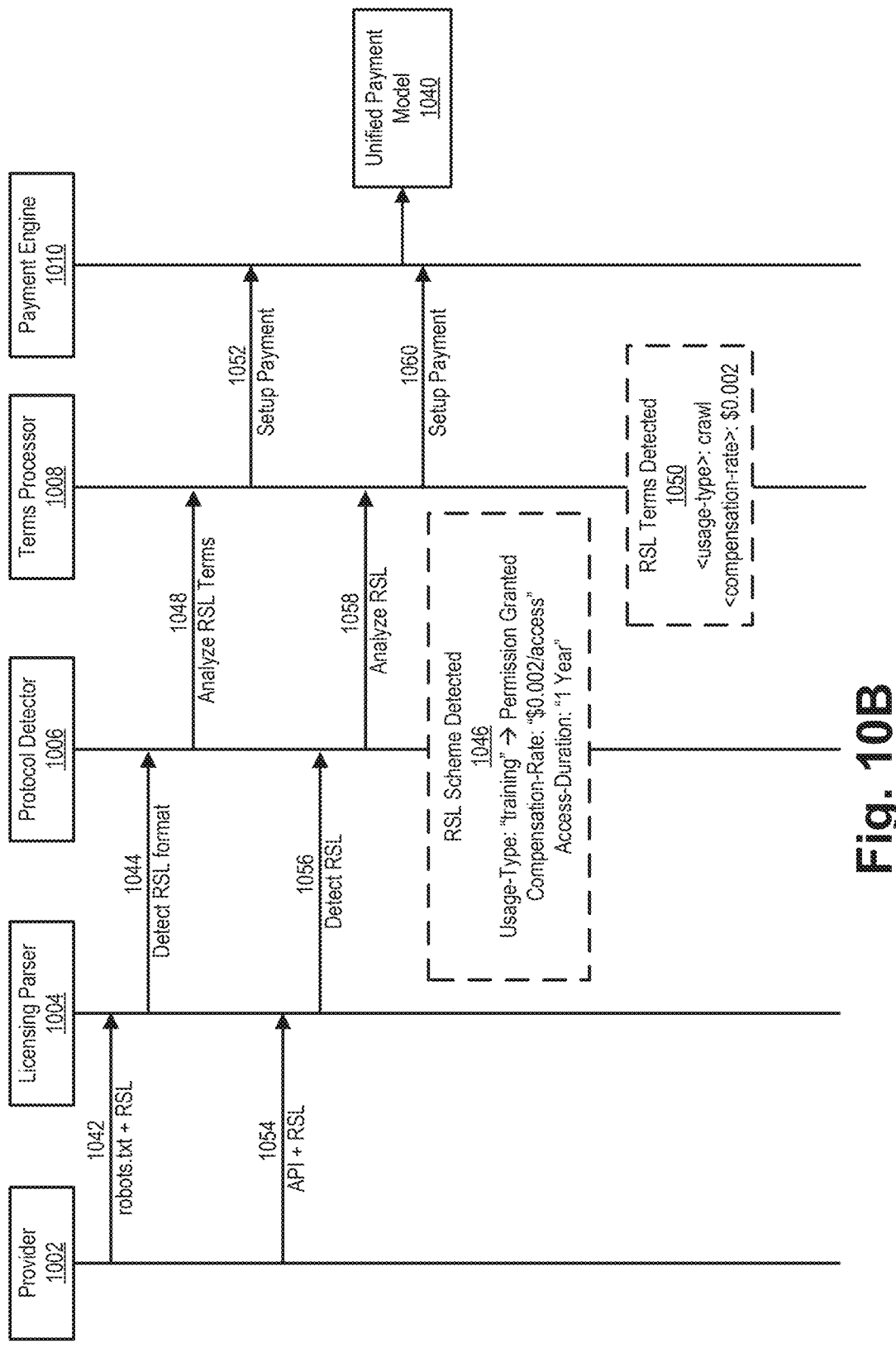
FIG. 10B illustrates a sequence diagram depicting automated processing flow for parsing digital rights management policies, according to aspects of the present disclosure.

Referring to FIG. 10B, the system demonstrates processing flows for Really Simple Licensing (RSL) protocols, building upon the automated licensing framework described in connection with FIG. 10A and other content described with reference to FIGS. 1-10A. The RSL processing pathways illustrated in FIG. 10B provide an example of the ability to handle XML-based licensing schemas that provide granular specification of usage permissions, compensation requirements, and access control mechanisms through standardized RSL elements.

The first RSL processing flow commences at step 1042 when the provider 1002 transmits licensing information in robots.txt format combined with RSL declarations to the licensing parser 1004. The RSL schema embedded within robots.txt extensions may implement specific XML elements including <usage-type>, <compensation-rate>, <access-duration>, <restriction-scope>, and <access-token> elements that enable automated systems to determine both pricing and authentication requirements for content access. At step 1044, the licensing parser 1004 detects the RSL format and forwards the parsed RSL content to the protocol detector 1006 for specialized schema analysis.

The protocol detector 1006 performs step 1048 by analyzing the RSL terms and extracting XML-based licensing specifications before forwarding the processed information to the terms processor 1008. The RSL schema detected 1046 demonstrates an example of extracted RSL elements including Usage-Type "training" with Permission Granted status, Compensation-Rate "$0.002/access", and Access-Duration "1 Year", illustrating the system's capability to interpret structured RSL licensing terms that specify both temporal and financial constraints for content usage.

The second parallel processing flow demonstrates API-based RSL delivery, commencing at step 1054 when the provider 1002 transmits RSL-formatted licensing data through API responses to the licensing parser 1004. At step 1056, the licensing parser 1004 detects the RSL protocol format and coordinates with the protocol detector 1006 for RSL-specific processing. The protocol detector 1006 executes step 1058 by analyzing the RSL policy structure, extracting granular XML elements that specify usage permissions and compensation requirements.

The RSL terms detected 1050 show specific examples of extracted RSL XML elements including <usage-type>: crawl and <compensation-rate>: $0.002, demonstrating the system's ability to parse detailed RSL specifications for different usage scenarios. The RSL processing flows may also extract <access-token> elements that specify authentication requirements, enabling the system to coordinate content access permissions with payment processing and user authentication mechanisms. At steps 1052 and 1060 respectively, the terms processor 1008 configures payment parameters with the payment engine 1010 based on the extracted RSL compensation requirements and access control specifications.

The parallel RSL processing pathways may utilize the unified payment model 1040, which consolidates RSL-based payment configurations with other licensing protocol payments as described in connection with FIG. 10A. The unified payment model 1040 may implement RSL-specific billing mechanisms that handle XML-defined compensation rates, access duration limits, and/or token-based authentication requirements, ensuring that RSL licensing terms integrate with the broader automated licensing processing framework while maintaining the granular control capabilities inherent in XML-based RSL schemas.

It should be noted that the sequence diagram of FIG. 10A and FIG. 10B represents logical data flow rather than strict sequential processing. In some aspects, the licensing parser 1004 and protocol detector 1006 may be implemented as a unified component that performs protocol detection prior to semantic parsing, or alternatively, may execute protocol detection concurrently with initial parsing operations. The separation shown in FIG. 10A and/or FIG. 10B illustrates distinct logical operations of data reception, format identification, protocol detection, and/or semantic parsing, which may be reordered, parallelized, or combined in specific implementations while maintaining the same functional result. In certain aspects, the system implements a multiphase processing approach where the licensing parser 1004 performs lexical analysis to identify potential licensing blocks within received data, while the protocol detector 1006 examines these blocks to determine their specific format before invoking appropriate parsing rules. The illustrated flow where the licensing parser 1004 precedes the protocol detector 1006 may enable efficient handling of embedded licensing scenarios, such as when licensing terms are embedded within larger documents containing multiple licensing blocks in different formats. In such cases, the licensing parser 1004 first extracts potential licensing sections using pattern matching, regular expressions, structural analysis, or machine-learning algorithms, after which the protocol detector 1006 examines these pre-filtered sections to identify their specific protocol format. This approach may reduce computational overhead by avoiding unnecessary protocol detection attempts on non-licensing content while maintaining compatibility with diverse document structures and mixed-format licensing implementations.

Building upon the automated licensing protocol processing capabilities described in FIGS. 10A and 10B, which may enable AI systems to dynamically interpret and comply with individual content provider licensing terms, a collective rights management system depicted in FIG. 11A addresses the complex challenge of coordinating licensing across multiple rights organizations and territorial jurisdictions. While the automated licensing protocols of FIGS. 10A and 10B may handle direct provider-to-AI licensing scenarios through machine-readable formats like robots.txt extensions and RSL schemas, real-world content distribution may involve coordination with collective rights organizations that represent thousands of rights holders across different creative categories and geographic territories. For instance, when a user in the United States requests access to a popular song, the AI system may coordinate with the American Society of Composers, Authors and Publishers (ASCAP) or Broadcast Music, Inc. (BMI) for performing rights, mechanical rights organizations for reproduction rights, and potentially directly with major rights holders for master recording licenses. However, when a user in Germany requests the same song, the AI system may coordinate instead with GEMA for both performing and mechanical rights, which may have different compensation rates, usage restrictions, and licensing terms than the U.S. organizations. Additionally, certain rights that are bundled together in one territory may be administered separately in another. For example, streaming rights that are handled collectively in the United States might involve separate negotiations with performing rights societies and mechanical rights organizations in European territories. This territorial variation in rights administration, compensation structures, and licensing arrangements enables the collective rights management capabilities depicted in FIG. 11A, which extend the automated licensing foundation of FIGS. 10A and 10B to encompass the broader ecosystem of rights organizations, territorial compliance frameworks, and cross-jurisdictional licensing coordination for global content distribution.

Referring to FIG. 11A, a collective rights management architecture 1100 may implement collective rights management capabilities that coordinate with multiple rights organizations and territorial licensing frameworks to ensure compliance with international content distribution requirements. The collective rights management architecture may enable automated processing of licensing arrangements across different rights categories while maintaining territorial compliance and geographic access controls. In some aspects, the collective rights management architecture may coordinate with external rights organizations and territorial databases to provide real-time licensing resolution that adapts to user locations and content availability restrictions. The collective rights integration may facilitate scalable content distribution across multiple jurisdictions while ensuring appropriate compensation to rights holders and compliance with regional licensing requirements. In some aspects, the collective rights management architecture 1100 may integrate with blockchain-based rights verification technologies to provide immutable licensing transaction records and automated smart contract execution for rights holder compensation.

In some aspects, a performing rights module 1102 may interface with performing rights organizations that manage public performance rights for musical works and compositions across different territories and licensing jurisdictions. The performing rights module 1102 may establish communication pathways with organizations such as ASCAP, BMI, SESAC, and international equivalents that administer performance royalties for songwriters, composers, and music publishers. In some aspects, the performing rights module 1102 may coordinate with multiple performing rights organizations simultaneously to ensure coverage of musical works that may be administered by different organizations in various territories. The performing rights module 1102 may implement automated reporting mechanisms that track performance events and calculate appropriate royalty distributions based on usage patterns and organizational agreements.

A mechanical rights module 1104 may connect with organizations that handle mechanical reproduction rights for recorded music and sound recordings across different distribution channels and geographic regions. The mechanical rights module 1104 may coordinate with mechanical rights organizations such as the Harry Fox Agency, Music Reports, and international mechanical rights societies that manage reproduction licensing for physical and digital distribution formats. In some aspects, the mechanical rights module 1104 may process licensing arrangements for various distribution methods including streaming services, download platforms, and/or physical media reproduction while ensuring compliance with statutory rates and negotiated licensing terms. The mechanical rights module 1104 may implement usage tracking capabilities that monitor reproduction events and generate appropriate compensation calculations for rights holders and mechanical rights organizations.

With continued reference to FIG. 11A, a sync rights module 1106 may manage synchronization rights for audiovisual content that combines musical works with visual media across different production and distribution contexts. The sync rights module 1106 may coordinate with synchronization rights organizations and licensing agencies that handle music placement in films, television programs, advertisements, and other audiovisual productions. In some aspects, the sync rights module 1106 may process licensing arrangements that involve multiple rights holders including record labels, music publishers, and individual artists who may maintain different levels of control over synchronization licensing decisions. The sync rights module 1106 may implement negotiation capabilities that facilitate licensing discussions between content producers and rights holders while ensuring appropriate compensation and usage term compliance. In some aspects, other rights may exist and may be appropriately handled by another rights module 1107. In some aspects, the sync rights module 1106 may coordinate with the performing rights module 1102 and mechanical rights module 1104 to resolve complex licensing scenarios where audiovisual content requires multiple concurrent rights clearances from different organizational categories.

The performing rights module 1102, mechanical rights module 1104, and sync rights module 1106 may establish communication pathways with an AI licensing aggregator 1108 that serves as a central processing unit for consolidating and normalizing licensing information from diverse collective rights organizations. The AI licensing aggregator 1108 may implement processing algorithms that analyze licensing formats and terms from different rights organizations and convert them into standardized internal representations that platform systems can process effectively. In some aspects, the AI licensing aggregator 1108 may coordinate with machine learning systems that adapt to different organizational licensing structures and terminology variations while maintaining accuracy in rights interpretation and compensation calculations. The AI licensing aggregator 1108 may implement conflict resolution mechanisms that address overlapping rights claims or inconsistent licensing terms that may arise when multiple organizations administer rights for the same content. In some aspects, the AI licensing aggregator 1108 may incorporate or interface with AI systems described in previous figures, such as the AI system 406 of FIG. 4, AI system 304 of FIG. 3, or content processing modules of FIG. 2.

The AI licensing aggregator 1108 may process consolidated licensing information from the collective rights modules and generate bulk license agreements 1110 that enable efficient large-scale licensing across multiple rights holders and territories. The bulk license agreements 1110 may encompass licensing arrangements that cover multiple content categories, usage types, and territorial jurisdictions through unified agreement structures that simplify content distribution operations. In some aspects, the bulk license agreements 1110 may implement tiered pricing structures that accommodate different usage volumes and distribution scales while maintaining appropriate compensation levels for rights holders across different organizational categories. The bulk license agreements 1110 may include automated renewal mechanisms and usage reporting requirements that ensure ongoing compliance with collective rights organization policies and compensation distribution procedures.

As further shown in FIG. 11A, the system may incorporate territorial licensing resolution capabilities with a territory-based licensing resolver 1112. The territory-based licensing resolver 1112 may include a user location module 1114 that identifies user geographic positions and maps them to appropriate licensing jurisdictions and territorial restrictions. The user location module 1114 may implement location detection mechanisms including IP address geolocation, GPS positioning data, and/or user-declared location information that enable accurate territorial determination for licensing compliance purposes. In some aspects, the user location module 1114 may coordinate with privacy protection systems that maintain user location data security while providing sufficient geographic information for licensing compliance and territorial restriction enforcement. The user location module 1114 may implement location verification procedures that prevent circumvention of territorial restrictions through proxy services or location masking technologies.

The user location module 1114 may establish communication with a territory detector 1116 that maps user locations to specific licensing jurisdictions and territorial boundaries that govern content availability and access permissions. The territory detector 1116 may maintain geographic databases that correlate physical locations with legal jurisdictions, licensing territories, and regulatory frameworks that influence content distribution rights and restrictions. In some aspects, the territory detector 1116 may implement dynamic territory mapping that adapts to changing political boundaries, licensing agreement modifications, and/or regulatory updates that may affect territorial content availability over time. The territory detector 1116 may coordinate with external geographic information systems and/or legal databases that provide authoritative territorial boundary information and jurisdictional classification data.

With continued reference to FIG. 11A, the territory detector 1116 may interface with a territory rights database 1118 that maintains information about territorial licensing arrangements, content availability restrictions, and/or regulatory compliance requirements across different geographic regions and legal jurisdictions. The territory rights database 1118 may store territory-specific licensing rules that define which content may be accessed in different regions, what compensation rates apply to various territories, and what usage restrictions govern content consumption in specific jurisdictions. In some aspects, the territory rights database 1118 may implement data synchronization mechanisms that maintain current information about licensing agreement changes, territorial restriction modifications, and/or regulatory updates that may affect content availability and access permissions. The territory rights database 1118 may coordinate with external legal databases and/or rights organization systems that provide authoritative information about territorial licensing requirements and compliance obligations.

The territory rights database 1118 may provide territorial licensing information to a license selector 1120 that determines appropriate licensing terms for user locations based on territorial restrictions, content availability, and/or regulatory compliance requirements. The license selector 1120 may implement selection algorithms that evaluate multiple licensing options and identify the most appropriate license arrangements based on user geographic positions, content characteristics, and/or applicable territorial regulations. In some aspects, the license selector 1120 may coordinate with the bulk license agreements 1110 to ensure that selected licensing terms align with existing collective rights arrangements while maintaining compliance with territorial restrictions and/or regulatory requirements. The license selector 1120 may implement fallback mechanisms that identify alternative licensing options when primary licensing arrangements may not be available or applicable in specific territories.

The license selector 1120 may generate applicable terms 1122 that represent final territory-specific licensing arrangements that apply to user content access requests based on geographic location and/or territorial compliance requirements. The applicable terms 1122 may include specific pricing information, usage restrictions, access duration limitations, and/or compliance obligations that govern how users may consume content within their territorial jurisdictions. In some aspects, the applicable terms 1122 may incorporate multiple licensing components from different rights categories including performance rights, mechanical rights, and/or synchronization rights that collectively define content access permissions and compensation requirements. The applicable terms 1122 may include technical specifications such as quality limitations, device restrictions, and/or concurrent access controls that align with territorial licensing agreements and regulatory compliance obligations.

As further shown in FIG. 11A, an example territory resolution 1124 demonstrates a practical application of territorial licensing resolution through complex multi-jurisdictional content access scenarios. The example territory resolution 1124 may illustrate resolution workflows such as users in the United States requesting content from United Kingdom movie providers that incorporate global music rights, resulting in combined licensing arrangements that include USA streaming terms and global music licenses. In some aspects, the example territory resolution 1124 may demonstrate how the system processes requests that span multiple territorial jurisdictions and rights categories while ensuring compliance with applicable licensing requirements and regulatory obligations. The territory resolution 1124 may provide examples of how territorial restrictions may be resolved when content availability varies across different geographic regions or when licensing terms differ between territories for the same content items.

Figure 11B:
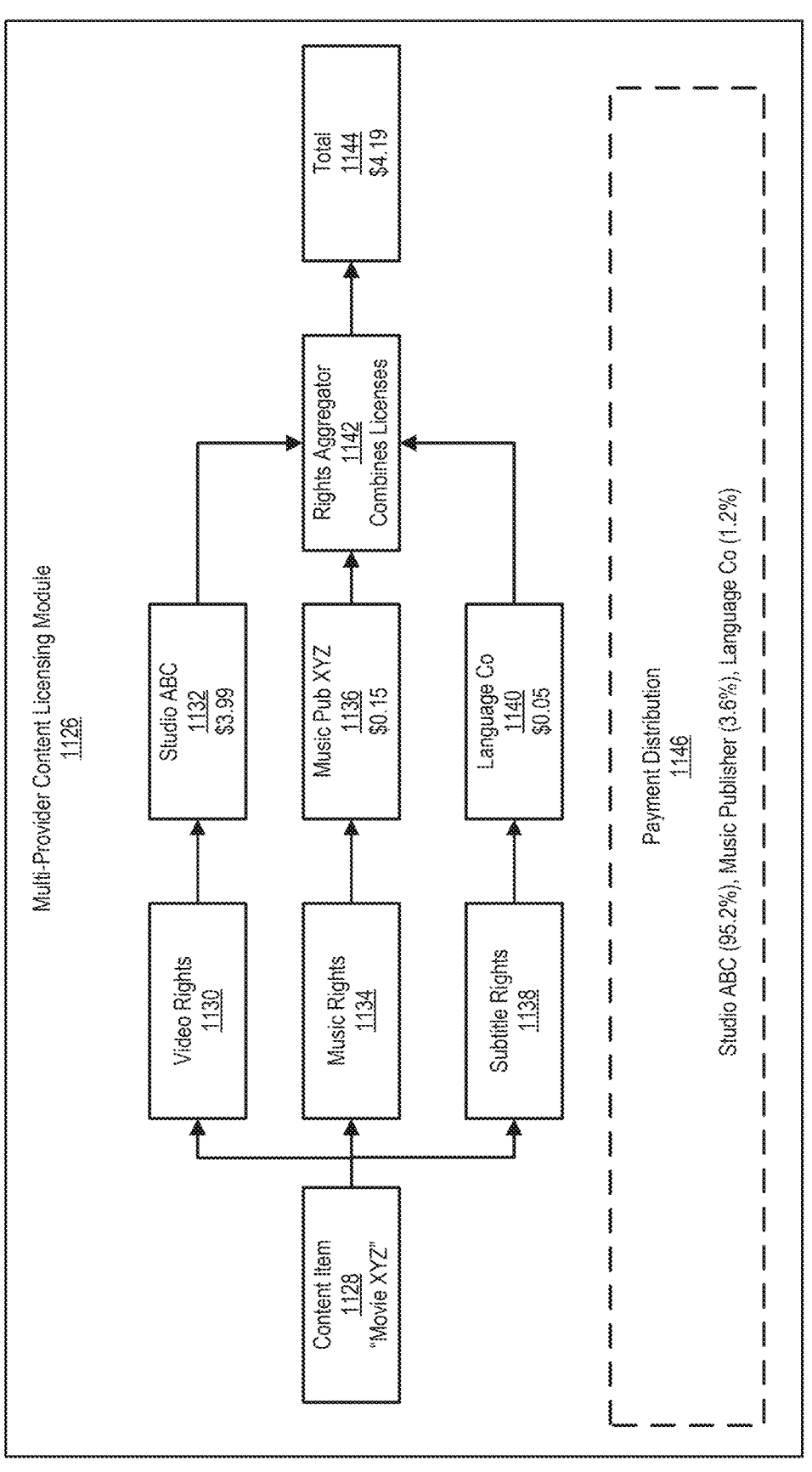
FIG. 11B illustrates a multi-provider content licensing module for processing content items with multiple rights categories, according to aspects of the present disclosure.

Referring to FIG. 11B, a content licensing module 1126 may provide multi-provider licensing capabilities that enable automated processing of complex content items requiring rights clearances from multiple independent rights holders across different content categories. In some aspects, the content licensing module 1126 may interface with the AI licensing aggregator 1108 of FIG. 11A to coordinate collective rights organizations and/or individual provider clearances within a unified licensing framework. The content licensing module 1126 may coordinate licensing arrangements for multimedia content that incorporates various media elements, each administered by different rights organizations or content providers with distinct pricing structures and licensing terms. In some aspects, the content licensing module 1126 may implement aggregation algorithms that combine licensing requirements from multiple sources while ensuring compliance with individual rights holder terms and generating unified licensing arrangements that simplify content acquisition processes. The content licensing module 1126 may coordinate with payment processing systems to ensure that multi-component licensing arrangements maintain accurate compensation distribution among participating rights holders.

The content licensing module 1126 may process a content item 1128 that represents multimedia content requiring multiple distinct rights clearances for different content components within a single distribution package. The content item 1128, in this example identified as "Movie XYZ", and may encompass various media elements including visual content, audio compositions, and textual components that require separate licensing arrangements from different rights holders. In some aspects, the content item 1128 may represent multimedia productions where individual content elements are controlled by different organizations with varying licensing terms, pricing structures, and distribution requirements. The content item 1128 may incorporate temporal licensing considerations where different content components may have varying access duration requirements or usage restrictions that influence overall licensing complexity and cost calculations. In some aspects, the content item 1128 may be discovered through the same mechanisms as the content discovery operations of the catalog aggregator 424 of FIG. 4 and/or the content access module 126 of FIG. 1.

With continued reference to FIG. 11B, the content item 1128 may branch into multiple distinct rights categories that require independent licensing negotiations and clearance procedures. Video rights 1130 may represent visual content licensing requirements for the movie content, encompassing cinematographic elements, visual effects, and/or performance rights associated with the filmed content. The video rights 1130 may be obtained from example studio ABC 1132 that maintains ownership or distribution authority over the visual content components of the content item 1128. The example studio ABC 1132 may establish licensing terms that specify a fee of $3.99 for video content access, representing the primary licensing cost component for the multimedia content package. In some aspects, the video rights 1130 may encompass various quality levels, resolution options, and/or viewing format permissions that influence the licensing fee structure and access parameters established by the example studio ABC 1132.

Music rights 1134 may encompass musical compositions, sound recordings, and/or audio elements incorporated within the content item 1128 that require separate licensing arrangements from music industry rights holders. The music rights 1134 may be obtained from an example music publisher XYZ 1136 that administers licensing for the musical content components within the multimedia production. The music publisher XYZ 1136 may establish a licensing fee of $0.15 for music content usage, representing a fractional component of the overall licensing cost structure that reflects the proportional contribution of musical elements to the complete content package. In some aspects, the music rights 1134 may include synchronization rights that govern how musical content may be combined with visual elements, performance rights that cover public presentation of the musical compositions, and/or mechanical rights that address reproduction and distribution of the audio content within the multimedia format. The music rights 1134 processing may utilize similar rights verification mechanisms as the mechanical rights module 1104 and/or performing rights module 1102 of FIG. 11A when the music publisher XYZ 1136 operates under collective rights management frameworks.

As further shown in FIG. 11B, subtitle rights 1138 may cover translated text content, caption services, and accessibility features associated with the content item 1128 that require licensing from specialized localization providers. The subtitle rights 1138 may be obtained from a language provider 1140 that maintains translation, caption generation, and accessibility compliance services for multimedia content distribution. As an example, the language provider 1140 may charge a licensing fee of $0.05 for subtitle content access, representing a smallest individual component cost within the multi-provider licensing arrangement. In some aspects, the subtitle rights 1138 may encompass multiple language options, accessibility compliance features, and/or technical formatting requirements that enable content consumption across diverse user populations and regulatory environments. The language provider 1140 may implement quality assurance procedures and accuracy verification mechanisms that ensure subtitle content meets professional standards and accessibility requirements.

The content licensing module 1126 may incorporate a rights aggregator 1142 that serves as a central coordination component for combining individual licensing arrangements from the example studio ABC 1132, music publisher XYZ 1136, and/or language provider 1140 into unified licensing structures. The rights aggregator 1142 may implement validation algorithms that ensure necessary rights clearances are obtained before content delivery while identifying and resolving potential conflicts between different rights holder requirements. The rights aggregator 1142 may implement conflict resolution using constraint satisfaction algorithms similar to those employed by the terms processor 1008 of FIGS. 10A and 10B, applying hierarchical precedence rules when licensing terms from different providers contain contradictory restrictions. In some aspects, the rights aggregator 1142 may coordinate timing considerations where different rights components may have varying availability windows or access duration limitations that influence overall content access parameters. The rights aggregator 1142 may implement compliance verification procedures that ensure combined licensing arrangements maintain adherence to individual rights holder terms while creating coherent unified licensing structures that support streamlined content distribution operations.

The rights aggregator 1142 may coordinate with a total calculator 1144 that performs cost aggregation operations to determine cumulative licensing fees across rights categories and provider relationships. As an example, the total calculator 1144 may compute the aggregate licensing cost by combining the video rights fee of $3.99 from the example studio ABC 1132, the music rights fee of $0.15 from the music publisher XYZ 1136, and the subtitle rights fee of $0.05 from the language provider 1140 to generate a total licensing cost of $4.19. In some aspects, the total calculator 1144 may implement currency conversion mechanisms when different rights holders operate in various monetary systems, tax calculation procedures that account for applicable jurisdictional requirements, and discount processing capabilities that apply volume-based or promotional pricing adjustments. The total calculator 1144 may coordinate with external financial systems to ensure that calculated totals align with current exchange rates and applicable tax obligations across different territorial jurisdictions. In some aspects, the total calculator 1144 may interface with the territory-based licensing resolver 1112 of FIG. 11A to apply territory-specific pricing adjustments and the unified payment model 1040 of FIGS. 10A and 10B to validate aggregated costs against machine-readable spending caps.

With continued reference to FIG. 11B, the content licensing module 1126 may include a payment distributor 1146 that manages revenue allocation operations among multiple rights holders according to predetermined percentage distributions that reflect the proportional contribution of each licensing component to the overall content package. The payment distributor 1146 may allocate revenues based on calculated percentages where the example studio ABC 1132 receives 95.2% of the total licensing revenue, reflecting the dominant contribution of video content to the overall multimedia package value. As another example, the music publisher XYZ 1136 may receive 3.6% of the total revenue, representing the proportional value of musical content within the combined licensing arrangement. The language provider 1140 may receive 1.2% of the total revenue, corresponding to the subtitle content contribution to the overall licensing package. In some aspects, the payment distributor 1146 may implement automated settlement procedures that execute revenue distribution at predetermined intervals while maintaining detailed transaction records for audit and compliance purposes. The payment distributor 1146 may utilize distributed ledger technology similar to the blockchain verification mechanisms described in connection with the rights verifier 918 of FIG. 9, creating immutable records of revenue distributions that can be independently verified by each rights holder.

The payment distributor 1146 may coordinate with external payment processing systems and financial institutions to ensure accurate and timely compensation delivery to participating rights holders while maintaining compliance with financial regulations and tax reporting requirements. In some aspects, the payment distributor 1146 may implement micro-payment capabilities that support fractional cent transactions for small licensing components while ensuring that rights holders receive appropriate compensation regardless of individual contribution amounts. The payment distributor 1146 may maintain historical payment records and analytics capabilities that enable rights holders to monitor revenue patterns and distribution performance across different content items and licensing arrangements. The rights aggregation system may combine video rights, music rights, and subtitle rights from different providers into a unified license with cumulative pricing, enabling content distribution while ensuring appropriate compensation for participating rights holders through automated aggregation and distribution mechanisms that maintain compliance with individual licensing terms and regulatory requirements. In some aspects, the payment distributor 1146 may coordinate with the unified payment model 938 of FIG. 9 and the payment engine 1010 of FIGS. 10A and 10B to ensure consistent payment processing infrastructure across provider onboarding, real-time licensing, and/or multi-provider content scenarios.

Referring to FIG. 11C, a unified interface 1148 may provide licensing management capabilities that integrate multiple licensing subsystems into a cohesive framework for coordinating content distribution requirements. In some aspects, the unified interface 1148 may coordinate with or incorporate functionality from the AI system 406 of FIG. 4, AI system 304 of FIG. 3, or AI system 204 of FIG. 2 to process licensing requirements as part of broader content aggregation and distribution operations. The unified interface 1148 may serve as a consolidated platform that addresses complexity factors in modern digital content licensing, including but not limited to, collective rights management relationships, territorial restrictions and compliance requirements, and multi-party content ownership scenarios. In some aspects, the unified interface 1148 may enable coordinated processing of licensing requirements that span multiple scenarios, ensuring that licensing decisions consider relevant factors while preventing conflicts and maintaining compliance across applicable licensing frameworks. The unified interface 1148 may provide a single point of integration for external systems while internally managing orchestration procedures that coordinate between different licensing management domains.

The unified interface 1148 may incorporate a collective rights organizations integration module 1150 positioned at the top level of the interface architecture to handle relationships with various collective management entities that administer rights on behalf of content creators and rights holders. The collective rights organizations integration module 1150 may coordinate with the performing rights module 1102, mechanical rights module 1104, and sync rights module 1106 to account for coverage of different rights categories while maintaining appropriate compensation distribution mechanisms. In some aspects, the collective rights organizations integration module 1150 may be the same as or similar to the collective rights management components described in FIG. 11A, consolidated within the unified interface 1148 to provide centralized coordination of rights organization relationships. In some aspects, the collective rights organizations integration module 1150 may implement automated communication protocols that interface with multiple performing rights organizations, mechanical rights organizations, and synchronization rights organizations to gather licensing information and negotiate bulk licensing arrangements. The collective rights organizations integration module 1150 may maintain persistent connections with rights organization APIs similar to the provider API connections described in FIG. 3 and FIG. 4, enabling real-time licensing status updates and compensation rate adjustments. The collective rights organizations integration module 1150 may coordinate with the licensing aggregator 1108 to process diverse licensing formats and generate the license agreements 1110 that enable efficient large-scale content distribution across multiple rights holder categories.

With continued reference to FIG. 11C, the unified interface 1148 may include a territory-based licensing resolver 1152 arranged in the middle tier of the interface architecture to manage geographic-specific licensing requirements and territorial compliance obligations. The territory-based licensing resolver 1152 may coordinate with the user location module 1114, territory detector 1116, territory rights database 1118, and license selector 1120 to process user location data and determine applicable licensing terms based on territorial jurisdictions and regulatory frameworks. In some aspects, the territory-based licensing resolver 1152 may be the same as or similar to the territory-based licensing resolver 1112 of FIG. 11A, integrated within the unified interface 1148 to provide consolidated territorial licensing management alongside other licensing subsystems. In some aspects, the territory-based licensing resolver 1152 may utilize location detection mechanisms similar to those employed by the user profile database 210 of FIG. 2 for determining user context and geographic positioning. In some aspects, the territory-based licensing resolver 1152 may implement real-time geographic analysis that considers changing political boundaries, licensing agreement modifications, and regulatory updates that may affect content availability across different regions. The territory-based licensing resolver 1152 may coordinate with the territory resolution 1124 component to demonstrate practical application of territorial licensing resolution through complex multi-jurisdictional content access scenarios that span multiple territorial boundaries and rights categories.

The unified interface 1148 may incorporate a multi-provider content licensing module 1154 to handle licensing scenarios where individual content items may involve multiple rights holders across different content categories. The multi-provider content licensing module 1154 may coordinate with the content licensing module 1126 to process complex multimedia content that requires separate licensing arrangements from different providers such as the example studio ABC 1132, music publisher XYZ 1136, and language provider 1140. In some aspects, the multi-provider content licensing module 1154 may be the same as or similar to the multi-provider licensing components described in FIG. 11B, unified within unified interface 1148 to coordinate multi-party licensing alongside collective rights and territorial licensing functions. The multi-provider content licensing module 1154 may interface with provider systems similar to the content providers 402 of FIG. 4, extending those single-provider relationships to handle scenarios where individual content items require licensing from multiple simultaneous sources. In some aspects, the multi-provider content licensing module 1154 may implement the rights aggregator 1142 functionality to combine licensing requirements from multiple sources while ensuring compliance with individual rights holder terms and generating unified licensing structures. The multi-provider content licensing module 1154 may coordinate with the total calculator 1144 and payment distributor 1146 to manage cost aggregation and revenue allocation operations among multiple rights holders according to predetermined percentage distributions.

The modular design within the unified interface 1148 may enable each subsystem to operate independently while sharing common data structures and processing capabilities that facilitate efficient resource utilization and consistent licensing policy application. This modular architecture extends the component-based design principles demonstrated in the AI system 204 of FIG. 2 and AI system 406 of FIG. 4, applying similar separation of concerns to the specialized domain of multi-dimensional licensing management. The collective rights organizations integration module 1150 may coordinate with the territory-based licensing resolver 1152 to ensure that collective rights arrangements align with territorial compliance requirements and geographic access controls. In some aspects, the territory-based licensing resolver 1152 may coordinate with the multi-provider content licensing module 1154 to ensure that territorial restrictions consider multi-component content licensing scenarios where different content elements may have varying geographic availability requirements. The multi-provider content licensing module 1154 may coordinate with the collective rights organizations integration module 1150 to ensure that multi-party licensing arrangements maintain appropriate relationships with collective rights management organizations and compensation distribution mechanisms.

As further shown in FIG. 11C, the unified interface 1148 may implement coordinated processing workflows that enable simultaneous evaluation of licensing requirements across the three functional domains while maintaining consistency and preventing conflicts between different licensing frameworks. The unified interface 1148 may process content access requests by querying the collective rights organizations integration module 1150 for rights organization relationships, the territory-based licensing resolver 1152 for geographic compliance requirements, and the multi-provider content licensing module 1154 for multi-party licensing arrangements. In some aspects, the unified interface 1148 may implement conflict resolution algorithms that address scenarios where different licensing modules may generate conflicting requirements or incompatible terms that require negotiation or alternative licensing arrangements. The unified interface 1148 may maintain audit capabilities that track licensing decisions across the three modules while providing detailed justification for access grants or denials based on the combined analysis of organizational relationships, territorial restrictions, and content complexity factors.

The unified interface 1148 may provide standardized communication protocols that enable external systems to interact with licensing management capabilities through single API endpoints while internally coordinating licensing analysis and decision-making processes. The unified interface 1148 may abstract the complexity of managing separate licensing subsystems by presenting unified query interfaces that accept content access requests and return consolidated licensing decisions that consider applicable factors. These unified interfaces may utilize API query mechanisms similar to the API query module 216 of FIG. 2 and API query module 420 of FIG. 4, adapted to handle the additional complexity of licensing queries. In some aspects, the unified interface 1148 may implement caching mechanisms that store frequently accessed licensing decisions while maintaining real-time synchronization with underlying licensing databases and rights organization systems to ensure that cached decisions remain current with changing licensing terms and territorial requirements. The unified interface 1148 may coordinate with external payment processing systems to ensure that consolidated licensing decisions align with available payment processing capabilities and revenue distribution mechanisms that support multi-party compensation scenarios across different rights categories and territorial jurisdictions.

Referring to FIG. 11D, a traditional distribution pathway 1156 may represent conventional content distribution models that require independent artists to utilize intermediary services for platform access and content monetization. The traditional distribution pathway 1156 may demonstrate how content creators historically navigate multi-layered distribution systems that impose financial intermediation costs and operational delays between artists and end-user platforms. In some aspects, the traditional distribution pathway 1156 may illustrate the dependencies and limitations that characterize established content distribution frameworks where artists surrender direct control over pricing, availability, and platform relationships in exchange for aggregated distribution services. The traditional distribution pathway 1156 may highlight the revenue extraction mechanisms that reduce artist compensation while providing standardized but inflexible distribution capabilities across multiple platform destinations.

An independent artist 1158 within the traditional distribution pathway 1156 may create original content and establish initial pricing parameters but may lack direct access to major distribution platforms and streaming services. The independent artist 1158 may maintain creative control over content production while facing barriers to platform integration that necessitate engagement with intermediary distribution services. In some aspects, the independent artist 1158 may operate with limited resources and technical capabilities that prevent direct platform negotiations and custom integration development. The independent artist 1158 may experience delays in content updates, pricing modifications, and availability changes due to dependencies on intermediary processing workflows and approval procedures that characterize traditional distribution models.

The independent artist 1158 may establish relationships with an intermediary aggregator 1160 that provides distribution services to multiple content creators while charging monthly fees ranging from five to twenty dollars for platform access and content management services. The intermediary aggregator 1160 may serve as a centralized distribution hub that negotiates bulk agreements with major platforms while standardizing content formats and metadata across diverse artist catalogs. In some aspects, the intermediary aggregator 1160 may implement content processing workflows that normalize audio quality, generate standardized metadata, and coordinate release scheduling across multiple platform destinations simultaneously. The intermediary aggregator 1160 may extract percentage-based revenue shares from artist earnings while providing customer support, analytics reporting, and platform relationship management services that individual artists may find difficult to maintain independently. In some aspects, the intermediary aggregator 1160 may function similarly to the traditional media model 102 of FIG. 1, where users must navigate separate provider applications and authentication systems, but with the added layer of aggregator fees and processing delays.

With continued reference to FIG. 11D, the intermediary aggregator 1160 may interface with music platforms 1162 through established business relationships and technical integrations that enable bulk content distribution across streaming services and AI-powered platforms. The music platforms 1162 may include major streaming services, digital download stores, and emerging AI-powered content discovery systems that serve end-user audiences through various interface modalities and recommendation algorithms. In some aspects, the music platforms 1162 may implement platform-specific technical requirements, metadata standards, and content protection mechanisms that intermediary aggregators must accommodate through specialized integration development and ongoing maintenance procedures. The music platforms 1162 may establish revenue sharing arrangements with intermediary aggregators that further reduce artist compensation while providing access to large user bases and content delivery infrastructure.

The traditional distribution pathway 1156 may impose financial costs that extract fifteen to thirty percent of artist revenues through aggregator fees, platform commissions, and/or delayed payment settlement procedures that disadvantage independent content creators. The traditional distribution pathway 1156 may create operational dependencies where artists cannot directly modify pricing, update availability, or customize platform relationships without intermediary approval and processing delays. In some aspects, the traditional distribution pathway 1156 may limit artist access to detailed analytics, user engagement data, and/or direct fan relationship development opportunities that platforms may reserve for intermediary partners rather than individual content creators. The traditional distribution pathway 1156 may restrict artist flexibility in implementing dynamic pricing strategies, promotional campaigns, or exclusive content releases that require rapid platform coordination and real-time availability modifications.

As further shown in FIG. 11D, a direct publishing pathway 1164 may provide alternative content distribution mechanisms that eliminate and/or reduce intermediary dependencies while enabling artists to maintain direct relationships with AI-powered platforms and automated discovery systems. The direct publishing pathway 1164 may demonstrate how content creators may leverage machine-readable licensing standards and automated discovery protocols to achieve platform integration without traditional aggregator services. In some aspects, the direct publishing pathway 1164 may enable artists to retain complete revenue control while implementing flexible pricing strategies and real-time content management capabilities that adapt to market conditions and promotional opportunities. The direct publishing pathway 1164 may facilitate direct fan engagement and detailed analytics access that provide artists with insights into audience behavior and content performance across multiple platform destinations.

An independent artist 1166 within the direct publishing pathway 1164 may maintain autonomy over content distribution while self-hosting catalog information and publishing standardized pricing specifications that automated systems may discover and process without manual registration procedures. The independent artist 1166 may implement web-based content hosting that exposes machine-readable licensing terms through standardized protocols that enable AI systems to automatically identify content availability and pricing information. In some aspects, the independent artist 1166 may coordinate with content delivery networks and hosting services that provide technical infrastructure while preserving artist control over pricing, licensing terms, and/or platform relationship management. The independent artist 1166 may implement dynamic pricing capabilities that enable real-time adjustments based on demand patterns, promotional strategies, and market conditions without intermediary approval or processing delays.

The independent artist 1166 may establish communication pathways with an AI discovery crawler 1168 that actively scans internet resources to identify music content and parse machine-readable licensing terms without requiring manual registration or negotiation processes. The AI discovery crawler 1168 may implement automated web scanning algorithms that identify content hosting locations, extract licensing information from standardized formats, and process pricing data through machine-readable protocols that eliminate and/or reduce human intervention requirements. In some aspects, the AI discovery crawler 1168 may coordinate with multiple content discovery protocols including robots.txt extensions, RSL, structured data markup, and standardized licensing expression languages that enable content identification across diverse hosting environments. The AI discovery crawler 1168 may implement content validation procedures that verify licensing authenticity and pricing accuracy before integrating discovered content into platform recommendation and distribution systems. In some aspects, the AI discovery crawler 1168 may incorporate functionality similar to the API query module 216 of FIG. 2 and the catalog ingestion module 912 of FIG. 9, operating in a pull-based discovery model. That is, in a pull-based discovery model, the AI system may take the initiative to find content, while in push-based systems, content creators may take the initiative to submit their content to the platform.

With continued reference to FIG. 11D, the AI discovery crawler 1168 may interface with a platform integration module 1170 that establishes direct artist-platform relationships without intermediary involvement while enabling real-time content updates and pricing modifications. The platform integration module 1170 may coordinate automated content ingestion procedures that process discovered licensing information and establish distribution agreements based on machine-readable terms and standardized pricing specifications. In some aspects, the platform integration module 1170 may adapt to changing content availability, pricing modifications, and/or licensing term updates without manual intervention or approval workflows. The platform integration module 1170 may coordinate with multiple AI-powered platforms simultaneously while maintaining individual artist control over distribution terms and revenue allocation mechanisms. In some aspects, the platform integration module 1170 may be similar to the unified access module 428 of FIG. 4. In some aspects, the platform integration module 1170 may establish direct artist connections without intermediary involvement.

In some aspects, the independent artist 1166 may coordinate with a price sheet 1172 that specifies machine-readable licensing formats and standardized pricing expressions that automated discovery systems may process, often without human interpretation requirements. The price sheet 1172 may implement structured data formats that define content access permissions, compensation requirements, and/or usage restrictions through standardized protocols that enable automated licensing negotiation and payment processing. In some aspects, the price sheet 1172 may support micro-payment capabilities supporting fractional cent transactions, for example as low as $0.001 per stream or access. The price sheet 1172 may implement dynamic pricing mechanisms that enable artists to modify compensation rates, promotional pricing, and/or access terms in real-time without platform-specific integration requirements or intermediary approval procedures. The price sheet 1172 may utilize similar machine-readable formats as described in the licensing protocols 930 of FIG. 9 and the RSL schemas processed in FIG. 10B, enabling integration with the automated licensing processing flows.

The price sheet 1172 may establish communication with an authenticity verification module 1174. In some aspects, the authenticity verification module 1174 implements CTPA (Coalition for Content Provenance and Authenticity) standards for content authenticity verification while preventing unauthorized content distribution and fraudulent provider activities. In some aspects, the authenticity verification module 1174 may implement other processes for content authenticity verification and/or for preventing unauthorized content distribution and/or fraudulent provider activities. The authenticity verification module 1174 may coordinate with digital signature validation mechanisms, blockchain verification systems, and/or cryptographic authentication protocols that ensure content legitimacy without centralized intermediary validation requirements. In some aspects, the authenticity verification module 1174 may implement distributed ledger technologies that maintain immutable records of content ownership, licensing authority, and distribution permissions while enabling automated verification procedures that prevent content piracy and unauthorized redistribution. The authenticity verification module 1174 may coordinate with rights chain verification systems that track content ownership history and licensing authority through cryptographic proof mechanisms that enable transparent and verifiable content authentication. In some aspects, the authenticity verification module 1174 may incorporate similar blockchain verification and/or digital signature validation mechanisms as the rights verifier 918 of FIG. 9 and the authentication infrastructure described in FIG. 5.

As further shown in FIG. 11D, the authenticity verification module 1174 may interface with a payment module 1176 that manages automated financial transactions while implementing payment processing capabilities and/or direct artist compensation mechanisms that eliminate intermediary fee extraction. The payment module 1176 may coordinate with external payment processing systems and financial institutions to enable transactions, in some aspects, fractional cent transactions, that support streaming compensation models while maintaining cost-effective transaction processing for small payment amounts. In some aspects, the payment module 1176 may implement settlement capabilities that provide artist compensation upon content access events while eliminating traditional payment delays and intermediary processing requirements. The payment module 1176 may coordinate with multiple payment gateway systems and cryptocurrency platforms that enable diverse compensation methods while maintaining automated settlement procedures and transparent revenue tracking capabilities. In some aspects, the payment module 1176 may be similar to the payment engine 1010 of FIG. 10A and/or the unified payment model 938 of FIG. 9.

Example machine-readable standards 1178 may be implemented by the direct publishing pathway 1164. Such example machine-readable standards 1178 provide an example implementation of specifications for machine-readable licensing expression and automated content discovery protocols. The example machine-readable standards 1178 may provide technical documentation and format specifications that enable artists to implement standardized licensing publication while ensuring compatibility with automated discovery systems and AI-powered platforms. In some aspects, the example machine-readable standards 1178 may include multiple standardized formats that accommodate different technical capabilities and hosting environments while maintaining consistent machine-readable licensing expression across diverse implementation approaches. The example machine-readable standards 1178 may coordinate with industry standardization efforts and protocol development initiatives that promote interoperability between different content hosting systems and automated discovery mechanisms.

With continued reference to FIG. 11D, the example machine-readable standards 1178 may include an example JSON format 1180 that provides a structured data representation for content licensing and pricing information through widely-adopted data interchange protocols. The example JSON format 1180 may specify content type identification through "@type": "MusicRecording" declarations that enable automated content categorization and discovery procedures. The example JSON format 1180 may define pricing structures through "price": {"stream": 0.001} specifications that establish micro-payment compensation rates of $0.001 per stream access while enabling automated payment processing and revenue calculation mechanisms. In some aspects, the example JSON format 1180 may support extensible data structures that accommodate additional licensing parameters, usage restrictions, and content metadata while maintaining compatibility with existing automated processing systems and discovery protocols. The example JSON format 1180 may be compatible with the catalog ingestion module 912 of FIG. 9 and processable by the licensing parser 1004 of FIG. 10A when implemented as part of automated discovery workflows.

The example machine-readable standards 1178 may include an example ODRL expression 1182 that demonstrates Open Digital Rights Language implementation for rights management and automated compensation processing. The example ODRL expression 1182 may specify usage permissions through declarations that define allowed content access types and consumption parameters. The example ODRL expression 1182 may include action specifications such as "action: play" that establish permitted content usage while defining compensation obligations through "duty: compensate $0.001" requirements that enable automated payment processing for transactions, in some aspects, fractional transactions. In some aspects, the example ODRL expression 1182 may support licensing scenarios that combine multiple usage permissions, temporal restrictions, and geographic limitations while maintaining machine-readable format compatibility with automated rights management systems and payment processing mechanisms. The example ODRL expression 1182 may be processed through the same or similar ODRL analysis pathways depicted in FIG. 10A at steps 1024-1028.

As further shown in FIG. 11D, the direct publishing pathway 1164 may include a discovery example 1184 that illustrates a practical implementation workflow for automated content discovery and verification procedures. The discovery example 1184 may demonstrate how the AI discovery crawler 1168 may identify content hosting locations through "AI Crawler finds: www.artistname.com/music/" discovery procedures that scan internet resources for content availability indicators. The discovery example 1184 may illustrate licensing term extraction through "Reads: www.artistname.com/licensingterms.txt→licensing terms" processing workflows that parse machine-readable licensing information from standardized file locations and data formats. In some aspects, the discovery example 1184 may demonstrate authenticity verification through "Verifies: CTPA signature-→Authentic content" validation procedures that confirm content legitimacy through cryptographic verification mechanisms and distributed authentication protocols.

The discovery example 1184 provides an example workflow documentation that enables artists to implement compatible hosting configurations while ensuring automated discovery compatibility and verification compliance. The discovery example 1184 may demonstrate how automated discovery procedures may scale across multiple artist implementations while maintaining processing accuracy and authentication reliability. In some aspects, the discovery example 1184 may illustrate error handling procedures, fallback mechanisms, and/or compatibility verification steps that ensure automated discovery operations across diverse hosting environments and technical implementation variations. The discovery example 1184 may depict a coordination with platform integration systems to demonstrate complete end-to-end workflows from content discovery through payment settlement that eliminate manual intervention requirements while maintaining artist control over distribution terms and revenue management. While the direct publishing pathway 1164 and the example machine-readable standards 1178 have been described with reference to an independent artist 1166, the same or similar automated discovery and direct integration mechanisms are equally applicable to larger content providers including music catalogs, record labels, production studios, collective management organizations, and/or established media companies seeking to bypass traditional aggregator dependencies.

Figure 12:
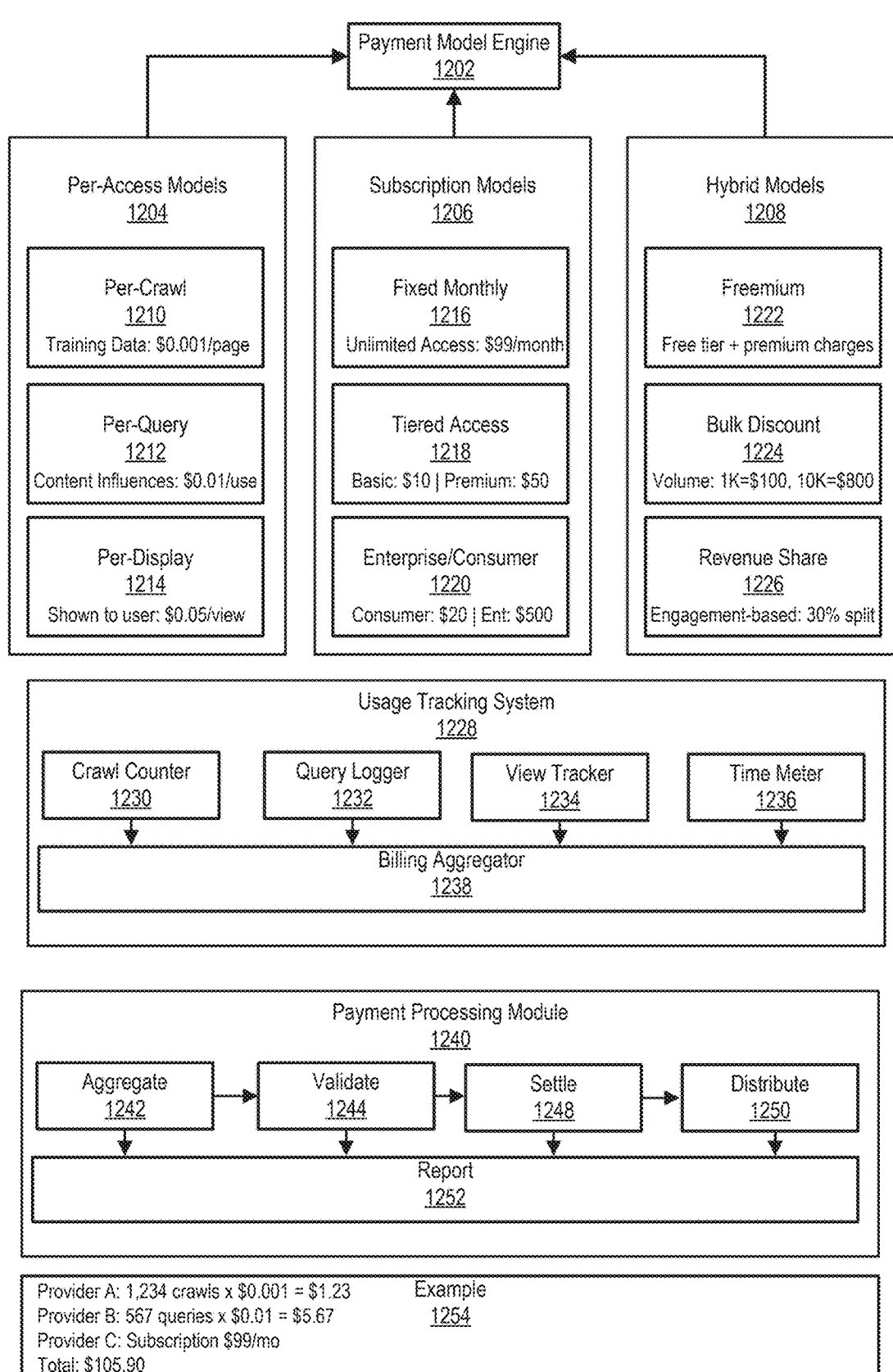
FIG. 12 illustrates a payment processing and usage tracking system with multiple payment models, according to aspects of the present disclosure.

Referring to FIG. 12, in some aspects, a payment model engine 1202 may provide monetization capabilities that support multiple concurrent payment models including per-access, subscription, and hybrid models with freemium and revenue sharing arrangements across diverse content access scenarios and user engagement patterns. The payment model engine 1202 may coordinate with various pricing mechanisms and billing structures that accommodate different user preferences, content provider requirements, and market conditions while maintaining automated processing capabilities and transparent revenue distribution mechanisms. In some aspects, the payment model engine 1202 may implement dynamic pricing algorithms that adapt to usage patterns, demand fluctuations, and promotional strategies while ensuring consistent payment processing across multiple model categories simultaneously. The payment model engine 1202 may coordinate with external financial systems and payment processors to ensure that different monetization approaches maintain compliance with regulatory requirements and industry standards for digital content transactions. In some aspects, the payment model engine 1202 may be integrated with or complement the unified payment model 938 described in FIG. 9 and the unified payment model 1040 described in FIGS. 10A-10B, extending their capabilities to support concurrent operation of multiple monetization strategies.

The payment model engine 1202 may incorporate per-access models 1204 that process payments for individual content access events while supporting various granular pricing structures that align with different usage types and content consumption patterns. In some aspects, the per-access models 1204 may process payment configurations established by the payment engine 1010 of FIGS. 10A-10B when handling automated licensing protocol payments. The per-access models 1204 may enable content providers to implement usage-based charging mechanisms that correlate payment amounts with specific access types, content complexity, and processing requirements. In some aspects, the per-access models 1204 may coordinate with automated billing systems that process micro-transactions and fractional payments while maintaining cost-effective transaction processing for small payment amounts. The per-access models 1204 may implement validation procedures that verify payment authorization and process transactions concurrent with or immediately following content access while coordinating with digital rights management systems to ensure appropriate usage restrictions and access controls.

With continued reference to FIG. 12, the per-access models 1204 may include a per-crawl module 1210 that implements training data access pricing at $0.001 per page for AI training or automated data crawling purposes. The per-crawl module 1210 may support machine learning systems and automated content analysis applications that require large-scale data access for training algorithms and pattern recognition development. In some aspects, the per-crawl module 1210 may coordinate with usage tracking systems that monitor page access events and calculate appropriate compensation amounts based on crawling volume and data extraction complexity. The per-crawl module 1210 may implement access controls that distinguish between different types of automated access while ensuring that training data usage maintains compliance with content provider licensing terms and data protection requirements. The per-crawl module 1210 may coordinate with the crawl counter 1230 to ensure accurate tracking and billing of automated access events across the system.

The per-access models 1204 may incorporate a per-query module 1212 that charges based on content influences at $0.01 per use for query-based access patterns and content discovery operations. The per-query module 1212 may support search applications, recommendation systems, and content analysis tools that require structured access to content metadata and catalog information. In some aspects, the per-query module 1212 may implement query complexity analysis that adjusts pricing based on search parameters, result set sizes, and processing requirements while maintaining transparent billing mechanisms. The per-query module 1212 may coordinate with API rate limiting systems and usage monitoring tools that track query frequencies and prevent abuse while ensuring appropriate compensation for content provider resources and infrastructure utilization.

As further shown in FIG. 12, the per-access models 1204 may include a per-display module 1214 that implements usage-based pricing at $0.05 per view when content is displayed to end users through various interface modalities and presentation formats. The per-display module 1214 may support applications that present content recommendations, search results, and curated collections to users while ensuring appropriate compensation for content visibility and user engagement opportunities. In some aspects, the per-display module 1214 may implement display tracking mechanisms that monitor content presentation events, user interaction patterns, and engagement duration to calculate accurate billing amounts. The per-display module 1214 may coordinate with user interface systems and analytics platforms that provide detailed metrics about content display effectiveness and user response patterns while maintaining privacy protections and data security standards.

The payment model engine 1202 may incorporate subscription models 1206 that provide recurring payment options with different access levels and service tiers that accommodate various user segments and usage requirements. The subscription models 1206 may enable predictable revenue streams for content providers while offering users access to content catalogs and premium features through monthly or annual billing cycles. In some aspects, the subscription models 1206 may implement automated renewal mechanisms that maintain continuous service access while providing users with cancellation options and billing transparency. The subscription models 1206 may coordinate with user account management systems that track subscription status, access permissions, and billing history while ensuring appropriate service delivery and customer support capabilities.

With continued reference to FIG. 12, the subscription models 1206 may include a fixed monthly module 1216 that offers unlimited access at $99 per month for content access across multiple provider catalogs and service categories. The fixed monthly module 1216 may provide users with unrestricted content consumption capabilities while ensuring predictable revenue for content providers and platform operators. In some aspects, the fixed monthly module 1216 may coordinate with content delivery systems that optimize bandwidth utilization and server resources to support high-volume usage patterns without additional per-access charges. The fixed monthly module 1216 may implement fair usage policies and quality-of-service mechanisms that maintain consistent performance levels across different user activity patterns while preventing system abuse and resource monopolization.

The subscription models 1206 may incorporate a tiered access module 1218 that implements differentiated service levels with basic access at $10 and premium access at $50 to accommodate different user preferences and budget considerations. The tiered access module 1218 may provide graduated feature sets that enable users to select appropriate service levels based on their content consumption patterns and desired functionality. In some aspects, the tiered access module 1218 may implement upgrade and downgrade mechanisms that allow users to modify their subscription levels while maintaining account continuity and billing accuracy. The tiered access module 1218 may coordinate with feature management systems that control access to premium capabilities such as higher quality content, offline access, and advanced recommendation algorithms based on subscription tier selections.

As further shown in FIG. 12, the subscription models 1206 may include an enterprise consumer module 1220 that provides specialized pricing structures with consumer access at $20 and enterprise access at $500 to accommodate different user segments and organizational requirements. The enterprise consumer module 1220 may implement business-oriented features such as multi-user account management, administrative controls, and usage analytics that support organizational content consumption and management needs. In some aspects, the enterprise consumer module 1220 may coordinate with identity management systems and access control frameworks that enable centralized user administration and policy enforcement across organizational boundaries. The enterprise consumer module 1220 may provide enhanced customer support, service level agreements, and customization options that align with enterprise requirements for reliability, security, and compliance management.

The payment model engine 1202 may incorporate hybrid models 1208 that combine multiple payment approaches to create flexible monetization strategies that adapt to different market conditions and user preferences. The hybrid models 1208 may enable content providers to implement pricing strategies that balance user acquisition, revenue optimization, and/or market penetration objectives through combined payment mechanisms. In some aspects, the hybrid models 1208 may coordinate with analytics systems that monitor user behavior patterns and payment preferences to optimize pricing strategies and promotional campaigns. The hybrid models 1208 may implement A/B testing capabilities that evaluate different pricing combinations and payment structures to identify optimal monetization approaches for specific content categories and user segments. In some aspects, the enterprise consumer module 1220 may interface with the enterprise-level components of the AI system 406 described in FIG. 4 to provide specialized content aggregation services for organizational users.

With continued reference to FIG. 12, the hybrid models 1208 may include a freemium module 1222 that combines free tier access with premium charges to provide users with basic functionality while encouraging upgrades to paid services. The freemium module 1222 may implement usage limitations, feature restrictions, and/or advertising integration that create value differentiation between free and paid service tiers. In some aspects, the freemium module 1222 may coordinate with user engagement tracking systems that monitor free tier usage patterns and identify conversion opportunities for premium service upgrades. The freemium module 1222 may implement promotional mechanisms and/or trial periods that enable users to experience premium features while maintaining clear boundaries between free and paid service capabilities.

The hybrid models 1208 may incorporate a bulk discount module 1224 that provides volume-based pricing with graduated rates such as 1,000 units at $100 and 10,000 units at $800 to encourage large-scale content consumption and platform engagement. The bulk discount module 1224 may implement automated pricing calculations that apply appropriate discount rates based on usage volumes and commitment levels while maintaining transparent billing mechanisms. In some aspects, the bulk discount module 1224 may coordinate with enterprise sales systems and contract management platforms that handle large-volume agreements and customized pricing arrangements. The bulk discount module 1224 may provide usage forecasting and budget management tools that enable users to optimize their content consumption patterns and cost management strategies.

As further shown in FIG. 12, the hybrid models 1208 may include a revenue share module 1226 that implements engagement-based compensation with a 30% split arrangement for partnership-based monetization scenarios. The revenue share module 1226 may coordinate with analytics systems that track user engagement levels, content performance metrics, and/or revenue generation patterns to calculate appropriate compensation distributions. In some aspects, the revenue share module 1226 may implement transparent reporting mechanisms that provide partners with detailed insights into revenue generation and performance metrics while maintaining accurate accounting and payment distribution procedures. The revenue share module 1226 may coordinate with external payment processing systems that handle complex revenue splitting scenarios and multiparty compensation arrangements while ensuring compliance with partnership agreements and regulatory requirements.

The payment model engine 1202 may coordinate with a usage tracking system 1228 that monitors and/or records user interactions across multiple metrics and engagement patterns to support accurate billing calculations and performance analytics. The usage tracking system 1228 may implement data collection mechanisms that capture various types of user activities while maintaining privacy protections and data security standards. In some aspects, the usage tracking system 1228 may coordinate with real-time processing systems that enable immediate billing calculations and usage reporting while supporting high-volume transaction processing and concurrent user activities. The usage tracking system 1228 may implement data retention policies and archival procedures that maintain historical usage information for analytics, compliance, and/or dispute resolution purposes while ensuring appropriate data lifecycle management. In some aspects, the usage tracking system 1228 may provide usage metrics to the playback monitor 520 described in FIG. 5 for content consumption analysis across the platform.

With continued reference to FIG. 12, the usage tracking system 1228 may include a crawl counter 1230 that tracks automated access patterns and data extraction activities for billing calculation and resource utilization monitoring. The crawl counter 1230 may implement detection algorithms that distinguish between different types of automated access while ensuring accurate measurement of crawling activities and data consumption patterns. In some aspects, the crawl counter 1230 may coordinate with rate limiting systems and access control mechanisms that prevent abuse while maintaining accurate billing calculations for legitimate automated usage. The crawl counter 1230 may provide detailed analytics about crawling patterns, peak usage periods, and/or resource consumption trends that inform capacity planning and infrastructure optimization decisions.

The usage tracking system 1228 may incorporate a query logger 1232 that records search and query activities to support billing calculations and/or user behavior analysis across different content discovery patterns. The query logger 1232 may implement logging mechanisms that capture query parameters, result set characteristics, and/or processing complexity while maintaining user privacy and data protection standards. In some aspects, the query logger 1232 may coordinate with search optimization systems that analyze query patterns and/or performance metrics to improve content discovery capabilities and user experience. The query logger 1232 may provide analytics about popular search terms, content discovery trends, and/or user preference patterns that inform recommendation algorithms and content curation strategies.

As further shown in FIG. 12, the usage tracking system 1228 may include a view tracker 1234 that monitors content viewing events and user engagement patterns to support display-based billing calculations and content performance analytics. The view tracker 1234 may implement tracking mechanisms that capture content presentation events, user interaction patterns, and engagement duration while maintaining accurate billing calculations for content display activities. In some aspects, the view tracker 1234 may coordinate with user interface systems and analytics platforms that provide detailed insights into content effectiveness and user response patterns. The view tracker 1234 may implement privacy-preserving tracking mechanisms that collect necessary billing information while protecting user privacy and maintaining compliance with data protection regulations.

The usage tracking system 1228 may incorporate a time meter 1236 that measures temporal usage patterns and session duration to support time-based billing models and user engagement analysis. The time meter 1236 may implement timing mechanisms that track content consumption duration, session lengths, and/or temporal usage patterns while ensuring accurate billing calculations for time-sensitive pricing models. In some aspects, the time meter 1236 may coordinate with session management systems that handle user authentication, access control, and concurrent usage limitations while maintaining accurate temporal measurements. The time meter 1236 may provide analytics about usage patterns, peak activity periods, and temporal consumption trends that inform capacity planning and resource allocation decisions.

With continued reference to FIG. 12, the usage tracking system 1228 may include a billing aggregator 1238 that consolidates usage metrics across payment models into unified billing statements and usage reports. The billing aggregator 1238 may implement data processing algorithms that combine usage information from multiple tracking components while ensuring accurate billing calculations and transparent reporting mechanisms. In some aspects, the billing aggregator 1238 may coordinate with external accounting systems and financial reporting platforms that handle complex billing scenarios and multi-model payment processing. The billing aggregator 1238 may implement data validation procedures that verify billing accuracy and identify potential discrepancies while maintaining audit trails and transaction records.

The payment model engine 1202 may coordinate with a payment processor 1240 that handles the financial transaction flow and revenue distribution operations across multiple payment models and billing scenarios. The payment processor 1240 may implement transaction processing capabilities that support various payment methods, currency conversions, and international billing requirements while maintaining security and compliance standards. In some aspects, the payment processor 1240 may coordinate with external payment gateways and financial institutions that provide transaction processing services while ensuring appropriate fraud prevention and risk management capabilities. The payment processor 1240 may implement automated settlement procedures and revenue distribution mechanisms that handle complex multi-party payment scenarios while maintaining accurate accounting and transparent reporting. In some aspects, the payment processor 1240 may be similar to or integrated with the payment processing capabilities of the acquisition manager 426 described in FIG. 4, the content acquisition module 218 described in FIG. 2, the payment engine 1010 described in FIGS. 10A-10B, and the unified payment model 1040 described in FIGS. 10A-10B.

As further shown in FIG. 12, the payment processor 1240 may include an aggregation module 1242 that compiles usage and billing data from multiple sources while ensuring transaction processing and accurate billing calculations. The aggregation module 1242 may implement data consolidation algorithms that combine information from various usage tracking components while maintaining data integrity and processing accuracy. In some aspects, the aggregation module 1242 may coordinate with real-time processing systems that enable immediate billing calculations and transaction processing while supporting high-volume concurrent operations. The aggregation module 1242 may implement data validation procedures that verify information accuracy and completeness before proceeding with payment processing operations.

The payment processor 1240 may incorporate a validation module 1244 that verifies billing information accuracy and ensures transaction processing compliance with regulatory requirements and industry standards. The validation module 1244 may implement verification procedures that check billing calculations, payment authorization status, and account validity while preventing fraudulent transactions and billing errors. In some aspects, the validation module 1244 may coordinate with external verification services and fraud detection systems that provide additional security layers and risk assessment capabilities. The validation module 1244 may implement automated error detection and correction mechanisms that identify and resolve billing discrepancies while maintaining transaction processing efficiency and accuracy.

With continued reference to FIG. 12, the payment processor 1240 may include a settlement module 1248 that coordinates payment transaction completion and revenue distribution operations across multiple payment models and recipient categories. The settlement module 1248 may implement automated settlement procedures that process payments according to predetermined schedules while ensuring appropriate revenue allocation and compensation distribution. In some aspects, the settlement module 1248 may coordinate with external banking systems and payment networks that handle actual fund transfers while maintaining transaction security and regulatory compliance. The settlement module 1248 may provide settlement reporting and reconciliation capabilities that enable transparent tracking of payment processing activities and revenue distribution outcomes.

The payment processor 1240 may incorporate a settlement processor 1248 that executes actual payment transactions and coordinates with external financial systems to complete revenue distribution operations. The settlement processor 1248 may implement secure transaction processing protocols that handle various payment methods and currency types while maintaining compliance with financial regulations and industry security standards. In some aspects, the settlement processor 1248 may coordinate with multiple payment gateways and financial institutions that provide transaction processing services across different geographic regions and regulatory environments. The settlement processor 1248 may implement automated retry mechanisms and error handling procedures that ensure transaction completion while managing processing failures and system interruptions.

As further shown in FIG. 12, the payment processor 1240 may include a distribution module 1250 that allocates payments to appropriate recipients according to predetermined agreements and revenue sharing arrangements. The distribution module 1250 may implement allocation algorithms that calculate appropriate payment amounts for multiple recipients while maintaining accuracy and transparency in revenue distribution operations. In some aspects, the distribution module 1250 may coordinate with contract management systems and partnership agreements that define revenue sharing terms and compensation structures. The distribution module 1250 may provide detailed distribution reporting and analytics that enable recipients to monitor their revenue streams and payment processing activities while maintaining audit trails and transaction records.

The payment processor 1240 may incorporate a report generator 1252 that generates transaction records, usage reports, and financial analytics for system administrators, content providers, and business intelligence applications. The report generator 1252 may implement reporting capabilities that provide detailed insights into payment processing activities, usage patterns, and revenue generation trends across different payment models and user segments. In some aspects, the report generator 1252 may coordinate with external analytics platforms and business intelligence systems that provide advanced data analysis and visualization capabilities. The report generator 1252 may implement automated reporting schedules and customizable report formats that accommodate different stakeholder requirements and regulatory reporting obligations.

With continued reference to FIG. 12, a calculation example 1254 is provided that demonstrates practical payment processing across different usage types and billing scenarios. The calculation example 1254 may illustrate how the payment processor 1240 handles multiple concurrent payment models through specific scenarios such as Provider A generating 1,234 crawls at $0.001 per crawl resulting in $1.23 in charges, Provider B processing 567 queries at $0.01 per query resulting in $5.67 in fees, and Provider C maintaining subscription services at $99 per month. In some aspects, the calculation example 1254 may demonstrate total billing aggregation that combines multiple payment types to generate billing amounts such as $105.90 total charges across different usage patterns and payment models. The calculation example 1254 may illustrate how the system handles currency conversions, tax calculations, and promotional discounts while maintaining accurate billing calculations and transparent reporting mechanisms across diverse payment processing scenarios and multi-provider billing arrangements.

Figure 13:
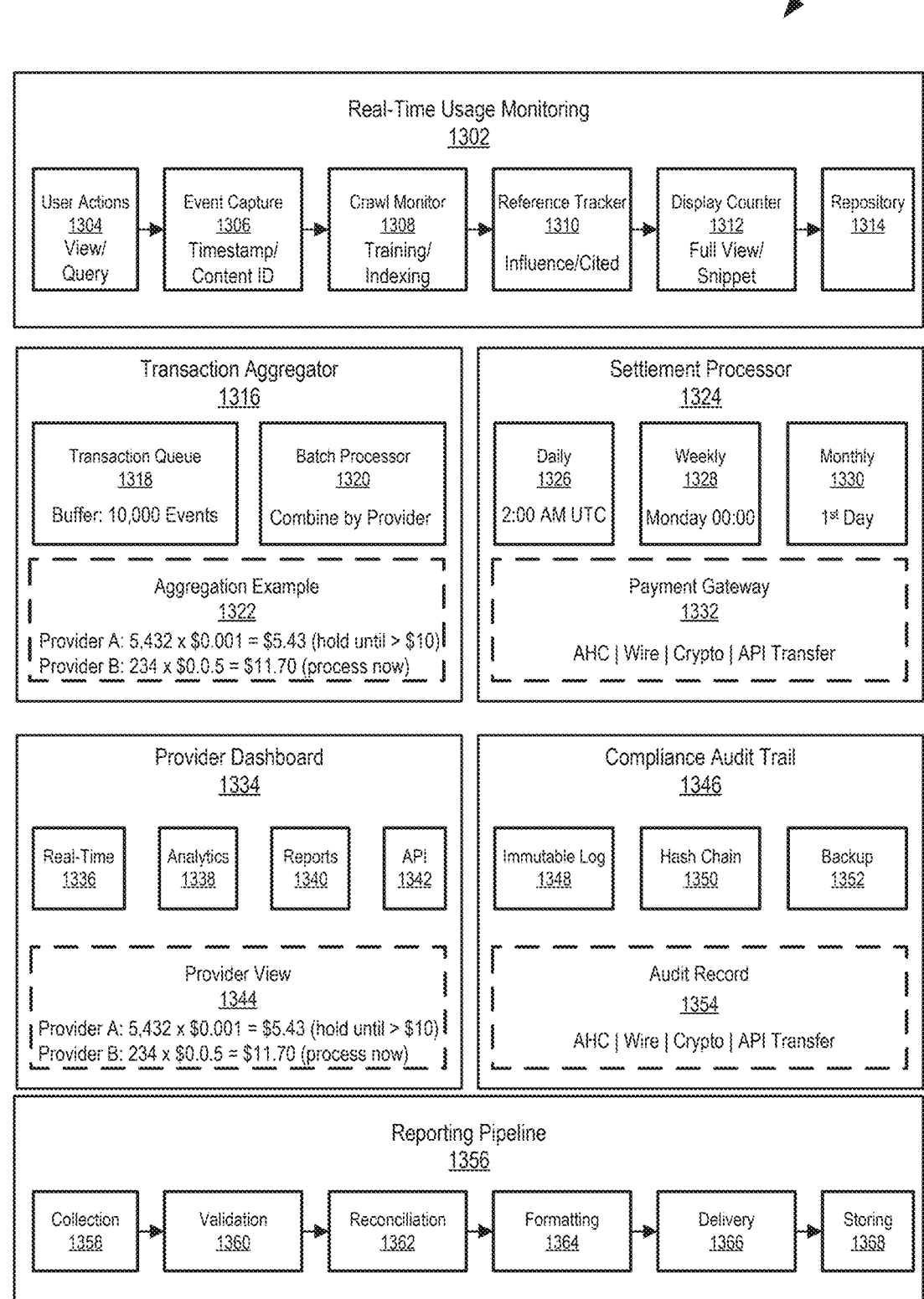
FIG. 13 illustrates a usage tracking and reporting system, according to aspects of the present disclosure.

Referring to FIG. 13, a usage tracking and reporting system 1300 may provide monitoring, aggregation, and/or reporting capabilities for content usage across multiple providers, enabling compensation calculation and regulatory compliance for machine-readable licensing implementations. The usage tracking and reporting system 1300 may coordinate real-time event capture with batch settlement processing to handle large amounts of micro-transactions while maintaining transparency and auditability throughout the payment lifecycle. In some aspects, the usage tracking and reporting system 1300 may interface with the payment model engine 1202 of FIG. 12 to process tracked usage events according to configured payment models and billing arrangements.

A real-time usage monitoring module 1302 within the usage tracking and reporting system 1300 may provide continuous tracking of content interactions between AI systems and licensed content across multiple usage categories and access patterns. The real-time usage monitoring module 1302 may capture user actions 1304 that initiate content access events, including direct user requests and system-initiated content retrieval operations for recommendation generation or search result compilation. In some aspects, an event capture module 1306 may timestamp each interaction with while associating usage events with specific content identifiers, user sessions, and provider attributions. The real-time usage monitoring module 1302 may incorporate specialized tracking components for different usage types that align with machine-readable licensing categories. A crawl monitor 1308 may track content accessed for training data ingestion, index building, or automated analysis operations that support AI system learning and knowledge base development. In some aspects, the crawl monitor 1308 may distinguish between different crawling purposes and depths, enabling granular billing according to the per-crawl module 1210 specifications described in FIG. 12. A reference tracker 1310 may identify instances where content influences AI responses without direct reproduction, tracking one or more of explicit citations and/or implicit content influences that may be compensated under an influence-based licensing model for example. The reference tracker 1310 may implement semantic analysis algorithms that detect when AI-generated responses incorporate concepts, patterns, and/or knowledge derived from licensed content sources.

With continued reference to FIG. 13, a display counter 1312 within the real-time usage monitoring module 1302 may monitor instances where content is presented to end users through various interface modalities, differentiating between full content display, snippet presentation, and/or preview generation. The display counter 1312 may track engagement metrics including view duration, interaction depth, and user actions to support sophisticated billing models that correlate compensation with actual user engagement levels. In some aspects, the display counter 1312 may coordinate with the per-display module 1214 of FIG. 12 to calculate charges based on display type and user interaction patterns. A repository 1314 may maintain real-time usage metrics with sub-millisecond write latency, implementing write-optimized storage structures that support high-throughput event ingestion while enabling real-time analytics and monitoring capabilities. A transaction aggregator 1316 may batch related transactions for cost-effective payment processing instead of processing individual micro-payments for each content interaction. A transaction queue 1318 may buffer incoming usage events, maintaining sliding windows of up to 10,000 events per provider for example, while implementing overflow protection and automatic batch triggering based on one or more configurable thresholds. In some aspects, the transaction queue 1318 may implement priority queuing mechanisms that ensure high-value transactions receive expedited processing while maintaining fairness across providers. A batch processor 1320 may combine related transactions by provider, reducing payment processing overhead while maintaining accurate compensation tracking and detailed transaction records for audit purposes.

An example of batching logic is provided as an aggregation example 1322 that illustrates threshold-based payment triggering. For Provider A, 5,432 micro-transactions at $0.001 each may total $5.43, remaining below the $10 minimum threshold for cost-effective payment processing, causing the system to hold these transactions until the threshold is reached or a maximum hold period expires. Conversely, Provider B's 234 transactions at $0.05 each may total $11.70, exceeding the threshold and triggering immediate payment processing. In some aspects, the aggregation logic may implement dynamic threshold adjustments based on provider preferences, transaction costs, and/or cash flow requirements while maintaining compliance with contractual payment terms.

As further shown in FIG. 13, a settlement processor 1324 may manage scheduled payment processing across multiple temporal granularities to accommodate diverse provider preferences and operational requirements. For example, a daily settlement module 1326 may process accumulated transactions at 2:00 AM UTC, chosen to minimize conflict with peak usage periods while ensuring timely compensation delivery. As another example, a weekly settlement module 1328 may handle providers preferring less frequent but larger payments, processing on Mondays at 00:00 UTC to align with standard business accounting cycles. In some aspects, a monthly settlement module 1330 may accommodate enterprise agreements and subscription-based arrangements, processing on the first day of each month to support predictable cash flow management and simplified accounting procedures.

A payment gateway 1332 within the settlement processor 1324 may interface with multiple payment processes to accommodate diverse provider preferences and international payment requirements. The payment gateway 1332 may support ACH transfers for established domestic providers, wire transfers for international payments requiring currency conversion, cryptocurrency payments for blockchain-native providers seeking decentralized settlement, and/or API-based transfers for integrated platform partners with automated reconciliation systems. In some aspects, the payment gateway 1332 may implement intelligent routing algorithms that select optimal payment methods based on transaction amounts, geographic locations, and cost considerations while maintaining fallback options for payment system failures.

With continued reference to FIG. 13, a provider dashboard 1334 may offer self-service access to usage metrics, payment information, and/or detailed analytics that enable providers to monitor their content performance and revenue generation in real-time. For example, a real-time view 1336 may display current usage statistics, providing visibility into content access patterns and revenue accumulation. An analytics module 1338 may generate trend analysis, usage pattern insights, and/or predictive revenue forecasts that enable providers to optimize their content strategies and pricing models. In some aspects, a reports module 1340 may generate downloadable statements in multiple formats including PDF for human review, CSV for spreadsheet analysis, and machine-readable formats for automated accounting system integration.

An API module 1342 may enable programmatic access to usage data and reporting functions, supporting automated integration with provider business intelligence systems and financial management platforms. The API module 1342 may implement RESTful interfaces with OAuth 2.0 authentication, providing secure access to usage metrics, payment records, and configuration management capabilities. In some aspects, the provider dashboard 1334 may display a provider view example 1344 showing real-time metrics such as "Provider A: 1,432×$0.001=$1.43 (held until >$10)" and "Provider B: 234×$0.05=$11.70 (process now)", demonstrating immediate visibility into both usage volumes and payment status.

A compliance audit trail module 1346 may ensure regulatory compliance and enable dispute resolution through tamper-evident logging of usage events and payment transactions. An immutable log 1348 may record usage events using append-only storage structures that prevent retroactive modification or deletion of historical records. In some aspects, the immutable log 1348 may implement cryptographic timestamping and digital signatures that provide non-repudiation and forensic verification capabilities for regulatory audits and dispute resolution procedures. A hash chain 1350 may implement cryptographic linking between sequential log entries, where each entry includes a cryptographic hash of the previous entry, creating a tamper-evident chain that reveals attempted modifications to historical records.

As further shown in FIG. 13, a backup module 1352 may maintain redundant copies of audit logs across geographically distributed storage systems, ensuring log availability and durability even in cases of regional infrastructure failures or natural disasters. The backup module 1352 may implement continuous replication with configurable retention policies that balance storage costs with compliance requirements across different jurisdictions. In some aspects, an audit record example 1354 may demonstrate the granularity of logged information, showing entries such as "ABC|Wire|Crypto|API Transfer" that document payment methods and transaction details with cryptographic verification, enabling complete reconstruction of payment flows and usage patterns for any specified time period.

A reporting pipeline 1356 may transform raw usage data into formatted reports for various stakeholders including content providers, platform administrators, and regulatory authorities. A collection module 1358 may aggregate usage data from distributed monitoring systems, implementing eventual consistency models that balance data freshness with system performance. A validation module 1360 may ensure data completeness and accuracy through checksums, sequence verification, and/or anomaly detection algorithms that identify potential data corruption or missing events. In some aspects, a reconciliation module 1362 may match usage records with payment records, identifying discrepancies and triggering investigation workflows for mismatched transactions.

A formatting module 1364 may generate reports in multiple formats optimized for different consumption scenarios, including human-readable PDF statements with visualizations and summaries, machine-processable CSV and XML formats for automated processing, and regulatory-compliant XBRL formats for financial reporting requirements. A delivery module 1366 may distribute reports through secure channels including encrypted email for standard delivery, SFTP servers for bulk transfers, and API endpoints for real-time access. In some aspects, a storing module 1368 may maintain historical reports for retention periods mandated by applicable regulations, implementing lifecycle management policies that automatically archive and eventually purge outdated records while maintaining compliance with data retention requirements. The reporting pipeline 1356 may coordinate with the report generator 1252 of FIG. 12 to ensure consistent report generation across different payment models and usage tracking scenarios, providing stakeholders with unified visibility into system operations and financial performance.

Referring to FIG. 14, a content aggregation and/or distribution method 1400 depicts an end-to-end workflow for AI-powered content discovery, licensing, and delivery operations that synthesizes one or more concepts described in FIGS. 1-13. The method 1400 depicts a practical implementation of the AI-interface model 120 introduced in FIG. 1, wherein the content access module 126 may coordinate with multiple provider catalogs (e.g., provider catalogs 110, 114, 118) to deliver unified content access while managing licensing requirements and multi-party rights considerations. In some aspects, the method 1400 may enable content access across heterogeneous provider catalogs while maintaining compliance with diverse licensing frameworks through one or more automated protocol processing and intelligent aggregation mechanisms. The method 1400 may implement sequential and parallel processing operations that handle different aspects of content aggregation, licensing validation, and/or user interaction to provide a streamlined content discovery and delivery experience.

The method 1400 begins at step 1402. At step 1404, the system receives a natural language content request from a user device. The natural language content request may comprise conversational expressions similar to those processed by the natural language module 206 described in FIG. 2, such as "Play action movie," "Find something funny," or "Music for studying" that may require linguistic analysis and intent extraction beyond simple keyword matching. In some aspects, the content request received at step 1404 may establish the bidirectional communication pathway between user device 122 and AI interface 124 as depicted in FIG. 1, initiating the content discovery sequence that distinguishes the AI-interface model 120 from the traditional media model 102.

At step 1406, the method processes the request through the AI system's natural language module. The natural language processing may utilize capabilities similar to the natural language module 206 described in FIG. 2, which may parse linguistic patterns, extract semantic meaning, and convert unstructured user expressions into structured queries suitable for downstream processing operations. In some aspects, the processing at step 1406 may maintain conversation context across multiple user interactions, enabling multi-turn dialogues and clarification requests when user intent is ambiguous or when additional information is needed from the user to properly fulfill the content request.

Step 1408 accesses the user profile database to retrieve personalization data that informs content recommendation and selection processes. The user profile database accessed at step 1408 may be the same as or similar to the user profile database 210 described in FIG. 2, containing media consumption information 212 that tracks user interactions with various content types, including playback history, rating data, skip patterns, and/or engagement metrics. In some aspects, the profile access at step 1408 may retrieve the approximately 10,000 songs (or less or more) and associated consumption metrics described in the profile data structure 808 of FIG. 8, along with non-media activity information 214 such as travel preferences, calendar events, and/or contextual data that influence content recommendations.

At step 1410, the method may analyze user context and intent to understand the underlying purpose and requirements of the content request. The context and intent analysis may utilize capabilities similar to the enhancement engine 604 described in FIG. 6, employing the state detector 608 to identify emotional conditions, the intent recognizer 610 to classify user requests into actionable categories, and/or the context integrator 612 to synthesize information from multiple sources. In some aspects, step 1410 may process emotional states such as anxiety or excitement, activity contexts such as studying or exercising, and/or content intent such as mood regulation or entertainment, enabling the system to understand not merely what content the user is requesting but why they are requesting it.

Step 1412 queries content providers to retrieve available content options that match the analyzed user request and context. The provider querying may utilize the API query module 420 described in FIG. 4 to establish concurrent connections with music provider 408 (for example, catalog of approximately 10 million songs), video provider 410 (for example, approximately 50,000 titles), and podcast provider 412 (for example, approximately 2 million shows). In some aspects, the queries at step 1412 may include search parameters derived from the natural language analysis, user preference data, and/or contextual information to identify relevant content from provider catalogs while implementing the unified access capabilities that distinguish the AI-interface model from traditional fragmented approaches.

At step 1414, the method processes licensing terms associated with the queried content. The licensing processing may utilize the automated licensing protocol capabilities described in FIGS. 10A and 10B, where the licensing parser 1004, protocol detector 1006, and terms processor 1008 extract and interpret machine-readable licensing information. In some aspects, step 1414 may parse robots.txt extensions with RSL declarations specifying compensation rates such as $0.002/access, process ODRL policies defining usage permissions and compensation duties, and evaluate Creative Commons licensing terms, enabling automated compliance with diverse licensing frameworks without manual intervention.

Step 1416 aggregates content from multiple sources to create a unified catalog of available options. The aggregation process may utilize the catalog aggregator 424 described in FIG. 4 to normalize metadata formats, resolve duplicate content entries, and/or organize content from heterogeneous provider systems into searchable indexes. In some aspects, the aggregation at step 1416 may implement deduplication procedures that identify and resolve conflicts when the same content appears across multiple providers with different pricing or licensing terms, while maintaining provider-specific characteristics and enabling cross-provider search capabilities through single query operations.

At step 1418, the method performs licensing resolution if needed, particularly for complex multi-jurisdictional or multi-party licensing scenarios. The licensing resolution may incorporate the collective rights management architecture 1100 described in FIG. 11A when coordination with performing rights organizations, mechanical rights organizations, or synchronization rights organizations is required. In territorial licensing scenarios, step 1418 may utilize the territory-based licensing resolver 1112 to determine applicable licensing terms based on user location, implementing the user location module 1114, territory detector 1116, and license selector 1120 to ensure compliance with regional content distribution requirements. For multi-provider content, step 1418 may employ the content licensing module 1126 described in FIG. 11B to aggregate rights from multiple holders, such as video rights from studio ABC at $3.99, music rights from publisher XYZ at $0.15, and subtitle rights from language providers at $0.05.

Step 1420 calculates the total licensing costs for the aggregated content options. The cost calculation may utilize the total calculator 1144 described in FIG. 11B and the payment model engine 1202 described in FIG. 12 to compute aggregate licensing fees across different payment models. In some aspects, step 1420 may process per-access models ($0.001 per crawl, $0.01 per query, $0.05 per display), subscription models ($99 fixed monthly, $10-$50 tiered access), and hybrid models (freemium, bulk discounts, 30% revenue share), producing cumulative licensing costs that reflect the combined pricing structures from multiple providers and rights holders.

At step 1422, the method generates enhanced content recommendations based on the aggregated content, licensing terms, and/or user profile data. The recommendation generation may utilize the enhancement capabilities described in FIG. 6, where the enhancement engine 604 processes content through the query expander 614, entity enhancer 616, and/or trend analyzer 620 to produce contextually relevant suggestions. In some aspects, step 1422 may apply the cross-platform scoring enhancements described in FIG. 7, where the signal aggregator 730 combines base content scores with cross-platform intelligence from viewing history 708, social media activity 710, and/or external engagement 712, potentially applying score modifications such as 15% increases for television appearances or 12% boosts for concert attendance.

Step 1424 presents the enhanced recommendations to the user through the user device interface. The presentation may format recommendations according to device capabilities and/or user preferences, displaying the enhanced list 634 described in FIG. 6 and may include relevance scores and contextual explanations. In some aspects, the recommendations presented at step 1424 may include multiple content options from different providers with transparent pricing information, licensing terms, and/or availability status, enabling informed user selection while maintaining the unified interface experience that characterizes the AI-interface model 120.

At decision step 1426, the method evaluates whether the user has made a content selection from the presented recommendations. This decision point creates a branching structure in the method flow: if the user selects content (YES branch at step 1428), the method proceeds to content acquisition processing; if the user declines recommendations or exits without selection (NO branch at step 1434), the method proceeds directly to step 1434. This branching ensures appropriate resource allocation and processing efficiency based on actual user engagement with the recommendation results.

Following the YES branch from decision step 1426, step 1428 initiates acquisition of the selected content. The content acquisition may utilize the acquisition manager 426 described in FIG. 4 to handle transaction processing, license agreement execution, and/or credential generation procedures. In some aspects, step 1428 may implement verification protocols that revalidate variable fields such as pricing information, currency exchange rates, and/or content availability before completing acquisition transactions, while coordinating with payment processing systems to handle financial transactions with fraud prevention and/or spending control measures.

Step 1430 updates the user profile with information about the current content access session. The profile update may record consumption data, preference indicators, and/or behavioral patterns similar to the profile update operations shown at step 338 of FIG. 3. In some aspects, the update at step 1430 may capture temporal information, content completion rates, user ratings, and/or engagement metrics that improve the AI system's understanding of user preferences, while maintaining synchronization across multiple AI agents when the user profile supports cross-platform access as described in the user profile migration system 800 of FIG. 8.

At step 1432, the method generates usage reports and distributes revenue to appropriate rights holders and/or content providers. The reporting and distribution operations may utilize the usage reporter 522 described in FIG. 5 to compile usage metrics and the payment distributor 1146 described in FIG. 11B to allocate revenues according to predetermined percentages. In some aspects, step 1432 may implement the usage tracking system 1228 described in FIG. 12, employing the crawl counter 1230, query logger 1232, view tracker 1234, and/or billing aggregator 1238 to track various types of user activities and calculate appropriate compensation for rights holders, potentially distributing revenues such as 95.2% to video providers, 3.6% to music publishers, and 1.2% to subtitle providers based on their proportional contribution to the content package.

The method 1400 concludes at step 1434, which may be reached either through the completion of content acquisition and reporting operations (from step 1432) or directly from the NO branch when the user declines content selection (from decision step 1426). Method 1400 depicts implementation of the AI-interface model 120 introduced in FIG. 1, demonstrating how artificial intelligence systems function as dynamic intermediaries between users and multiple content sources while managing the complex ecosystem of natural language processing, user profiling, content aggregation, licensing compliance, and revenue distribution that characterizes modern AI-powered content delivery systems.

Figure 15:
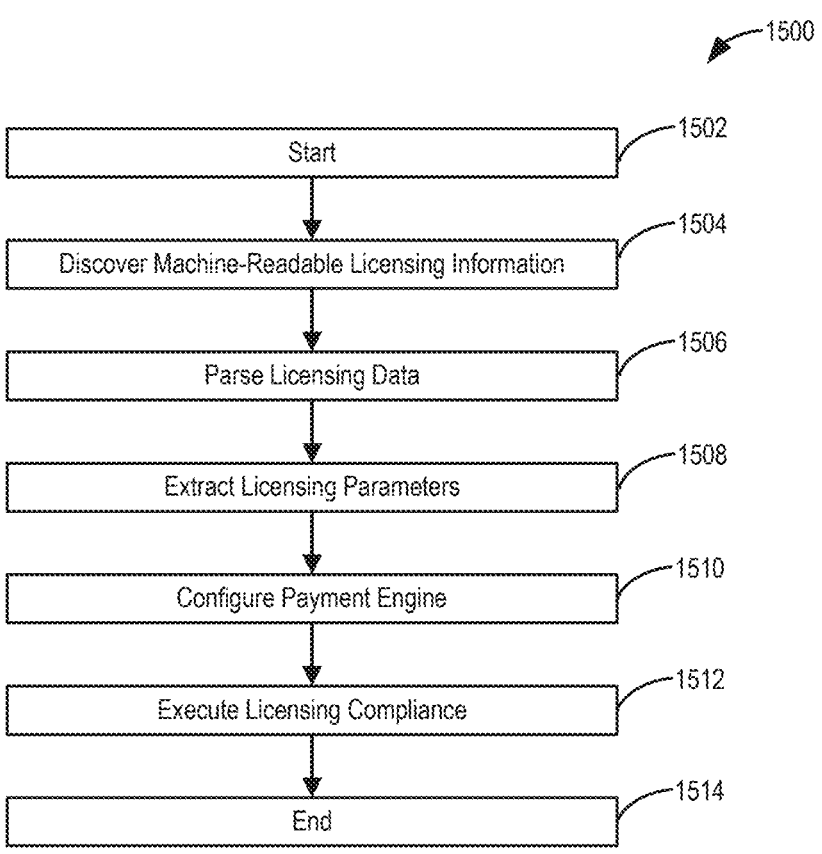
FIG. 15 illustrates a method for automated processing of machine-readable licensing information discovered through various communication protocols and data formats, according to aspects of the present disclosure.

Referring to FIG. 15, an automated machine-readable licensing method 1500 depicts aspects of processing of structured licensing terms that enable content providers to express usage permissions and compensation requirements in formats that automated systems can discover and interpret without human intervention. The method 1500 provides an approach for making licensing information available in machine-parseable formats, enabling automated content access negotiations between AI systems and content providers. In some aspects, the method 1500 represents a method of structured, machine-interpretable licensing data that facilitates automated licensing compliance and payment processing across diverse discovery mechanisms and communication protocols. The method 1500 may be implemented using various machine-readable formats and discovery mechanisms including, but not limited to, Really Simple Licensing (RSL), Open Digital Rights Language (ODRL), Creative Commons Rights Expression Language (CCREL), or custom XML/JSON schemas designed for automated licensing discovery and processing.

The method 1500 begins at step 1502 and then proceeds to 1504, where an automated system discovers machine-readable licensing information through various discovery mechanisms. The discovery may occur through multiple pathways including: embedded directives within robots.txt files or other web protocols; API responses that include licensing metadata; distributed ledger or blockchain-based licensing registries; dedicated licensing endpoints specified in content metadata; or structured data markup within web pages using schemas such as Schema.org or JSON-LD. For example, the discovery may identify RSL (Really Simple Licensing) declarations, ODRL policy files, or proprietary licensing schemas that indicate the availability and location of machine-readable licensing terms. The discovery mechanism is not limited to web standards and may utilize any communication protocol or data exchange mechanism that enables automated systems to identify and access structured licensing information.

At step 1506, the method parses structured licensing data to extract machine-interpretable licensing information. The parsing operation processes structured elements that may include usage type specifications defining permitted uses such as "training," "inference," or "display;" compensation rate definitions specifying payment amounts such as "$0.002" per access event or "$99" per month; and access constraints establishing limitations such as temporal duration, geographic restrictions, or usage volume caps. In implementations utilizing RSL, these elements may be expressed as XML tags such as rsl:usage-type, rsl:compensation, and rsl:duration. In implementations utilizing ODRL, similar information may be expressed through policy structures defining permissions, duties, and constraints. In API-based implementations, licensing data may be provided as JSON objects with standardized fields. The structured data format enables consistent parsing regardless of the specific schema implementation or discovery mechanism employed.

Step 1508 extracts standardized licensing parameters from the parsed structured data, transforming provider-specific licensing declarations into internal representations that the system can process uniformly. The extraction process may map usage rights to permission models that define authorized actions, compensation specifications to payment obligations that establish financial requirements, and/or access constraints to enforcement parameters. This enables the system to process diverse licensing formats, whether discovered through web protocols, APIs, blockchain systems, or other mechanisms, while maintaining consistent internal processing logic. The extraction process may be agnostic to the discovery mechanism and/or the specific licensing format, supporting scalable adoption across heterogeneous content distribution ecosystems.

At step 1510, the method may configure an automated payment engine based on the extracted parameters. The configuration may establish billing mechanisms that implement the specified compensation rates and constraints, coordinating with the payment engine 1010 and unified payment model 1040 described in FIGS. 10A and 10B. This automated configuration may operate without regard to how the licensing information was discovered or in what format it was expressed. The payment engine configuration may support various payment models including per-access micro-payments, subscription-based billing, usage-based tiers, or hybrid compensation structures, derived automatically from the machine-readable licensing data.

Step 1512 executes automated licensing compliance through tracking, calculation, and/or payment processing based on the configured parameters. The execution implements usage monitoring to track content access events, calculates fees based on the specified compensation model, and/or processes payments according to the licensing requirements. This automated compliance may operate without manual intervention, ensuring that content providers receive appropriate compensation regardless of the discovery mechanism, data format, or communication protocol used to convey the licensing information. The compliance execution may include real-time usage reporting, periodic settlement procedures, and audit trail generation to maintain transparency and accountability.

The method 1500 concludes at step 1514, having established a fully automated licensing relationship between the automated system and content provider based solely on machine-readable licensing data. The automated machine-readable licensing method thereby enables scalable content monetization across diverse distribution channels and platforms, supporting the direct publishing pathway 1164 described in FIG. 11D where independent artists and content creators can make their licensing terms discoverable and enforceable by automated systems. While RSL embedded in robots.txt represents one specific implementation, the method 1500 encompasses any structured, machine-readable licensing format that can be discovered through any communication protocol or data exchange mechanism, enabling automated licensing discovery, parsing, and compliance by AI systems and other automated content consumers across the full spectrum of digital content distribution architectures.

Figure 16:
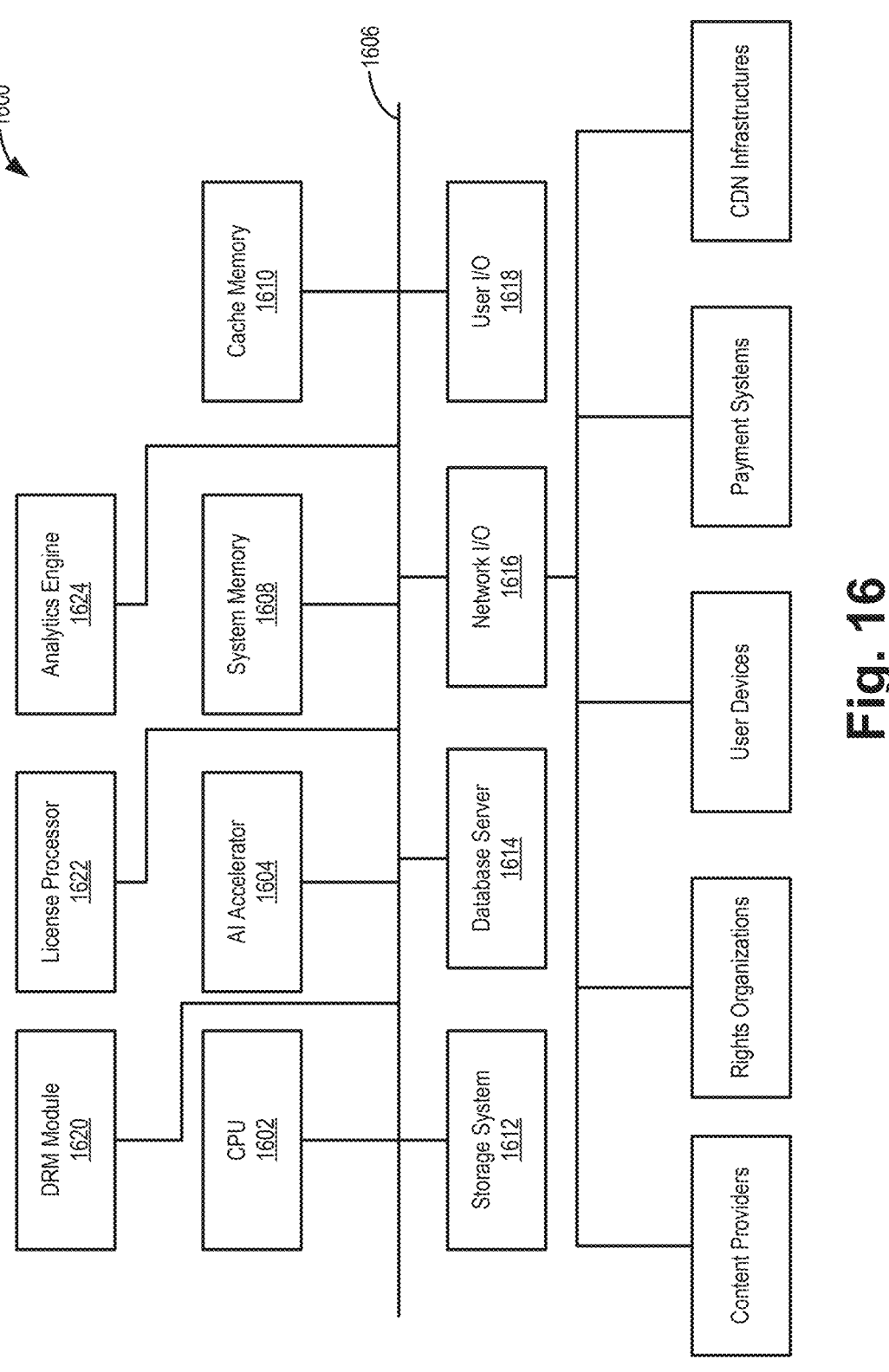
FIG. 16 illustrates a hardware architecture for an AI content aggregation system, according to aspects of the present disclosure.

Referring to FIG. 16, a hardware architecture 1600 for an AI content aggregation system illustrates the physical computing components and interconnections that enable one or more of one or more methods and/or one or more systems described in FIGS. 1-15. The hardware architecture 1600 provides a computational infrastructure to execute an AI-interface model 120 of FIG. 1, process the machine-readable licensing protocols of FIG. 15, and/or support a content aggregation method 1400 of FIG. 14. In some aspects, the hardware architecture 1600 may be implemented as a distributed computing system with components located across multiple data centers, or as a consolidated server infrastructure within a single facility, depending on scalability and performance requirements.

The hardware architecture 1600 includes a CPU 1602 comprising a processor configured to execute general-purpose computing operations which may be needed by an AI content aggregation system. The CPU 1602 may handle natural language processing operations for the natural language module 206 described in FIG. 2, execute API query operations for the API query module 420 of FIG. 4, parse licensing protocols as performed by the licensing parser 1004 of FIG. 10A, and manage overall system coordination. In some aspects, the CPU 1602 may comprise x86-64 or ARM-based processors with multiple cores operating at frequencies suitable for real-time content processing and user interaction management.

An AI accelerator 1604 provides specialized processing capabilities optimized for machine learning inference and neural network operations. The AI accelerator 1604 may comprise one or more graphics processing units (GPUs), tensor processing units (TPUs), or dedicated neural processing engines that accelerate the recommendation engine 208 of FIG. 2, the enhancement engine 604 of FIG. 6, and the cross-platform analyzer 718 of FIG. 7. In some aspects, the AI accelerator 1604 may execute parallel processing operations for content scoring, pattern analysis, and recommendation generation, providing the computational throughput necessary to process thousands of concurrent user requests while maintaining low latency response times.

A system bus 1606 provides an interconnection pathway between processing units, memory systems, storage devices, and input/output interfaces. The system bus 1606 may implement high-bandwidth protocols such as PCIe 4.0 or 5.0, enabling rapid data transfer between components to support real-time content processing and delivery operations. In some aspects, the system bus 1606 may comprise multiple independent channels to enable parallel data transfers and prevent bottlenecks during peak usage periods.

System memory 1608 comprises random access memory (RAM) that stores active data structures and processing buffers. The system memory 1608 may maintain the user profile database 210 components in memory for rapid access, cache content metadata from provider catalogs, store active user sessions, and provide working memory for natural language processing and recommendation generation algorithms. In some aspects, the system memory 1608 may comprise DDR5 or HBM (High Bandwidth Memory) modules providing hundreds of gigabytes to terabytes of capacity to support large-scale concurrent user operations.

Cache memory 1610 provides multiple levels of high-speed storage (L1, L2, L3 cache) integrated with or closely coupled to the processing units. The cache memory 1610 may store frequently accessed data such as popular content metadata, common API responses, parsed licensing terms from recent queries, and hot content data that multiple users are likely to request. In some aspects, the cache memory 1610 implements the caching mechanisms of the cache manager 422 described in FIG. 4, reducing latency for repeated queries and improving overall system responsiveness.

A storage system 1612 provides persistent storage for content databases, user profiles, licensing registries, and usage logs. The storage system 1612 may comprise solid-state drive (SSD) arrays or NVMe storage systems that provide high-speed data retrieval for the content catalogs containing millions of songs, videos, and podcasts described throughout the specification. In some aspects, the storage system 1612 may implement hierarchical storage management with hot data on high-performance SSDs and archival data on lower-cost storage media.

A database server 1614 manages distributed storage for provider catalogs, transaction records, rights management data, and analytics information. The database server 1614 may implement the storage backend for the provider catalog 728 of FIG. 7, the territory rights database 1118 of FIG. 11A, and the active provider database 926 of FIG. 9. In some aspects, the database server 1614 may comprise distributed database systems that provide redundancy, scalability, and geographic distribution to ensure data availability and disaster recovery capabilities.

Network I/O 1616 provides high-speed network connectivity for communicating with external systems. The network I/O 1616 may comprise multiple network interface cards supporting 10/40/100 Gigabit Ethernet or fiber optic connections to handle communications with provider APIs 630, user device connections, CDN interfaces for content delivery, and payment gateway integrations. In some aspects, the network I/O 1616 implements the communication pathways that enable the system to query multiple providers simultaneously as described in step 1422 of FIG. 14.

User I/O 1618 manages input and output operations for user interactions with the system. The user I/O 1618 may process display output for presenting recommendations, handle audio streaming for content delivery, process touch and voice inputs from user devices, and manage other interface modalities. In some aspects, the user I/O 1618 supports the bidirectional communication between user devices and the AI system depicted in the system architectures of FIGS. 1-5.

A DRM module 1620 provides hardware-based security features for digital rights management operations. The DRM module 1620 may include encryption engines, secure key storage, and access control mechanisms that implement the DRM module 508 functionality described in FIG. 5. In some aspects, the DRM module 1620 may comprise trusted platform modules (TPMs) or hardware security modules (HSMs) that provide tamper-resistant storage and processing for sensitive cryptographic operations.

A license processor 1622 comprises dedicated hardware or specialized processing units optimized for parsing and processing machine-readable licensing formats. The license processor 1622 may accelerate the parsing operations described in FIGS. 10A, 10B, and 15, providing hardware-accelerated XML/JSON parsing for RSL schemas, ODRL policies, and other licensing formats. In some aspects, the license processor 1622 may include custom ASICs or FPGAs programmed to efficiently process structured licensing data and extract standardized parameters for payment engine configuration.

An analytics engine 1624 provides real-time processing capabilities for usage tracking, pattern analysis, and report generation. The analytics engine 1624 may implement the functionality of the usage tracking system 1228 described in FIG. 12, processing millions of usage events to generate billing data and analytics reports. In some aspects, the analytics engine 1624 may comprise stream processing hardware optimized for real-time event processing and aggregation operations.

The hardware architecture 1600 may interface with external systems including content providers (music, video, podcast APIs), rights organizations (ASCAP, BMI, GEMA), user devices (smartphones, tablets, smart TVs), payment systems (gateways, banks, cryptocurrency networks), and CDN infrastructure (edge servers, cache nodes) through the network I/O 1616. These external connections enable the hardware architecture 1600 to function as a physical implementation platform for the AI content aggregation and distribution methods described herein, providing the computational resources necessary to process natural language requests, aggregate content from multiple sources, enforce licensing compliance, and/or deliver content to users while maintaining appropriate compensation for rights holders.

The disclosed systems may implement integration architectures that coordinate multiple specialized components to deliver unified AI-based media and product aggregation capabilities across diverse content ecosystems and user interaction scenarios. These integrated systems may enable seamless coordination between content discovery mechanisms, licensing management frameworks, rights enforcement protocols, payment processing systems, and content delivery infrastructure while maintaining automated operation and user experience consistency. In some aspects, the integration architecture may support real-time coordination between multiple AI agents that specialize in different functional domains while reporting to higher-level coordination systems that manage overall user interface operations and service delivery. The integrated approach may enable complex multi-dimensional processing workflows that simultaneously evaluate content availability, licensing compliance, territorial restrictions, payment authorization, and delivery optimization while presenting simplified interaction models to end users.

The system integration may commence when users submit natural language requests that trigger coordinated processing workflows across multiple specialized components and external service providers. Natural language processing systems may analyze user inputs to extract intent information, emotional context, and content preferences while coordinating with user profile databases that maintain behavioral patterns and personalization data. In some aspects, the natural language analysis may coordinate with contextual analysis systems that incorporate non-media activity data, social engagement patterns, and external behavioral signals to enhance content recommendation accuracy beyond traditional consumption-based approaches. The processed user requests may then initiate parallel processing pathways that simultaneously query multiple content provider systems while evaluating licensing requirements and territorial compliance obligations.

Content discovery operations may coordinate with multiple provider application programming interfaces simultaneously while implementing various discovery mechanisms including structured API queries, decentralized record systems, and crawlable websites with machine-readable data formats. The discovery systems may implement automated scanning capabilities that identify content availability across diverse hosting configurations including provider-hosted systems, content delivery networks, and AI-managed hosting infrastructure. In some aspects, the discovery mechanisms may coordinate with authentication infrastructure that utilizes blockchain verification or digital signature validation to verify legitimate content providers while preventing unauthorized content distribution and fraudulent provider activities. The discovery results may then flow to content aggregation systems that normalize metadata formats and resolve conflicts between different provider catalogs and pricing structures.

Specialized AI sub-agents may operate within the integrated architecture to filter specific classes of goods or media while reporting to higher-level generalist AI systems that manage user interface operations and overall service coordination. These specialized agents may focus on particular content categories such as music, video, podcasts, or physical products while maintaining expertise in domain-specific licensing requirements, quality standards, and delivery mechanisms. In some aspects, the specialized sub-agents may implement machine learning algorithms that adapt to content category characteristics and provider-specific requirements while coordinating with generalist systems that maintain overall user context and cross-domain recommendation strategies. The sub-agent architecture may enable distributed processing capabilities that optimize performance and specialization while maintaining coordinated decision-making and unified user experience delivery.

The licensing negotiation and rights management systems may coordinate with multiple collective rights organizations simultaneously while implementing territorial resolution capabilities that ensure geographic compliance across different jurisdictions and regulatory frameworks. The licensing systems may process multiple rights expression languages including Open Digital Rights Language policies, Creative Commons Rights Language expressions, and robots.txt extensions that enable automated discovery and processing of content licensing terms. In some aspects, the rights management systems may coordinate with performing rights organizations, mechanical rights organizations, and synchronization rights organizations to ensure rights clearance while maintaining appropriate compensation distribution mechanisms. The licensing coordination may implement real-time negotiation capabilities that enable dynamic pricing and licensing arrangements between AI agents and content providers based on current market conditions and user requirements.

Multi-provider content scenarios may require rights aggregation capabilities that combine video rights, music rights, and subtitle rights from different providers into unified licenses with cumulative pricing structures. The rights aggregation systems may coordinate with payment calculation mechanisms that determine total licensing costs while implementing revenue distribution algorithms that allocate compensation among multiple rights holders according to predetermined percentage arrangements. In some aspects, the rights aggregation may coordinate with territorial licensing resolvers that ensure multi-component content licensing maintains compliance with geographic restrictions and regulatory requirements across different content elements and provider relationships. The aggregated licensing arrangements may then flow to payment processing systems that handle complex multi-party compensation scenarios while maintaining accurate accounting and transparent revenue distribution.

Payment processing integration may coordinate multiple concurrent payment models including pre-access models with per-crawl, per-query, and per-display pricing tiers, subscription models with fixed monthly and tiered access options, and hybrid models with freemium and revenue sharing arrangements. The payment systems may implement micro-payment capabilities that support fractional cent transactions as low as $0.001 per stream while coordinating with external payment processors and financial institutions to ensure cost-effective transaction processing. In some aspects, the payment integration may coordinate with usage tracking systems that monitor crawl counters, query loggers, view trackers, and time meters to generate accurate billing calculations across diverse usage patterns and access scenarios. The payment processing may implement automated settlement procedures that execute daily settlement at predetermined UTC times while maintaining compliance with financial regulations and audit requirements.

The integrated payment architecture may coordinate with transaction queues that provide buffer capacity for up to 10,000 events while implementing batch processing capabilities that combine transactions by provider identity to optimize processing efficiency and reduce transaction costs. The payment systems may coordinate with provider dashboard interfaces that display real-time revenue metrics, analytics reporting, and transaction documentation while maintaining data security and access control appropriate for different provider roles and authorization levels. In some aspects, the payment integration may coordinate with compliance audit trails that maintain immutable transaction records through cryptographic protection mechanisms while ensuring regulatory compliance and audit trail preservation across different jurisdictions and oversight requirements.

Content delivery coordination may implement multiple hosting configurations including provider-hosted, content delivery network-based, and AI-managed delivery options while maintaining digital rights management enforcement and access control mechanisms. The delivery systems may coordinate with digital rights management modules that implement content protection, device restrictions, play limits, and encryption protocols while ensuring compliance with provider-specified licensing terms and usage limitations. In some aspects, the content delivery integration may coordinate with verification protocols that revalidate volatile fields such as shipping costs, currency exchange rates, and inventory levels before completing purchase transactions for physical goods distribution. The delivery coordination may implement fulfillment mechanisms that route physical goods directly from manufacturers, aggregators, or through AI platform-managed warehouses while maintaining tracking and customer service capabilities.

Authentication and security integration may coordinate across multiple system components to ensure access control and fraud prevention while maintaining user experience quality and processing efficiency. The authentication systems may implement blockchain verification and digital signature validation mechanisms that verify content provider legitimacy while coordinating with user authentication systems that manage access permissions and session control across multiple platform connections. In some aspects, the security integration may coordinate with fraud detection systems and risk management platforms that monitor transaction patterns and user behaviors while implementing automated response mechanisms that prevent unauthorized access and fraudulent activities. The authentication coordination may implement Coalition for Content Provenance and Authenticity standards that ensure content authenticity verification while maintaining automated processing capabilities and distributed verification mechanisms.

Customer support integration may implement layered support architectures where first-line support operations are handled by AI systems based on product metadata and user profile information while second-line support escalates complex issues to human operators, content providers, or manufacturers as appropriate. The support systems may coordinate with knowledge bases that contain product information, licensing terms, and troubleshooting procedures while implementing natural language processing capabilities that enable automated response generation and issue resolution. In some aspects, the customer support integration may coordinate with user profile systems and transaction histories to provide personalized assistance while maintaining privacy protections and data security standards. The support coordination may implement escalation procedures and case management systems that ensure appropriate issue resolution while maintaining customer satisfaction and service quality standards.

Personalization data integration may coordinate across multiple AI agents under user-specified permissions to enable cross-AI personalization and universal access while maintaining data privacy and security controls. The personalization systems may coordinate with user profile migration capabilities that enable secure data transfer between different AI platforms while preserving preference information and behavioral patterns. In some aspects, the personalization integration may coordinate with external data sources and contextual information systems that enhance recommendation accuracy through cross-platform intelligence and multidimensional user understanding. The personalization coordination may implement data synchronization mechanisms that maintain consistency across multiple AI agents and platform integrations while enabling selective data sharing and privacy control based on user preferences and authorization settings.

The system integration may enable automated provider onboarding through registration portals that coordinate with validation systems comprising API schema validators, licensing parser modules, catalog ingestion systems, and automated test suites that verify end-to-end functionality before adding providers to active databases. The onboarding integration may coordinate with rights verification systems and hosting configuration modules that establish appropriate content delivery infrastructure while ensuring compliance with platform requirements and industry standards. In some aspects, the provider integration may coordinate with certification modules that issue final approval for provider operations while implementing ongoing monitoring capabilities that track provider performance and compliance status. The integrated onboarding approach may enable scalable platform expansion while maintaining quality standards and operational consistency across diverse provider types and technical capabilities.

A number of implementations have been described. Nevertheless, it will be understood that various modifications may be made without departing from the spirit and scope of the disclosure. Accordingly, other implementations are within the scope of the following claims.

Implementation examples are described in the following numbered clauses:

Clause 1: A method comprising: receiving a request for media content from a user device; querying a plurality of content provider application programming interfaces (APIs) to retrieve media catalog data, wherein each content provider API exposes at least one of pricing data or licensing terms; based on content obtained from one or more of the plurality of content provider APIs, generating a list of media recommendations; receiving a selection of a media item from the list of media recommendations; providing to a content provider system associated with the selected media item, an acquisition request; and retrieving the selected media item from a hosting system.

Clause 2: The method of Clause 1, further comprising: accessing a user profile comprising media consumption data and non-media activity data; and wherein the querying is further based on the user profile.

Clause 3: The method of Clause 2, wherein generating the list of media recommendations comprises: calculating a base score for each media item based on the media consumption data; and modifying the base score based on correlations between the non-media activity data and metadata of each media item.

Clause 4: The method of any one of Clauses 1-3, wherein the pricing data exposed by at least one content provider API comprises at least one of: per-access pricing; subscription pricing; rental pricing for defined time periods; or purchase pricing.

Clause 5: The method of any one of Clauses 1-4, wherein the licensing terms exposed by at least one content provider API comprise machine-readable licensing information in at least one of: robots.txt format with licensing extensions; Really Simple Licensing (RSL) format; Open Digital Rights Language (ODRL) format; or Creative Commons Rights Language format.

Clause 6: The method of any one of Clauses 1-5, further comprising: parsing the licensing terms to extract compensation requirements; and configuring payment parameters based on the extracted compensation requirements.

Clause 7: The method of any one of Clauses 1-6, wherein retrieving the selected media item comprises: receiving access credentials from the content provider system; and using the access credentials to establish a connection with the hosting system.

Clause 8: The method of Clause 7, wherein the access credentials comprise at least one of: a hosting endpoint URL; an authentication token valid for a specified duration; a decryption key; or enforceable playback restrictions.

Clause 9: The method of any one of Clauses 1-8, wherein the request for media content comprises natural language text, the method further comprising: converting the natural language text into structured search parameters prior to querying the plurality of content provider APIs.

Clause 10: The method of Clause 9, wherein converting the natural language text comprises: detecting an emotional state indicator in the natural language text; and generating search parameters that include content attributes corresponding to the detected emotional state.

Clause 11: The method of Clause 10, wherein the content attributes corresponding to the detected emotional state comprise at least one of: tempo ranges for audio content; energy level specifications; instrumentation preferences; or mood regulation parameters.

Clause 12: The method of any one of Clauses 9-11, wherein converting the natural language text comprises: identifying an activity context in the natural language text; and generating search parameters optimized for the identified activity context.

Clause 13: The method of Clause 12, wherein the activity context comprises one of: studying or focus-required activities, wherein the search parameters specify minimal lyrical content; physical exercise activities, wherein the search parameters specify high-tempo content; or relaxation activities, wherein the search parameters specify calming content characteristics.

Clause 14: The method of any one of Clauses 9-13, further comprising: formatting the list of media recommendations as natural language text for presentation to the user device.

Clause 15: The method of any one of Clauses 1-14, further comprising: determining a geographic location associated with the user device; and filtering the media catalog data based on territorial licensing restrictions associated with the geographic location.

Clause 16: The method of any one of Clauses 1-15, further comprising: monitoring usage events for the selected media item; and transmitting aggregated usage metrics to the content provider system for compensation calculation.

Clause 17: The method of any one of Clauses 2-3, wherein the non-media activity data comprises research activity indicating a future event, the method further comprising: identifying a correlation between the future event and content metadata; and prioritizing media recommendations that relate to the future event.

Clause 18: The method of Clause 17, wherein: the future event comprises a travel destination extracted from at least one of booking confirmations, calendar entries, or search history; and the prioritized media recommendations comprise content with settings, themes, or cultural elements associated with the travel destination.

Clause 19: The method of any one of Clauses 1-18, further comprising: aggregating the media catalog data from the plurality of content provider APIs into a unified searchable index; and wherein generating the list of media recommendations comprises searching across content from multiple providers simultaneously through the unified index.

Clause 20: The method of any one of Clauses 1-19, further comprising: maintaining a persistent conversation context across multiple request-response cycles associated with at least one of the user device or a user; and refining the list of media recommendations based on accumulated context from the persistent conversation.

Clause 21: The method of any one of Clauses 1-20, wherein at least one of the pricing data or licensing terms are exposed in a standardized format, the standardized format comprising: a schema defining data field names and data types; territorial pricing variations; and usage restriction parameters.

Clause 22: The method of any one of Clauses 1-21, wherein retrieving the selected media item comprises retrieving from one of: an AI-managed hosting infrastructure; a common content delivery network utilized by multiple content providers; or a provider-specific hosting system.

Clause 23: The method of any one of Clauses 1-22, wherein the content provider APIs are discovered through at least one of: automated web crawling that identifies machine-readable licensing terms; provider registration with an AI system; or decentralized content registries.

Clause 24: The method of any one of Clauses 1-23, further comprising: prior to providing the acquisition request, verifying current pricing and availability through the content provider API; and confirming the pricing matches cached pricing data.

Clause 25: A processing system, comprising: a memory comprising computer-executable instructions; and a processor configured to execute the computer-executable instructions and cause the processing system to perform a method in accordance with any one of Clauses 1-24.

Clause 26: A processing system, comprising means for performing a method in accordance with any one of Clauses 1-24.

Clause 27: A non-transitory computer-readable medium storing program code for causing a processing system to perform the steps of any one of Clauses 1-24.

Clause 28: A computer program product embodied on a computer-readable storage medium comprising code for performing a method in accordance with any one of Clauses 1-24.

Clause 29: A method comprising: receiving licensing information from a content provider in a machine-readable format; processing the licensing information to identify a protocol type from among a plurality of supported protocols; extracting licensing terms from the licensing information based on the identified protocol type; and determining whether to access content associated with the content provider based on the extracted licensing terms.

Clause 30: The method of Clause 29, wherein the plurality of supported protocols comprises at least two of: robots.txt format with licensing extensions; Really Simple Licensing (RSL) format; Open Digital Rights Language (ODRL) format; or Creative Commons Rights Language (CCRL) format.

Clause 31: The method of Clause 30, wherein when the protocol type is RSL, the licensing terms comprise XML elements including at least one of: usage-type specifications; compensation-rate definitions; or access-duration parameters.

Clause 32: The method of Clause 30, wherein when the protocol type is ODRL, extracting the licensing terms comprises: identifying action-based permissions; and extracting duty specifications that define obligations.

Clause 33: The method of any one of Clauses 29-32, wherein determining whether to access content comprises: comparing the extracted licensing terms to predetermined acceptance criteria; and proceeding with content access when the licensing terms satisfy the acceptance criteria.

Clause 34: The method of any one of Clauses 29-33, further comprising: when determining to access the content, configuring payment parameters based on compensation requirements in the extracted licensing terms; and establishing automated billing mechanisms for content access.

Clause 35: The method of Clause 34, wherein the compensation requirements comprise at least one of: per-reference pricing for individual content access; per-crawl pricing for automated data extraction; monthly spending caps; or compensation amounts established on a per access basis.

Clause 36: The method of Clause 34 or 35, wherein configuring payment parameters comprises: establishing event-driven billing systems that capture content access events; implementing transaction queues for batch payment processing; and enabling micro-payment capabilities for fractional cent transactions.

Clause 37: The method of any one of Clauses 34-36, further comprising: tracking content access events; aggregating access events by provider and pricing tier; and calculating compensation amounts based on the aggregated events and extracted compensation requirements.

Clause 38: The method of Clause 37, wherein tracking content access events comprises at least one of: monitoring crawl operations for training data extraction; logging query operations for content discovery; or recording display events for user-facing content presentation.

Clause 39: The method of any one of Clauses 29-38, wherein processing the licensing information comprises at least one of: applying rule-based parsing to identify the protocol type; or using machine learning models to interpret the licensing information.

Clause 40: The method of any one of Clauses 29-39, wherein processing the licensing information to identify the protocol type comprises: analyzing structural markers within the licensing information; identifying namespace declarations or vocabulary patterns; and selecting extraction rules based on the identified protocol type.

Clause 41: The method of any one of Clauses 29-40, further comprising: receiving licensing information in multiple different formats from the content provider simultaneously; and processing each format through parallel processing pathways.

Clause 42: The method of Clause 41, wherein the parallel processing comprises: extracting first licensing terms from robots.txt extensions through a first pathway; extracting second licensing terms from one or more policies through a second pathway; and consolidating the first and second licensing terms before determining whether to access content.

Clause 43: The method of any one of Clauses 29-42, wherein the licensing information is discovered through at least one of: automated web crawling that identifies embedded licensing data; API responses that include licensing policies; or dedicated licensing endpoints.

Clause 44: The method of any one of Clauses 29-43, further comprising: when determining not to access the content based on the extracted licensing terms, generating a notification indicating non-compliance with the licensing terms.

Clause 45: The method of any one of Clauses 29-44, further comprising: caching the extracted licensing terms with expiration timestamps; detecting expiration of cached licensing terms; and re-processing the licensing information upon expiration.

Clause 46: The method of any one of Clauses 29-45, further comprising: validating the extracted licensing terms for consistency and completeness; resolving conflicts when multiple licensing terms apply to the same content; and applying hierarchical precedence rules.

Clause 47: The method of any one of Clauses 29-46, further comprising: maintaining a registry of the plurality of supported protocols and their associated extraction rules; and implementing fallback mechanisms when processing fails for a detected protocol type.

Clause 48: The method of any one of Clauses 29-47, wherein the extracted licensing terms comprise at least one of: usage permissions defining allowed content operations; access constraints including temporal or geographic limitations; compensation requirements; or usage frequency restrictions.

Clause 49: The method of any one of Clauses 29-48, further comprising: generating audit logs of licensing term extractions and access determinations; and maintaining immutable records of content access decisions.

Clause 50: The method of any one of Clauses 34-38, further comprising: when the content provider represents multiple rights holders, distributing payments to the multiple rights holders according to predetermined percentage allocations.

Clause 51: A method comprising: automatically discovering, by an AI crawler, content hosting locations through web scanning operations; identifying machine-readable licensing information at the discovered content hosting locations; extracting pricing specifications from the machine-readable licensing information, wherein the pricing specifications are self-published by content creators without intermediary involvement; verifying authenticity of the content through cryptographic verification mechanisms; and establishing direct content access relationships between the AI system and the content creators based on the extracted pricing specifications.

Clause 52: A processing system, comprising: a memory comprising computer-executable instructions; and a processor configured to execute the computer-executable instructions and cause the processing system to perform a method in accordance with any one of Clauses 29-51.

Clause 53: A processing system, comprising means for performing a method in accordance with any one of Clauses 29-51.

Clause 54: A non-transitory computer-readable medium storing program code for causing a processing system to perform the steps of any one of Clauses 29-51.

Clause 55: A computer program product embodied on a computer-readable storage medium comprising code for performing a method in accordance with any one of Clauses 29-51.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving a request for media content from a user device;
   querying a plurality of content provider application programming interfaces (APIs) to retrieve media catalog data, wherein at least one content provider API of the plurality of content provider APIs returns media catalog data including licensing terms expressed in a rights expression schema comprising structured elements that define usage permissions and compensation requirements;
   based on the media catalog data and the request for media content, generating a list of media recommendations;
   receiving a selection of a media item from the list of media recommendations;
   determining a rights expression schema for the licensing terms associated with the selected media item from among a plurality of supported rights expression schemas;
   parsing the licensing terms according to the determined rights expression schema to extract compensation parameters specifying at least one of per-crawl pricing for automated data extraction, per-query pricing for search operations, or per-reference pricing;
   automatically configuring payment parameters of a payment engine based on the extracted compensation parameters;

providing to a content provider system associated with the selected media item, an acquisition request based on the selected media item; and retrieving the selected media item from the content provider system based on the acquisition request.

2. The method of claim 1, further comprising:

accessing a user profile comprising media consumption data and non-media activity data, wherein the querying is based on at least one of the media consumption data and the non-media activity data.

3. The method of claim 2, wherein generating the list of media recommendations comprises:

calculating a base score for each media item based on the media consumption data; and modifying the base score based on correlations between the non-media activity data and metadata of each media item.

4. The method of claim 2, wherein the non-media activity data comprises research activity indicating a future event, the method further comprising:

identifying a correlation between the future event and content metadata; and prioritizing media recommendations that relate to the future event.

5. The method of claim 4, wherein:

the future event comprises a travel destination extracted from at least one of booking confirmations, calendar entries, or search history; and the prioritized media recommendations comprise content with settings, themes, or cultural elements associated with the travel destination.

6. The method of claim 1, wherein the licensing terms exposed by at least one content provider API comprise machine-readable licensing information in at least one of:

robots .txt format with licensing extensions;

Really Simple Licensing (RSL) format;

Open Digital Rights Language (ODRL) format; or

Creative Commons Rights Language format.

7. The method of claim 1, wherein retrieving the selected media item comprises:

receiving access credentials from the content provider system; and using the access credentials to establish a connection with the content provider system.

8. The method of claim 7, wherein the access credentials comprise at least one of:

a hosting endpoint URL;

an authentication token valid for a specified duration;

a decryption key; or enforceable playback restrictions.

9. The method of claim 1, wherein the request for media content comprises natural language text, the method further comprising:

converting the natural language text into structured search parameters prior to querying the plurality of content provider APIs.

10. The method of claim 9, wherein converting the natural language text comprises:

detecting an emotional state indicator in the natural language text; and generating search parameters that include content attributes corresponding to the detected emotional state indicator.

11. The method of claim 10, wherein the content attributes corresponding to the detected emotional state indicator comprise at least one of:

tempo ranges for audio content;

92 energy level specifications;

instrumentation preferences; or mood regulation parameters.

12. The method of claim 9, wherein converting the natural language text comprises:

identifying an activity context in the natural language text, wherein the activity context comprises at least one of studying, exercising, relaxing, commuting, or working; and generating search parameters for the identified activity context.

13. The method of claim 9, further comprising:

formatting the list of media recommendations as natural language text for presentation to the user device.

14. The method of claim 1, further comprising:

determining a geographic location associated with the user device; and filtering the media catalog data based on territorial licensing restrictions associated with the geographic location.

15. The method of claim 1, further comprising:

aggregating the media catalog data from the plurality of content provider APIs into a unified searchable index; and wherein generating the list of media recommendations comprises searching across content from multiple providers simultaneously through the unified searchable index.

16. The method of claim 1, further comprising:

maintaining a persistent conversation context across multiple request-response cycles associated with at least one of the user device or a user; and refining the list of media recommendations based on accumulated context from the persistent conversation context.

17. The method of claim 1, wherein the content provider APIs are discovered through at least one of:

automated web crawling that identifies machine-readable licensing terms;

provider registration with an AI system; or decentralized content registries.

18. The method of claim 1, further comprising:

monitoring usage of the selected media item to detect an event comprising at least one of a crawl event, a query event, or a reference event; and processing a payment transaction through the payment engine based on the detected event and the configured payment parameters.

19. The method of claim 1, further comprising:

tracking content access events corresponding to the extracted compensation parameters; and executing automated billing through the payment engine based on the tracked content access events.

20. A method comprising:

receiving a request for media content from a user device;

querying a plurality of content provider application programming interfaces (APIs) to retrieve media catalog data, wherein at least one content provider API of the plurality of content provider APIs returns media catalog data including licensing terms expressed in a rights expression schema comprising structured elements that define usage permissions and compensation requirements;

based on the media catalog data and the request for media content, generating a list of media recommendations;

receiving a selection of a media item from the list of media recommendations;

determining a rights expression schema for the licensing terms associated with the selected media item from among a plurality of supported rights expression schemas;

parsing the licensing terms according to the determined rights expression schema to extract compensation parameters specifying at least one of per-crawl pricing for automated data extraction, per-query pricing for search operations, or per-reference pricing;

automatically configuring payment parameters of a payment engine based on the extracted compensation parameters;

providing to a content provider system associated with the selected media item, an acquisition request based on the selected media item; and retrieving the selected media item from a hosting system based on the acquisition request.

\* \* \* \* \*